US012305923B2

(12) United States Patent
Israelsen

(10) Patent No.: US 12,305,923 B2
(45) Date of Patent: *May 20, 2025

(54) ROTARY KILN PREHEATER THERMAL MONITORING SYSTEMS

(71) Applicant: Quantum IR Technologies, LLC, South Jordan, UT (US)

(72) Inventor: Mark Israelsen, Draper, UT (US)

(73) Assignee: QUANTUM IR TECHNOLOGIES, LLC, South Jordan, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/426,162

(22) Filed: Jan. 29, 2024

(65) Prior Publication Data
US 2024/0167765 A1 May 23, 2024

Related U.S. Application Data

(63) Continuation of application No. 17/017,400, filed on Sep. 10, 2020, now Pat. No. 11,885,566.
(Continued)

(51) Int. Cl.
*G06T 7/80* (2017.01)
*F27B 7/20* (2006.01)
(Continued)

(52) U.S. Cl.
CPC ............ *F27B 7/42* (2013.01); *F27B 7/20* (2013.01); *F27B 7/2016* (2013.01); *F27B 7/34* (2013.01);
(Continued)

(58) Field of Classification Search
CPC ....... H02K 7/09; F16C 32/0442; A61B 5/015; A61B 5/028; F27B 7/42; G06T 19/20;
(Continued)

(56) References Cited

U.S. PATENT DOCUMENTS 9,066,028 B1   6/2015   Koshti
2004/0200816 A1   10/2004   Chung
(Continued)

FOREIGN PATENT DOCUMENTS

CN   103658165 B   12/2015
CN   108896187 A   11/2018

OTHER PUBLICATIONS

Kalkert, Peter & Kosetzki, N. & Küllertz, P.. (2015). Kiln shell cooling by water evaporation, controlled by infrared temperature measurement. 13. 62-69.
(Continued)

*Primary Examiner* — Phuoc H Doan
(74) *Attorney, Agent, or Firm* — Maschoff Brennan

(57) ABSTRACT

A non-transitory computer readable media can cause the imaging analysis computer to: obtain a 3D model of a preheater level of the preheater; obtain at least one infrared image of a fixed field of view of the preheater level of the preheater; analyze all pixels in the fixed field of view of the at least one infrared image for each pixel temperature; generate a 2D temperature model of the preheater level; overlaying the 2D temperature model over the 3D model to generate a virtual 3D preheater level temperature model; and provide a visual representation of the virtual 3D preheater level temperature model.

30 Claims, 18 Drawing Sheets

Related U.S. Application Data

(60) Provisional application No. 62/898,897, filed on Sep. 11, 2019.

(51) Int. Cl.

| | | |
|---|---|---|
| *F27B 7/34* | (2006.01) | |
| *F27B 7/38* | (2006.01) | |
| *F27B 7/42* | (2006.01) | |
| *G01J 5/00* | (2022.01) | |
| *G01J 5/10* | (2006.01) | |
| *G06T 7/00* | (2017.01) | |
| *G06T 7/60* | (2017.01) | |
| *G06T 19/20* | (2011.01) | |
| *G08B 7/06* | (2006.01) | |
| *G01J 5/48* | (2022.01) | |
| *G01J 5/80* | (2022.01) | |
| *G08B 3/10* | (2006.01) | |
| *G08B 5/22* | (2006.01) | |

(52) U.S. Cl.
CPC .............. *F27B 7/38* (2013.01); *G01J 5/0066* (2013.01); *G01J 5/10* (2013.01); *G06T 7/0004* (2013.01); *G06T 7/60* (2013.01); *G06T 19/20* (2013.01); *G08B 7/06* (2013.01); *G01J 2005/0077* (2013.01); *G01J 5/485* (2022.01); *G01J 5/80* (2022.01); *G06T 2207/10048* (2013.01); *G06T 2207/30108* (2013.01); *G06T 2219/2012* (2013.01); *G08B 3/10* (2013.01); *G08B 5/22* (2013.01)

(58) Field of Classification Search
CPC ........ G01J 5/10; B29C 64/393; B22F 3/1055; G05B 17/02; G06N 3/08; G06Q 30/0631
See application file for complete search history.

(56) References Cited

U.S. PATENT DOCUMENTS

| | | |
|---|---|---|
| 2015/0289324 A1 | 10/2015 | Rober et al. |
| 2017/0094228 A1 | 3/2017 | Israelson |
| 2019/0219450 A1* | 7/2019 | Dubbs ...................... H04N 5/33 |
| 2019/0340914 A1 | 11/2019 | Israelsen |

OTHER PUBLICATIONS

KIMA Process Control GmbH, KilnCooler Hot Spot Brochure, https://www.kima-process.de/products/kilncooler-hot-spot/, accessed Sep. 9, 2020.

HGH, Continuation Thermal Monitoring of Rotary Kiln, hgh-infrared.com, Apr. 26, 2019, <https://www.hgh-infrared.com/News/They-talk-about-us/Continuous-thermal-monitoring-of-rotary-kiln>.

PCT International Search Report and Written Opinion issued in corresponding application No. PCT/US2020/050221, dated Nov. 30, 2020.

* cited by examiner

ROTARY KILN PREHEATER THERMAL MONITORING SYSTEMS

CROSS-REFERENCE TO RELATED APPLICATIONS

This patent application is a continuation of U.S. application Ser. No. 17/017,400 filed Sep. 10, 2020 now U.S. Pat. No. 11,885,566 issued Jan. 30, 2024, which claims priority to U.S. Provisional Application No. 62/898,897 filed Sep. 11, 2019, which applications are incorporated herein by specific reference in their entirety.

BACKGROUND

Field

The present invention relates to systems and methods for monitoring temperatures of a preheater of a rotary kiln. In some aspects, the present invention relates to infrared imaging systems and methods for detecting temperature variations at defined locations of a preheater of a rotary kiln.

Description of Related Art

Generally, it is problematic to have a cement kiln with hot spots that exceed allowable temperatures, even if for short durations. The hot spots cause degradation of the kiln, which requires periodic shut down for maintenance and repair. These kilns are large structures (e.g., 4-5 m diameter, 60-90 m length) and process a large amount of cement. As such, a shutdown is significantly costly due to costs to fix the kiln and the lost profits.

The kilns operate at significantly elevated temperatures of 800-1000° C., where the hottest location can be the bottom end from which the processed cement exits. However, temperatures can spike in discrete locations where brick may be prematurely degrading compared to other areas. The increased temperatures can cause the brick in the discrete locations to warp, drop, and/or disintegrate at the hotspots further exacerbating the problem.

An example configuration of a kiln can include a tube formed of a steel casing that houses an internal lining of brick. Support rollers hold a tyre ring that is separated from the steel casing by blocks that are spaced apart from each other so that gaps are present between the tyre and blocks. The blocks can create areas where thermal dissipation from the steel casing may be limited due to thermal insulation or reduced thermal dissipation caused by covering the steel casing in the regions having the blocks. Additionally, the tyre circumferentially encloses the region of the steel casing having the blocks and gaps therebetween so that heat dissipation is further inhibited at the block region and constricts heat flow at the gaps by limiting heat dissipation to the openings on each end of the gap. The tyre assembly also inhibits thermal monitoring of the steel casing and internal brick at the region underneath the tyre and blocks. As a result, the internal brick under the tyre assembly may have undetectable thermal spikes that are unacceptable.

Additionally, a preheater for a rotary kiln may also be subject to temperature fluctuations. These preheater can have hot regions in one or more locations, such as one or more preheater levels of the preheater. The preheater may also have regions that are cooler than desired. The temperatures of the preheater can have an impact on the operability of the rotary kiln.

Additionally, prior cooling systems for rotary kilns have included fans that blow ambient air and sprayers that spray water on the steel casing. The fans only blow ambient air so the temperature reduction is limited, and the fans can be audibly unfavorable due to constant loudness of the fans. The water sprayers have shown benefits; however, the current efficiency and difficulty of temperature control still is less than desirable.

Therefore, it would be advantageous to be able to detect temperature and undesirable temperature deviations of a preheater of a rotary kiln. Moreover, it would be beneficial to be able to adjust the heating of the preheater when regions thereof are too hot or too cool, in order to maintain a suitable temperature so that the rotary kiln receives material or air that is adequately preheated in the preheater.

SUMMARY

In some embodiments, a system for detecting a temperature of a preheater of a rotary kiln can include: at least one infrared imaging sensor for each level of the preheater; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to: obtain at least one baseline infrared image of a fixed field of view of each level of the preheater with or without an image of the rotary kiln; analyze all pixels in the fixed field of view of each level of the preheater for the at least one baseline infrared image for each pixel temperature; determine an acceptable temperature range for each pixel in the fixed field of view for each level of the preheater; obtain at least one subsequent infrared image of the fixed field of view of each level of the preheater; determine the temperature for all pixels in the fixed field of view of the at least one subsequent infrared image; determine whether the temperature for each pixel in the at least one subsequent infrared image is within the acceptable temperature range for a particular level of the preheater; when the temperature is within the acceptable range for a particular level of the preheater, mark the pixel as normal; when the temperature is greater than or less than the acceptable range for a particular level of the preheater, mark the pixel as abnormal; and generate an alert or temperature change protocol when one, two, or more adjacent pixels for a particular level of the preheater are marked as abnormal and having a temperature outside of the acceptable temperature range in the fixed field of view of the particular preheater.

In some embodiments, the system can be configured to obtain at least one baseline infrared image of a fixed field of view of at least one level of a preheater of a rotary kiln with a baseline temperature profile (e.g., allowable temperature profile) for the at least one level of the preheater. Each level of the preheater of the kiln may include a unique baseline infrared image. The baseline image for each preheater of the kiln can be updated over time prior to a temperature spike or temperature drop being detected on a surface of the housing of the level of the preheater in the fixed field of view. The baseline image can be an image from an imaging sensor, or a historical composite of pixel data from a plurality of baseline images over time. This allows for comparisons between images with a baseline temperature and images, such as for a specific level of the preheater, that have a temperature variation outside of an allowable temperature variation range of the specific level of the preheater. Otherwise, when the current image of a specific preheater level has temperatures within the allowable range, it can be a baseline image or used to form a baseline image along with other similar images (e.g., historical time period) for that specific preheater level. The protocol continues until an image with a temperature spike or drop (e.g., variance outside allowable range) is obtained for a specific preheater level. A sequence of images at a specific preheater level can be used to track temperature changes in the field of view (FOV) of the images at the specific preheater level, which allows a hotspot or cold region/level to be tracked. This also allows specific discrete locations of the preheater of the kiln to be monitored while the kiln is rotating and operational, and thereby the entirety of a circumferential area and all levels of the preheater can be monitored and tracked for temperature monitoring purposes.

In some embodiments, the system can perform methods to analyze all pixels in the fixed field of view for changes from the at least one baseline infrared image to at least one subsequent infrared image. The changes can be monitored for a specific level of the preheater of the rotary kiln. The changes can be in the pixel data for each pixel, such as changes in the pixel data that indicates changes in temperature of surfaces emitting the infrared light. That is, each pixel can be analyzed by analyzing the pixel data in a subsequent image and comparing that subsequent pixel data to the baseline pixel data. The analysis can include computationally processing the subsequent pixel data to determine a pixel value, such as a temperature for that pixel. The subsequent pixel value is compared to the baseline pixel value. The baseline pixel value can be a range of suitable pixel values, and may include a distribution of pixel values when the temperature is within a suitable range. When the subsequent pixel value of that pixel is within an allowable range of the baseline pixel value, the subsequent pixel value does not identify a temperature spike or dropout. However, when the subsequent pixel value is outside the allowable range of the baseline pixel value, then a determination is made as to whether or not the subsequent pixel value is indicative of a temperature spike or temperature drop being present. This protocol can be performed for each of the discrete levels of the preheater of the kiln by monitoring the discrete levels in a FOV of the imaging device of each level. That is, the temperature of a discrete level can be compared to the same discrete level, such that all of the levels of the preheater can be monitored. Also, the temperatures of an image can be compared to a prior image so that a discrete level can be monitored during operation, and so that a hotspot (e.g., hot level) or cold region (e.g., cold level) can be identified at a discrete level compared to other levels of the preheater and to historical temperatures of the specific level.

In some embodiments, the system can perform methods to identify real time temperatures and real time variable differences in temperatures for each pixel in the field of view between the at least one baseline infrared image and the at least one subsequent infrared image. The variable difference can be determined by assessing changes in pixel temperature value for a specific pixel (e.g., pixel location in the pixel array of the imaging device) from a baseline image to a subsequent image. However, when the subsequent pixel temperature value is outside (e.g., hotter or cooler) the allowable range of the baseline pixel temperature value, then a determination is made as to whether or not the subsequent pixel value is indicative of a temperature spike or temperature drop being present. The temperatures of the pixels can be mapped to the discrete levels of the preheater as the kiln rotates and is in operation, which allows for the same discrete location to be compared to itself, and also allows for comparison with of a first discrete level with a different second level. In part, this is because the temperature of one level can directly impact the temperatures of the adjacent levels and the other levels of the preheater. Since each infrared camera is in a fixed location of a defined preheater level with a fixed field of view of that level, each pixel in the images corresponds to a specific location in the scene of the preheater level, which allows tracking each pixel over time and changes of the values of each pixel.

In some embodiments, the system can identify one or more first pixels in the at least one subsequent infrared image having a first temperature that is greater than or less than an allowable temperature for the one or more first pixels in the at least one subsequent infrared image compared to an allowable temperature for the one or more first pixels in the at least one baseline infrared image of a particular preheater level. Accordingly, an allowable temperature for each pixel can be determined, such as by recording the pixel data for each pixel (e.g., raw pixel data or temperature pixel data) and determining a distribution of pixel temperatures for each pixel. The distribution of pixel temperatures, based on historical pixel temperatures, can evolve as more pixel data is obtained for each pixel within the allowable temperature range. The distribution of pixel temperatures can be used to set a threshold temperature (e.g., maximum or minimum) for a pixel temperature, where the threshold temperature sets an upper boundary and/or lower boundary for the allowable temperature. The pixel temperature for each pixel in the subsequent image can be compared to the threshold temperature so as to be compared to the allowable temperature. Then, pixels in the subsequent image having a pixel temperature greater than the upper threshold temperature or lower than the lower threshold temperature are identified as being outside the allowable variable temperature range. The temperatures of the pixels can be mapped to the discrete levels of the preheater as the kiln rotates, which allows for the same discrete level to be compared to itself, and also allows for comparison with of a first discrete level with a different second discrete level of the preheater.

In some embodiments, the system can determine that there are one or more first pixels with a temperature spike/reduction based on the first temperature of the one or more first pixels being greater/lesser than the allowable temperature of the one or more first pixels in the fixed field of view. As such, pixels having a pixel temperature that is greater or lesser than the upper or lower threshold temperature can be identified as being a temperature spike/reduction pixel due to having the first temperature that is greater/lesser than the allowable temperature for each pixel. The pixels having a pixel temperature that is outside (e.g., larger/smaller) than the allowable temperature range can be identified as being a hotspot or cool region.

In some embodiments, the system can generate an alert that identifies a temperature spike or cool region being present in the fixed field of view of a level of the preheater. This is done when one or more pixels are identified as having a temperature spike or temperature reduction, such as pixels that are adjacent and connected. When a temperature spike is detected, instead of an alert or in addition thereto, the system may generate a cooling protocol to cool a hotspot. When a temperature reduction is detected, instead of an alert or in addition thereof, the system may generate a heating protocol to heat the cool region, such as by increasing the temperature of the heat producers of the preheater or providing increased heat flow from the heater of the rotary kiln. While a single pixel can be used to monitoring a temperature spike/reduction, it may be beneficial to have a group of connected pixels showing substantially the same temperature spike/reduction.

In some embodiments, the system can perform methods to generate an alert that identifies the presence of a temperature spike (e.g., hotspot) or temperature reduction (e.g., cool region) in real time for the temperature of one or more pixel regions or any combination of these in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication.

In some embodiments, a cooling system is provided and operably coupled with the imaging analysis computer so that cooling can be implemented based on hotspots on the preheater. The cooling system includes: a sprayer controller (e.g., can be the same or different from the image analysis computer, such as being coupled therewith); a water source; a pressurizing pump fluidly coupled with the water source and operably coupled with the sprayer controller; a water supply system fluidly coupled with the water source and pressurized by the pressurizing pump; at least one solenoid valve in the water supply system, wherein the solenoid valve is operably coupled with the sprayer controller; and at least one nozzle at an end of a spray line of the water supply system, wherein the at least one solenoid valve controls water sprayed from the at least one nozzle.

In some embodiments, the sprayer controller is configured to: obtain hotspot data for the preheater or the kiln; identify at least one hotspot to cool with a cooling water spray or being provided the identify of at least one hotspot; determine a spraying protocol to cool the identified at least one hotspot or receiving such a spraying protocol; implement the spraying protocol to cool the identified at least one hotspot; obtain cooled temperature data for the at least one hotspot; determine whether a cooled temperature of the hotspot is greater than the acceptable range; when the cooled temperature is within the acceptable range, terminate the spraying protocol; and when the cooled temperature is greater than the acceptable range, continue the spraying protocol.

In some embodiments, the sprayer controller or image analysis computer is configured to: identify a location and hotspot data of a specific hotspot on a specific preheater level; and determine a spraying protocol for the specific preheater level hotspot based at least one of: a water spray pressure; a distance of a specific water sprayer to the location of the specific hotspot on a specific preheater level; time between actuating solenoid valve of the specific water sprayer and pressurized water reaching the nozzle; time between actuating solenoid valve of the specific water sprayer and contacting resultant water spray on the location of the specific hotspot on the specific preheater level; duration of the location of the specific hotspot at the specific preheater level being within a spray region on the preheater surface; duration of opening the solenoid valve; temperature of sprayed water; hottest temperature of the specific hotspot; temperature profile of the specific hotspot at the specific preheater level; temperature gradient and area of the hotspot; temperature of sprayed water as it contacts the location of the specific hotspot (e.g., heated water or steam); when to initiate spray by actuating the solenoid valve; when to terminate spray by de-actuating the solenoid valve; position of nozzle of sprayer relative to the location of the specific hotspot; area of hotspot; or area of water spray on the preheater surface of a specific preheater level.

In some embodiments, the methods are performed by the system in order to identify cool regions or a preheater level that has an abnormally low temperature, and then increasing heating of the preheater to heat the cool region. In some aspects, this can include generating more heat with a heating device at a base of the preheater. In some aspects, this can include opening a damper or other air flow controlling device to allow more heat through a tertiary kiln airduct to the preheater.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
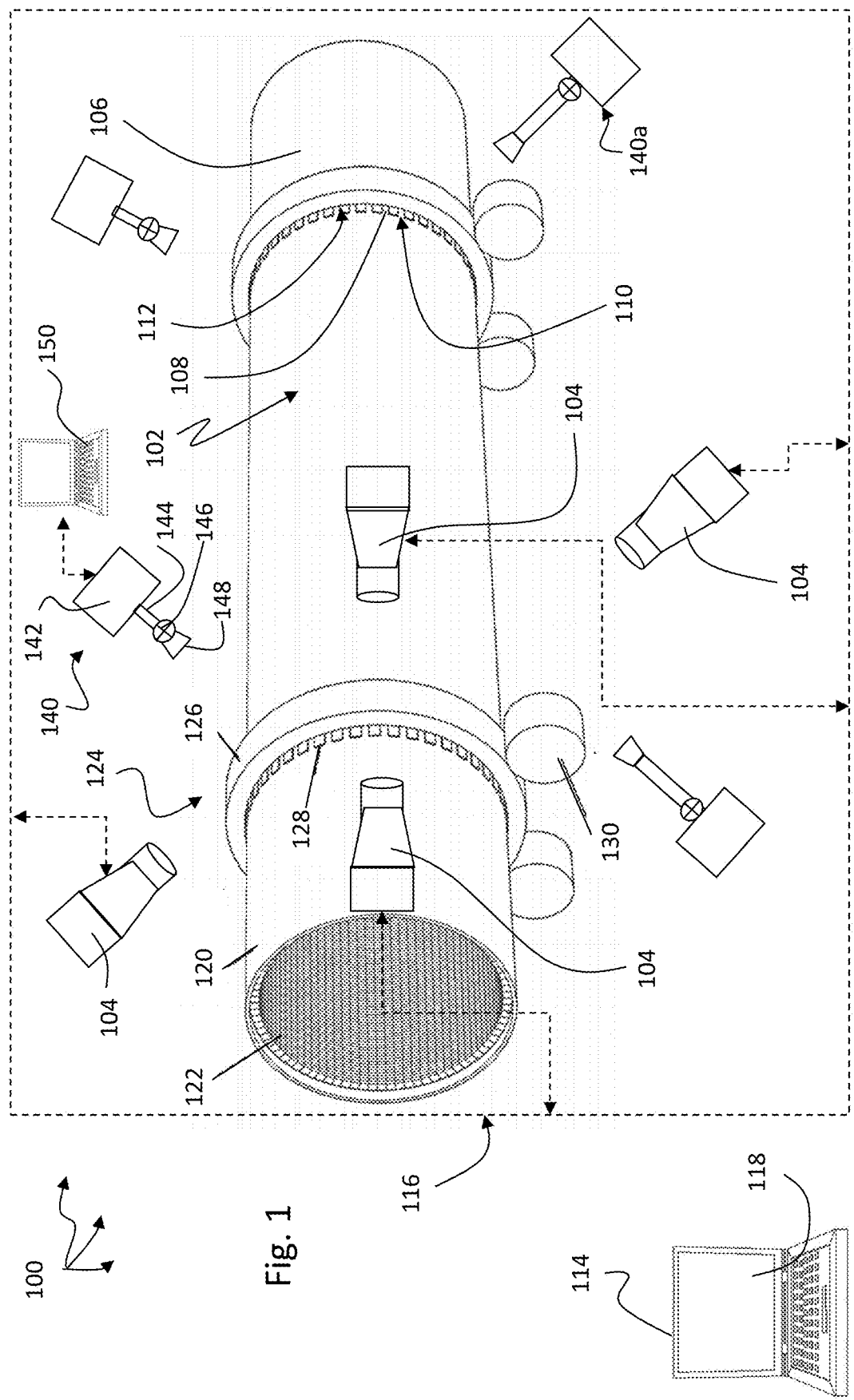
FIG. 1 includes a schematic diagram for a system for monitoring a rotary kiln with a set of infrared imaging sensors and a cooling system for cooling hotspots or hot regions of the rotary kiln.

The features of the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology provides a system and method for detecting temperatures and temperature variations of discrete locations of a preheater and rotary kiln, especially in difficult surfaces to measure (e.g., between tyre blocks). The system can include at least one infrared imaging sensor and an imaging analysis computer operably coupled with the at least one infrared imaging sensor. The imaging analysis computer can be configured to control any infrared imaging sensor and acquire infrared images therefrom at any reasonable rate and in any duration. The imaging analysis computer can be configured to analyze the infrared images in order to detect temperatures and temperature variations in the preheater and kiln, as well as predict internal temperatures of the brick layer of the rotary kiln. This can be done for discrete locations that are tracked as the kiln rotates. The imaging analysis computer can be configured to detect temperatures on a surface of a kiln casing in the gap underneath the tyre where it has been traditionally difficult to detect such temperatures. That is, each gap under the tyre can be monitored as the kiln rotates. The temperatures of the exposed surfaces of the kiln casing and hidden or covered surfaces of the kiln casing can be recorded and used to determine whether there are any hotspots or pixels with temperature spikes. The hotspots can be tracked as the kiln rotates by comparing hotspot pixels from one image to the next image in a sequence, where the sequence can be analyzed to track movement across a field of view (FOV). Each level of a preheater can include an infrared imaging sensor to monitor the temperature of each level.

Also, the system can include a water sprayer cooling system that can be operably controlled by the same computing system that includes the imaging analysis computer. In some instances, a computer is both the imaging analysis computer and cooling system controller. In other instances, a PCL or controller area network bus (CAN bus) control module can be used as a controller. As such, the temperature data can be analyzed to determine operation and spraying protocols for spraying water on the kiln casing and under the tyre in the gaps between the tyre blocks. The system can monitor temperatures of each individual gap in order to determine whether or not the water sprayer cooling system is effectively cooling and/or control the cooling system to maintain the desired temperature profile around and under a tyre assembly.

In some embodiments, the system can include IR cameras of a monitoring system on one side of the rotary kiln and a water spray cooling system on the other side of the rotary kiln. That is, for a round cross-sectional area, the cameras and water sprayers are on opposite sides. Also, the cameras can be located outside of a steam/vapor region so that steam generated from vaporization of the sprayed water does not impede temperature monitoring. That is, the cameras and sprayers are positioned so that none of the vapor generated by the water spray passes between the camera and the kiln.

In some embodiments, the temperature monitoring and cooling systems can be provided to industrial plants with rotary kilns or other rotating equipment that may need temperature monitoring and cooling. Such other rotating equipment may or may not include components or regions that are difficult to reach, which may be similar to the tyre assembly of the rotary kiln. The systems can be adapted for IR imaging in difficult to view regions, and selective water spray configurations that do not result in vapor that inhibits IR imaging and temperature analysis. In some aspects, the sprayed water can be vapor when sprayed form the nozzle or be converted to vapor during transit from nozzle to surface of kiln, where the high temperatures of the kiln heat the water spray to form a vapor spray. As a result, at least a portion or the entirety of the water contacting the surface of the kiln is vapor. The vapor is cooler than the temperature of the kiln, and thereby still cools the hotspots.

In some embodiments, the systems are provided with service plans so that the equipment is installed and maintained by a service provider. The service plans can include the automated controllers that analyze the image data and/or provide the cooling instructions. The service plans can also include software for the temperature monitoring and/or cooling. The service plans can include transmittal of data to the service provider for monitoring the temperatures (e.g., hotspots) and cooling system operation. The service plans can include automation of the systems and providing graphical information about such operations of the system via display screens for operators to use. The service plan can include real time monitoring of all equipment operation and correct function. While the system may operation autonomously, the system can be monitored and manually operated whether by an operator on site or remotely by the service provider.

The systems can provide improvements in monitoring under the tyre assembly (e.g., live rings and components thereof) by using the IR cameras aimed into the gaps between the tyre blocks to view surfaces under the tyre assembly. This allows the system to capture IR images of the gaps for detection of temperature and temperature changes under the tyre assembly. The cooling system can also spray water into the tyre gaps for improved cooling and temperature regulation under the tyre assembly. The appropriate placement of IR cameras and spray nozzles can provide improved imaging and cooling without compromising temperature monitoring functions. A network of IR cameras and a network of spray nozzles can be configured and arranged for complete coverage of a tyre assembly, and possibly an entire kiln. In some aspects, the spray nozzles can be formed in a line that are linearly arranged along the length of the kiln, and placed in a density such that the entire length of the kiln can be sprayed by the spray system.

In some embodiments, the cooling system provided herein can replace a traditional air flow cooling system that is used to cool kilns. However, the cooling system may be used to supplement an airflow cooling system by selectively spraying water at hotspots (the nozzles can be moved around when hotspots are detected) as well as fixed/movable nozzles for cooling the kiln under the tyre assembly.

The systems can provide for improved detection of hotspots under the tyre assembly by placement of the IR cameras, such as along a longitudinal axis of the kiln or of a tyre gap. The IR cameras can include an optical axis aligned with the longitudinal axis of the kiln; however, the optical axis can be at an angle, such as from 1 degree to 45 degrees relative to the longitudinal axis, or 5-30 degrees, or 10-20 degrees. The alignment is made so that the IR camera views a sufficient region of the surface under the tyre ring.

The IR data can be analyzed for temperature monitoring and hotspot analysis in real time. The real time functionality also allows for monitoring refractory wall thickness, such as by computations of wall thickness based on temperature profiles from the IR images. Changes in temperature in select regions, such as hotspots, can indicate a thinning of the refractory wall. The data can be analyzed so that a model of the refractory wall (e.g., brick) is obtained and updated in real time. The system can also use the calculations and model to determine the current wall thickness or integrity as well as make predictions in future wall thickness or predict rate of degradation of the refractory wall or specific locations thereof, whether or not associated with a hotspot. This provides a history based prediction of both possible temperatures and possible changes to the refractory brick wall, which can allow for forecasting a temperature profile and/or brick thickness profile at future timepoints, such as one or more days in the future, one or more weeks in the future, or one or more months in the future. This can be helpful for maintenance planning. The cooling system can be used for extending the maintenance period so that the kiln can be in operation longer without maintenance stoppages. The temperature of each preheating level can similarly be monitored.

Changes in temperature can result in alerts being provided as well as automatic operation of the water spray cooling system, such as onto hotspots. This can reduce hotspots, and may eliminate some hotspots or at least keep the temperature controlled to a desirable temperature. This can result in reducing the number of shutdown and startup cycles related to kiln maintenance.

In some embodiments, the monitoring system can be an infrared monitoring system. The monitoring system can include a thermal imaging device (for example, an infrared (IR) imaging device) and a processor that are collectively configured to monitor and detect preheater and rotary kiln surface temperatures at discrete locations, especially surfaces or areas of the kiln under the tyre assembly (e.g., in the gaps between the tyre blocks) and specific preheater levels. In some embodiments, the monitoring system may monitor a fixed field of view (FOV) to detect temperatures on rotating hard surfaces, and to detect temperatures under the rotating tyre assembly by tracking each individual tyre block and/or tyre gap. If a temperature spike is detected, the system is configured to alert a user to the presence of the temperature spike (or a potential kiln brick degradation region). For example, the alarm can be provided by actuating an indicator (e.g., a visual alarm or an audio alarm) and/or by communicating to one or more users via an electronic communication channel (e.g., text message, email, telephone call, etc.). In some embodiments, an IR monitoring system (or at least an IR detector sensor or device) may be positioned to view under the tyre into the tyre gaps, such as from each side of the tyre by viewing into both open ends of the tyre gaps.

In some embodiments, the alert can be tied to the cooling system, such that the cooling system is activated to initiate a cooling protocol upon the conditions being met to generate the alert. The alert may be provided by activation of the cooling system, or vice versa.

In some embodiments, an IR monitoring system may be used to detect whether or not a cooling system is being effective, for example, by monitoring specific regions being selectively cooled by a water spray cooling system, such as a specific tyre gap associated with a hotspot. The information can be used to modulate operation of the cooling system, such as in real time, to actively cool one or more discrete location of the kiln surface, which in turn can cool the underlying brick.

In some embodiments, a process (or a system) may start with a baseline IR image of the monitored field-of-view (FOV) that includes a rotating tyre assembly. There may be a base line image for each rotational position of the kiln, so that each discrete location of the kiln may be monitored during the rotation. This allows for the same discrete location to be monitored per rotation for hotspot tracking purposes. For example, the IR camera can be aligned with a longitudinal axis of the kiln casing so that the FOV includes the gap, such as the surfaces of the steel casing, tyre blocks and tyre that define the gap. The IR camera is stationary and images the gaps as they rotate by, and thereby each gap can be identified and tracked (e.g., with a gap number) per rotation and during the rotation through the FOV. The process may analyze all pixels in the FOV for changes from the baseline image to a subsequent image in order to detect temperatures in real time. The pixels of a hotspot are analyzed so that a region identified as a hotspot can be monitored so that a discrete location of the kiln can be monitored as it rotates and the hotspot moves across the pixels. The FOV can include a part or entire vessel of a preheater level as well as any connecting conduits between the different preheater levels.

Accordingly, the IR imaging system monitors temperatures in real time; however, it should be recognized that this temperature difference variation may be different in different ambient conditions, different geographical locations, different humidity, or different times of the day, month, season or year. Also, each pixel is well characterized for the rotating kiln so that each pixel corresponds with a specific region of the rotating kiln, such as each pixel being related to surface data for a surface of the rotary kiln in the pixel for the specific instance the pixel was obtained. By collecting a series of images as the kiln rotates, the entirety of the kiln can be mapped and monitored for hotspots in real time. The well characterized pixel can have a range of suitable pixel values for each region of the casing that corresponds with that pixel when there is no hotspot at that casing region, so that the presence of a hotspot or temperature spike shows a significantly different pixel value when that hotspot or temperature spike is imaged by that pixel. This allows the rotation to be taken into account for temperature monitoring.

FIG. 1 includes a schematic diagram for a system 100 for monitoring a rotary kiln 102 with a set of infrared imaging sensors 104 arranged for monitoring external kiln surfaces 106, such as tyre gap surfaces 108. The infrared imaging sensors 104 can be located relative to the tyre gaps 110, so as to view into the tyre gaps 110 (e.g., under the tyre ring 126) from each tyre gap opening 112, which can cover a large percentage of the tyre gap surface 108, such 100%, 95%, 90%, 80%, 75%, 50%, 40%, 25% or the like. The system 100 also includes an image analysis computer 114 operably coupled to the set of infrared imaging sensors 104 through a network 116 (e.g., wired, wireless, optical or any network) represented by the dashed box. This allows for the infrared imaging sensors 104 to send infrared image data over the network 116 to the image analysis computer 114 for analysis.

Generally, the kiln 102 can include the kiln casing 120 housing the brick lining 122. The tyre assembly 124 can include the tyre ring 126 and tyre blocks 128 that define the tyre gaps 110. The gap surface 108 can include a region of the kiln surface 106 and the side surfaces of the tyre blocks 128, and optionally an under surface of the tyre ring 126. However, the imaging sensors 104 may preferentially view the surfaces of the casing 120 and tyre blocks 128 because hotspots are more likely under these features, where the inner surface of the tyre ring 126 may not need to be monitored because it is unlikely for any hotspots to be in the tyre ring 126. The tyre ring 126 can be held by support rollers 130.

While FIG. 1 shows four imaging sensors 104 positioned in the environment around the kiln 102, the number of imaging sensors 104 included in the disclosed systems and/or operated in the disclosed methods may vary per embodiment. In some aspects, it may be desirable to achieve 360° coverage of the components of the kiln 102 on any external surface 106 or in various locations to monitor the gaps 110 as well as the gap surfaces 108. In some aspects, systems 100 can include two imaging sensors, which can include one on each side of the tyre assembly 126, each aiming at a gap opening 112 of the gaps 110 as they rotate through the FOV. However, each kiln 102 can include 2, 3, 4, 5, 6, 7, 8, 9, or 10 or more infrared imaging sensors 104 positioned around the kiln 102. It may be desirable to position a first set of imaging sensors 104 to provide coverage of a first area, and a second set of imaging sensors 104 to provide coverage for a second area. Depending on the length or height of the components being monitored, the number of imaging sensors 104 employed in various embodiments can vary substantially.

The imaging sensors 104 can be any infrared sensor. For example, the imaging sensor can be a long wave IR thermal machine vision camera (e.g., FLIR A615), which can include streaming an image frequency of 50 Hz (100/200 Hz) with windowing, an uncooled microbolometer, 640×480 pixels, 17 micron detector pitch, 8 ms detector time constant, and operational temperature over −20 to 150° C. The infrared imaging sensor can produce radiometric images with radiometric data for each pixel. In some aspects, the infrared imaging sensor can detect temperature differences as small as 50 mK, which provides accuracy even at longer distances. The infrared imaging sensor can provide 16 bit temperature linear output. The imaging sensor can provide the radiometric data as or about 307,200 pixels in infrared images with embedded temperature readings with the radiometric images. The imaging sensors 104 may include a weather-proof housing (e.g., wind and/or rain tight), which may be configured as spark proof or explosion proof housing. As such, the housing of the shown image sensors may be configured to be explosion proof as known in the art. The housing can include any of a solid anti-corroding aluminum construction, epoxy polyester powder paint, germanium window, dust proof, water proof, explosion proof, and optionally with a heater and/or cooler, TEC or fluid cooling system.

The housing can also be a fluid cooled housing (e.g., FIG. 9) in order to regulate the temperature of the IR camera. While an example of an uncooled IR camera has been used, it should be recognized that the IR camera can include a cooling system that actively cools the camera.

In some aspects, the radiometric data/images from the infrared sensor (e.g., radiometric IR camera) produces at least 16 bits of infrared data per pixel. These radiometric data/images can be used by the imaging analysis computer reading or recording the 'count' data (e.g., 16 bits) for each pixel, which when converted represents the thermal temperature of the pixel. This feature of using radiometric data/images provides more information for the present invention compared to IR images that are just JPEG images (e.g., non-radiometric data) from IR cameras that don't contain any thermal data and instead rely on image comparisons to detect change.

In some embodiments, discussion of images or infrared images is considered to be radiometric digital data from an IR camera so that the algorithms process the radiometric digital data. The use of radiometry can use temperature measurement data for each pixel, where the radiometric measurements can be used for reading the intensity of thermal radiation, which can be used for temperature determination for each pixel. The radiometric thermal data for each pixel with pixel values correspond to the temperature of the scene. The radiometric data provides a precise temperature, which allows for external scene parameters to be compensated for emissivity (e.g., a measure of the efficiency of a surface to emit thermal energy relative to a perfect black body source) and window transmission to more accurately determine temperature. The user (or imaging analysis computer) may obtain temperature data from the radiometric data, as well as maximum temperatures, minimum temperatures, and standard deviations for user-defined regions (points of interest) for one or more pixels or a plurality of pixels.

Some radiometric IR cameras have the ability to compensate for variations in camera temperature. This allows operators of the systems to receive output from the radiometric IR cameras that has been stabilized and normalized, resulting in temperature-stable images or video. As a result, a scene with a given temperature can correspond to a certain digital value in the image or video, independent of the camera's temperature. In some aspects, it can be important to distinguish temperature measurements as surface infrared measurements because radiometric measurements can measure surface temperatures. Metals, and organic material (like people), are usually completely opaque, and radiometric measurements can be able to resolve their surface temperature. Remote temperature sensing of a surface with IR imaging relies on the ability to accurately compensate for surface characteristics, atmospheric interference, and the imaging system itself. The surface characteristics that influence temperature measurement are surface emissivity and reflectivity at the infrared spectral wavelengths, which can be considered in the algorithms and data processing described herein.

Figure 1A:
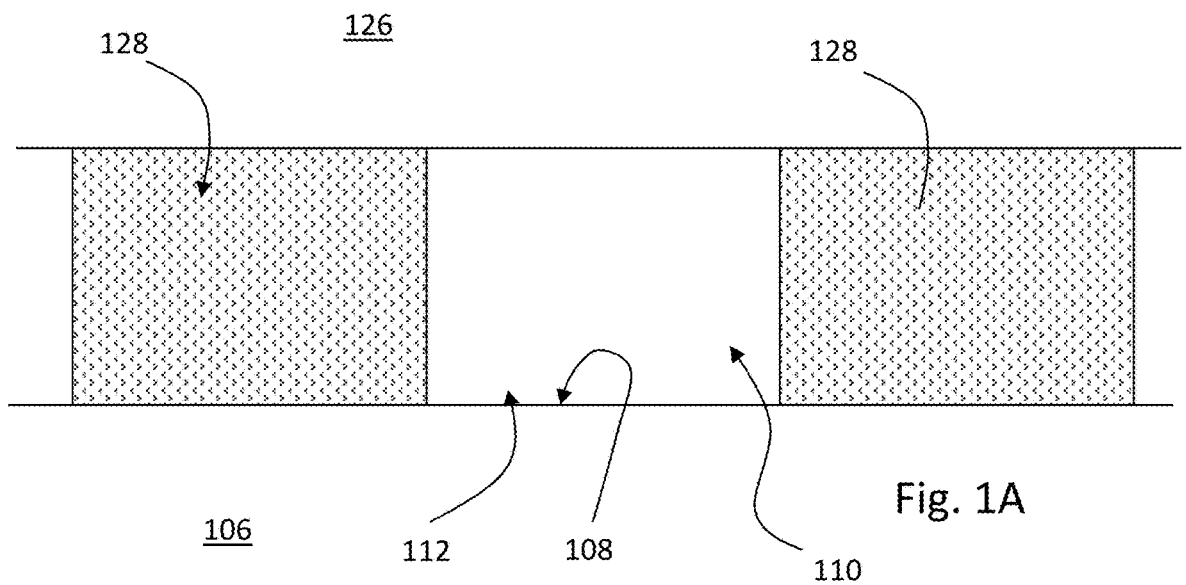
FIG. 1A. shows a cross-sectional side view of a portion of the tyre system, so as to show the gap between the tyre ring, tyre blocks, and gap surface.
Figure 1B:
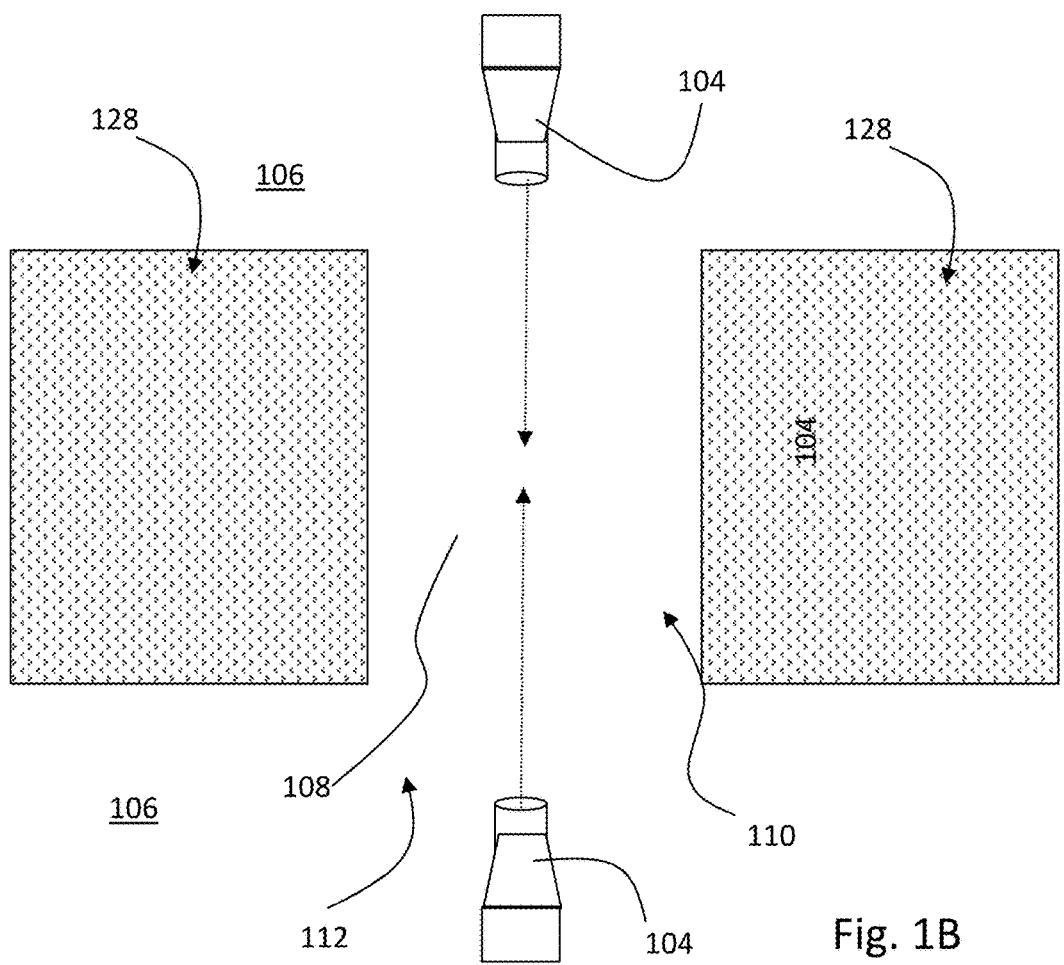
FIG. 1B shows a top view of the tyre gap with an imaging system.

In some embodiments, the IR camera can be an FLIR A615 model with a 25 degree lens, or A615 FOV calculator. The IR camera can be positioned about 15 meters away from the surface of the rotating kiln, which can be at any angle relative to a tyre gap, and preferably at least one IR camera or two IR cameras with an optical axis aligned with the kiln, such as aligned with a tyre gap to view therethrough, such as shown in FIGS. 1A-1B. The A615 model can have 640×480 pixels, a close focus of 0.25 m and a hyperfocal distances o 20.55 m. Accordingly, the type of IR camera can vary. Also, the IR camera can be actively cooled by including an internal cooling system. Additionally, a cooling housing (FIG. 9) can be used for the IR camera so that the camera can be cooled. The active cooling allows for closer placement of the IR camera to the kiln, which can in turn provide advantages for monitoring temperatures under the tyre assembly as well as for controlling a cooling system that is adapted to spray water onto the kiln for active cooling of the kiln.

In some aspects, the imaging sensors 104 may be infrared imaging sensors that provide radiometric data/images. Infrared imaging sensors may capture wavelengths of light between at least 700 nanometers to 1 millimeter, and indicate the captured wavelengths in digital image information transmitted over the network 116 to the image analysis computer 114. Upon receiving the digital image information from the imaging sensors 104, the image analysis computer 114 may analyze the image information to determine temperature information for each pixel in the digital image. An operator of the system 100 may establish one or more warning levels or alert levels for one or more regions of interest (e.g., one or more pixels or combinations of adjacent pixels) within the digital image information of the digital images. The image analysis computer 114 may generate one or more warnings and/or alerts if the established alerting levels (e.g., threshold temperatures) are exceeded. This may enable an operator to identify problems with the operation of the rotary kiln 102, such as a hotspot in the brick layer, earlier than previously possible, resulting in less damage to the kiln 102 because the temperatures can be used to control a kiln cooling system that can be used to spray water selectively on hotspots. Identifying hotspots for selective cooling can be economically beneficial to the entity operating the kiln 102.

FIG. 1 also show a cooling system 140 that includes a water source 142, a water conduit 144, a valve 146, and a nozzle 148. However, it should be recognized that the valve 146 can be at any location on the conduit 144, such as closer to the cooling system 140 so that there is a length of conduit between the valve 146 (e.g., solenoid) and the nozzle (140a). The cooling system 140 can be operably coupled with the imaging analysis computer 114 or a specific cooling system controller 150 (e.g., computing system 600, FIG. 6), such as a PLC controller. The water source 142 can be a feed line or a storage tank that provides the water to be sprayed by the cooling system 140. The water source 142 is connected to a water conduit 144 that provides the water to a nozzle 148 that sprays the water onto the rotating kiln 102, where the region of the rotary kiln 102 being sprayed can be varied. The valve 146 can be a computer controlled valve, such as with a solenoid, that can rapidly open and close for releasing bursts or streams of water. While not shown, various known water system components, such as pumps, filters, coolers, thermocouples, or the like can also be included in the cooling system 140 to facilitate spraying water onto the kiln. The valves 146, pumps, or other equipment can be controlled by the cooling system controller 150, and may provide operational analytics to the cooling system controller 150. The cooling system controller 150 can receive instructions or data from the imaging analysis computer 114, or both can be the same computer where an imaging module can provide instructions or data to a cooling module. The temperature data that is obtained by the imaging and hotspot detection processes herein can be used for determining where on the kiln and when during a rotation, such as locations of specific rotational positions, a hotspot can be treated with a water spray (e.g., water vapor, steam) from the nozzle 148. In some aspects, the nozzle 148 can be actuatable so that it can be moved and directed toward identified hotspots for selective cooling sprays, or the nozzle 148 may have a fixed area of spray such that an array of nozzles 148 (or array of cooling systems 140 or components thereof) provides full coverage of desired regions that may need to be cooled. Once a hotspot or potential hotspot is detected, the cooling system 140 can initiate a cooling protocol that sprays water onto the hotspot as it rotates through the spray region. The valve 146, under computer control, can selectively release pressurized water to spray the hotspot and optionally surrounding regions. The control of the valve 146 allows the spray to be turned off so that water is not wasted spraying regions of the kiln that are not problematic or do not have hotspots. While continuous spray can be performed, it is less than desirable. As such, the selective spray onto particular regions of the kiln provided by the cooling system 140 can help control and reduce hotspot temperatures without wasting water or causing damage to the components of the industrial plant that may arise from excess water and flooding. Here, the nozzle 148 is shown to be directed toward the tyre assembly 124. However, a plurality of nozzles 148 (each associated with a solenoid or other quick valve control) can be provided and directed to any desired area of the kiln 102, where the nozzles 148 can be fixed or movable to change the aim and trajectory of the water spray.

While not shown, each sprayer can include its own reservoir, or each sprayer can be connected to a water supply line, or combinations thereof.

FIG. 1 also shows the imaging analysis computer 114 with a display 118 that can provide a user interface for monitoring images from the imaging sensors 104 and data obtained from computations of the digital image information in the images obtained during the monitoring protocols. The computer 114 connects via the network to the imaging sensors 104.

FIG. 1A. shows a cross-sectional side view of a portion of the tyre system 124, so as to show the gap 110 between the tyre ring 126, tyre blocks 128, and gap surface 108.

FIG. 1B shows a top view of the gap 110 as defined by the tyre blocks 128, and gap surface 108, and showing an infrared imaging sensor 104 aimed at each gap opening 112, such as along a longitudinal tyre gap axis or longitudinally aligned with a longitudinal axis of the kiln 102. However, there may be an angle between the optical axis of the imaging sensor 104 and the longitudinal axis of the kiln, such as up to 45 degrees, 30 degrees, 20 degrees, 15 degrees, or up to 10 degrees. This allows for viewing under the tyre ring 126 for better imaging of a hard to image area. The two infrared imaging sensors may image a large percentage of the tyre gap surface 108, such 100%, 95%, 90%, 80%, 75%, 50%, 40%, 25%, or the like.

Figure 1C:
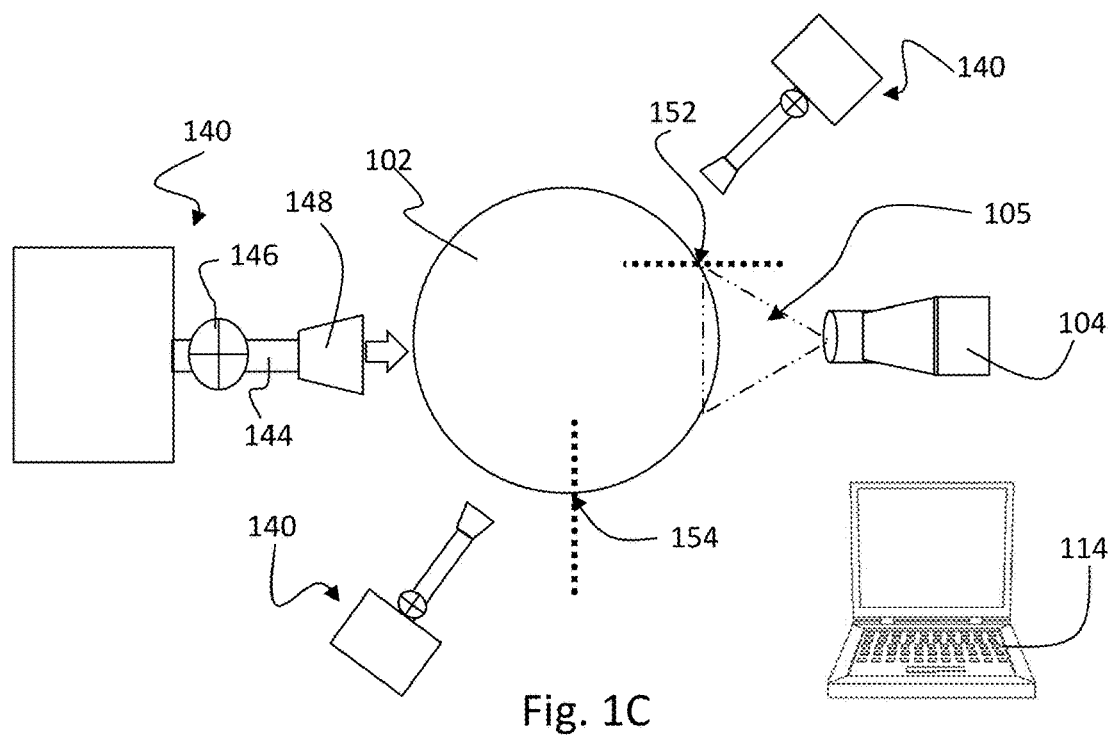
FIG. 1C shows a cross-sectional view of a kiln with a temperature monitoring and control system.

FIG. 1C shows a temperature monitoring and control system 160 that includes the imaging sensors 104 operably coupled to a cooling system 140 via the computer 114. Accordingly, the imaging sensors 104 can be outfitted with transmitters (e.g., wired, wireless, optical, etc.) to transmit image data to the computer 114; however, the imaging sensors 104 may include transceivers to also receive data, such as control data, from the computer 114. Correspondingly, the cooling system 150, such as the solenoid valves 146, can be outfitted with receivers (e.g., wired, wireless, optical, etc.) to receive cooling data (e.g., valve opening and closing data) from the computer 114; however, the cooling system 150 may include transceivers to also transmit data, such as temperature data or operational data, to the computer 114. The view of FIG. 1C is a cross-sectional profile of the kiln 102 in order to illustrate placement of the imaging sensor 104 relative to the nozzle 148, which is on opposite sides of the kiln 102. However, the nozzle 148 (along with the other components of a cooling system) can be placed anywhere along the circumference and/or length of the kiln 102, and any number of nozzles 148 may be included.

In some embodiment, the placement of the nozzle(s) 148 can be specifically located so that the water spray does not produce vapors between the imaging sensors 104 and the surface of the kiln 104 (e.g., tyre assembly 124) being imaged. While water vapor is formed from the sprayer 140, the vapor is not sprayed in a direction to interfere with the visuals of the imaging sensors 104 imaging the kiln 102. It has been found that placing the nozzle(s) 148 too close to the imaging sensors 104 or anywhere the resultant vapor passes between the imaging sensor 104 and kiln 102 causes problems with temperature monitoring and cooling system operations due to the vapors causing artifacts or errors in the IR image data. Accordingly, an imaging sensor 104 can have a field of view 105, represented by the viewing cone, that defines the lower boundary 152 of received water spray from the nozzle 148 so that all generated water vapor rises and stays out of the field of view 105.

In some embodiments, the nozzles 148 may be positioned so that they do not spray water on the same side or underneath the imaging sensor 104. As such, the bottom point 154, or nadir, of the kiln 102 can mark the closest to the imaging sensor 104 that the water reaches so that the vapor does not travel to the side of the imaging sensor 104 and obstruct the field of view 105. That is, the area being sprayed is either above (boundary 152) the imaging sensor 104, on the opposite side of the kiln 102 from the imaging sensor, or below but directed to the opposite side of the kiln 102 so that the bottom point 154 prevents steam from passing through the field of view 105.

The selective positioning of the nozzles 148 to avoid vapor contaminating the IR reading of the imaging sensor 104 can allow for improved continuous monitoring of the kiln for hotspot detection and monitoring. Placing the imaging sensor 104 vertically above the water sprayer causes vapor contamination that effects the data and causes errors in the calculations for determining and monitoring the kiln temperature and hotspots. These errors are now avoided by selective placement of the nozzle 148 to avoid vapor contaminating the IR images. The nozzles 148 can be placed on the down side with respect to rotation, or be placed on the upside so that the kiln rotations upwardly past the sprayer.

Figure 1D:
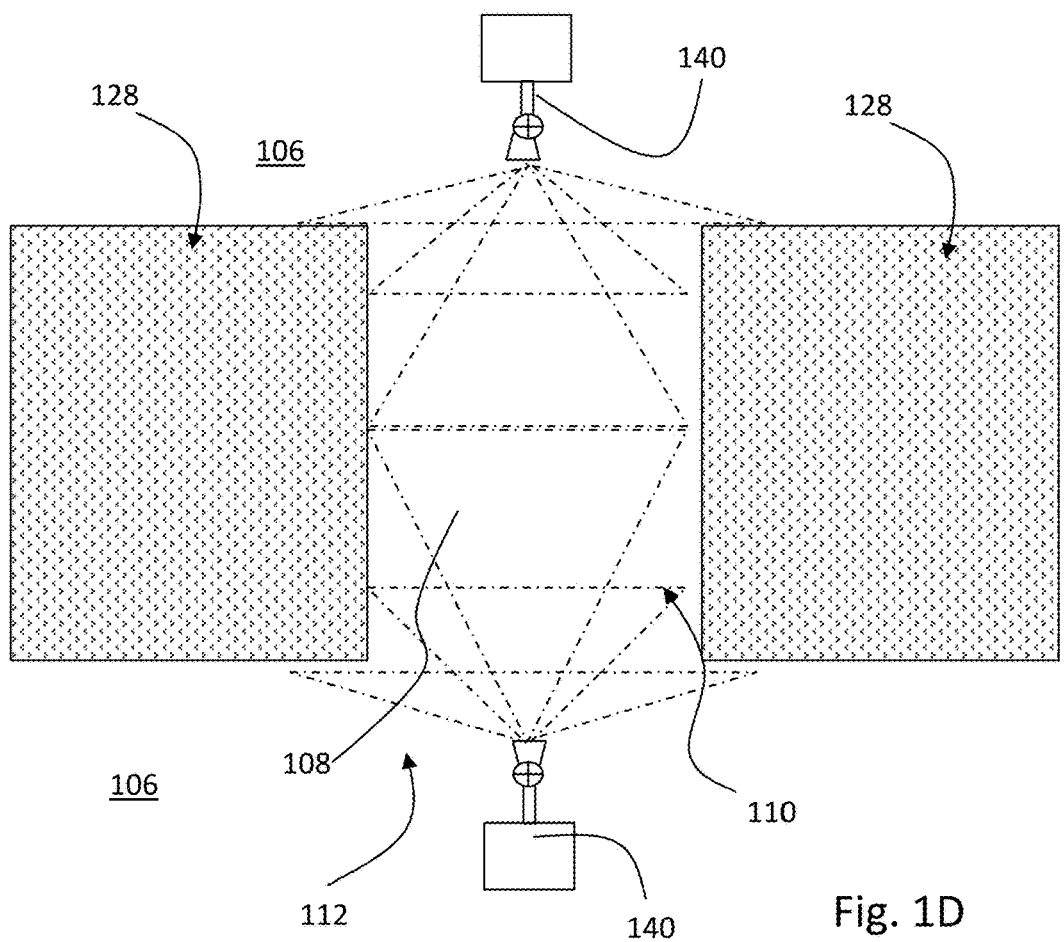
FIG. 1D shows a top view of the tyre gap with a cooling system.

FIG. 1D shows a top view of the gap 110 as defined by the tyre blocks 128, and gap surface 108, and showing the nozzle 148 of the cooling system 140 aimed at each gap opening 112, such as along a longitudinal tyre gap axis or longitudinally aligned with a longitudinal axis of the kiln 102. The nozzle 148 can have a spray direction that can be aligned with the longitudinal tyre gap axis, or at an angle thereof. However, angles, such as up to 10, 20, 30, or 45 degrees off longitude may be acceptable. This allows for spraying cooling water under the tyre ring 126 for better cooling of regions that may be susceptible to overheating and hotspots due to the thermal problems associated with the tyre assembly 124. In some instances, only one spray nozzle 148 is used for a gap 110, by spraying into one opening 112. However, sprayers may spray cooling water over a large percentage of the tyre gap surface 108, such 100%, 95%, 90%, 80%, 75%, 50%, 40%, 25%, or the like. This can improve cooling and temperature control of the kiln 102 and inhibit hotspot formation under the tyre assembly 124.

Figure 11A:
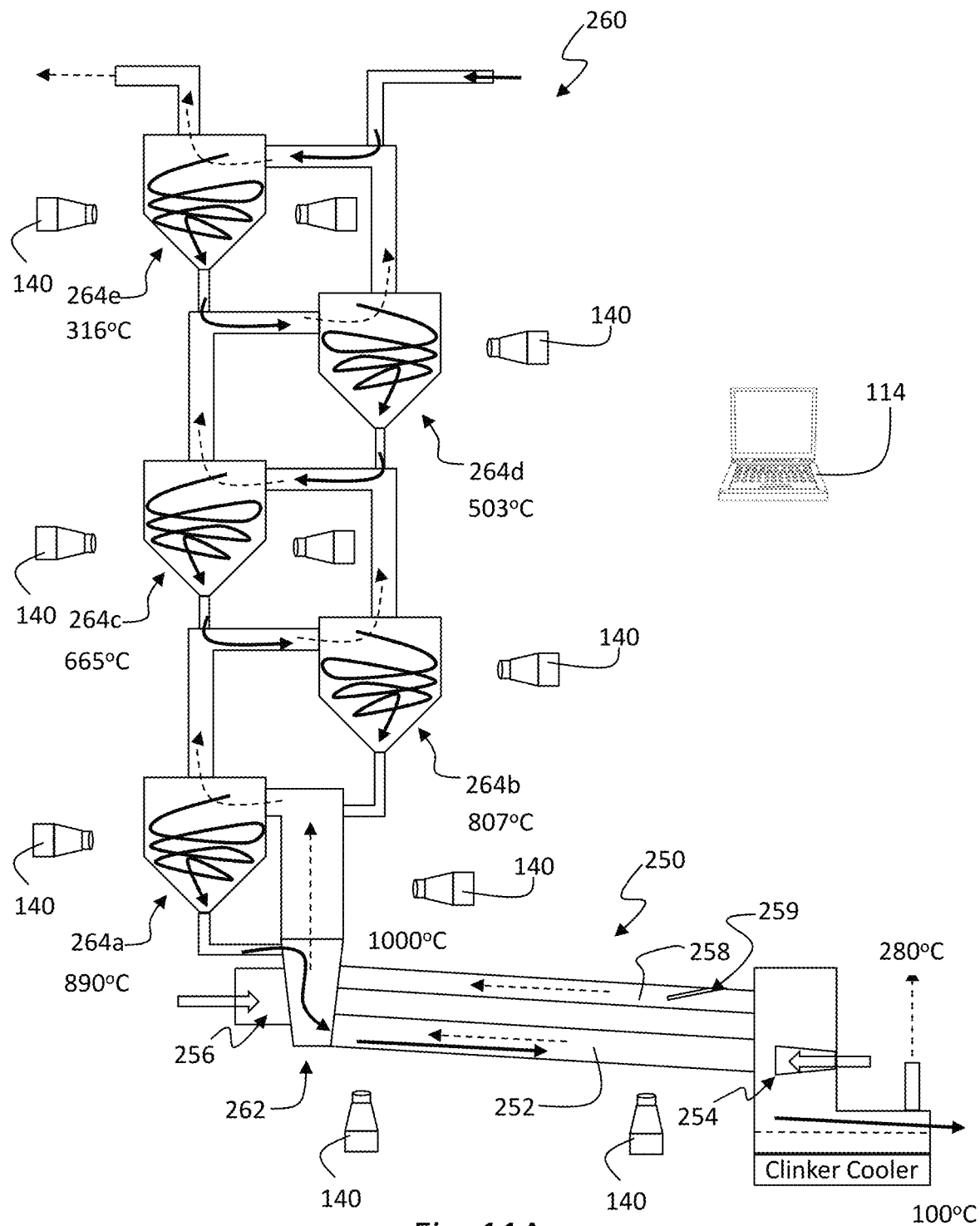
FIG. 11A shows a schematic representation of a preheater of a rotary kiln having a set of infrared imaging sensors.

FIG. 11A illustrates a kiln 250 and a preheater 260 for the kiln 250. The kiln 250 can be a rotary kiln that includes a main kiln conduit 252 that extends from a kiln burner 254 at the kiln outlet to a kiln inlet that has a calciner burner 256 that heats the preheater 260. Arrows show fuel entering into the kiln burner 254 and calciner burner 256 such that the output temperature can be controlled to a desired kiln temperature and a desired temperature at the base 262 of the preheater 260. The kiln 250 is shown to include a tertiary air duct 258 that provides heated air to the base 262 of the preheater 260. The base 262 of the preheater 260 is coupled to the kiln 250 and can include the calciner burner 256. The calciner burner 256 can provide heat to the preheater 260 that heats the different preheater levels 264a-c.

The preheater 260 is shown to include a first preheater level 264a that has a bottom material conduit feeding into the rotary kiln main kiln conduit 252. The first preheater level 264a is also coupled to a material conduit that has an upper end coupled to the upper end of the first preheater level 264a and a lower end at the base 262. The first preheater level 264a includes a connector conduit that connects the top of the first preheater level 264a to the top of the second preheater level 264b. The second preheater level 264b, third preheater level 264c, fourth preheater level 264d, and fifth preheater level 264e are similarly arranged as known in the art or preheaters. As such, each preheater level 265a-e includes a vessel, such as a cyclone vessel, that has the illustrated material and gas conduits. However, the fifth preheater level 264e includes a material inlet 266 and a gas outlet 268. The flow of gas is illustrated by dashed line arrows and the flow of material is illustrated by solid line arrows.

The preheater 260 is also shown to include at least one IR imaging device 140 for each preheater level 264a-c. Each IR imaging device 140 is operably coupled with an imaging processing computer 114, which can perform the IR image analysis as described herein to track the temperature of each preheater level 264a-c.

Example temperatures are provided for the kiln (e.g., 280° C. of gas outlet and 100° C. of material outlet), preheater base (e.g., 1000° ° C.), and preheater levels (e.g., 890° C., 897° C., 665° C., 503° C., and 316° C.). Accordingly, the preheater levels 264a-e cool the further away from the kiln 250 or calciner burner 256. As such, modulation of the temperature of the kiln 250 and/or calciner burner 256 can be used to modulate the temperatures of the preheater 260.

As such, when a low temperature is detected, the calciner burner 256 can increase the temperature at the base 262, which then incrementally level by level increases the temperature of each preheater. Also, the tertiary air duct 258 includes a damper 259 to control the flow rate of heated gas, which can also be controlled to provide more or less heat to the base 262 and to the first preheater level 264*a* to control the temperature of the preheater 260 level by level.

In some embodiments, a graphical preheater model can be generated for the preheater. The graphical preheater model can include a model of each preheater level as well as the conduits therebetween. Similar to the description regarding the 2D and 3D models of the rotary kiln, a 2D model of the preheater can also be generated that is used to generate a 3D model of the preheater. For example, each preheater level vessel and optionally the conduits can be identified and their dimensions input into a calculation to model generator to generate a virtual model. The dimensions can be suitable for all of the different shapes and sizes of the preheater level vessels and conduits. The model generator can generate a virtual model of the shape of each component of the preheater. Additionally, the IR images can be normalized and configured into a 2D model of each component or each preheater level vessel. The 2D image model can then be wrapped around or otherwise overlaid onto the 3D model of the preheater to provide a virtual 3D model of the temperature of the preheater and each preheater level thereof. The temperature data can be overlaid onto the 3D model in real time so that the display device can graphically display the preheater or the individual preheater levels. Accordingly, virtual 3D temperature model with the temperature data in real time can be displayed to an operator of the rotary kiln. The data may also be saved for later analysis. Any temperature variations that are not desirable can be identified in the IR data and then visually represented on the virtual 3D temperature mode.

In some embodiments, the location of the IR camera is known relative to the preheater level. Accordingly, a preheater model can include the actual IR cameras therein. As such, FIG. 11A can represent a 3D model (if in 3D) of the preheater with the preheater levels showing real time temperatures and the locations of the IR cameras. The 3D model can also be manipulated on the computer (114) to change the location thereof. This can allow for simulating or providing virtual changes before implementing the changes in the physical world.

In some embodiments, each preheater level can include one or more IR cameras. In some aspects, each preheater level includes only a single IR camera. The IR camera can record the IR data and provide the IR data to the image processing device that generates the images, maps, and models described herein. The temperature data can provide the temperature for a respective preheater level. The temperature data in the images can be displayed, such as shown for FIGS. 2-2A. The methods of FIGS. 3-4C can be performed to monitor the temperature and temperature variations of each preheater level.

In some embodiments, the palette of the preheater model and displayed images can be varied as needed or desired. The palette can be the same or different from the palette of the rotary kiln. The adjustability of the palette can be helpful to distinguish between certain components, identify certain features, or contrast with the kiln. However, the palette of the preheater model can be the same as for the kiln model to provide consistence to the operator and viewer.

In some embodiments, the region of interest can be included in a field of view of the IR camera for a particular level. The field of view can be the entire preheater level, or a portion thereof. This allows for recording the temperature data for each preheater level, from startup to any desired timepoint or until shutdown. A log or history of the temperature of each preheater can be included in a preheater level temperature profile. Each preheater level can be monitored separately due to the significantly different temperatures from the first preheater level to the last preheater level.

In some embodiments, an offset is allowed for the measured temperatures. The system can include an HD IR camera, portable or fixed, to image the different levels of the preheater. The HD IR data can be used to true up the observed temperature. This can allow for better temperature monitoring. As such, an HD IR camera can be used in calibrating the IR data from the fixed IR cameras to provide better temperature measurements. As described herein, the emissivity of each surface and the distance therefrom from the fixed IR camera can be used for improving the temperature measurements.

Figure 12:
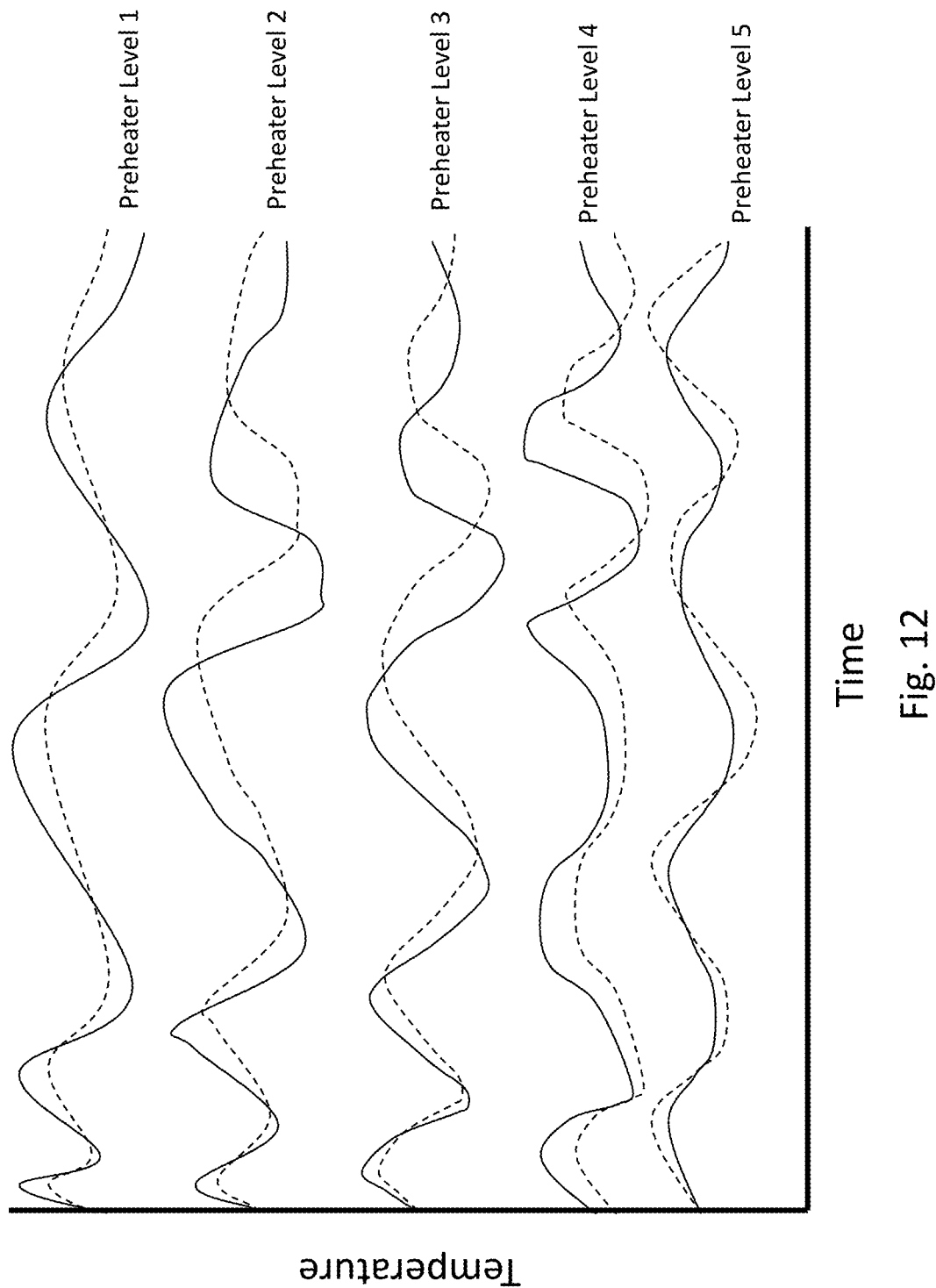
FIG. 12 includes a graph that shows a representation of temperature data for a preheater that can be displayed to an operator of the preheater and kiln.

In some embodiments, the system can monitor the temperature of each preheater level in real time. The temperature can be compared to selected prior timepoints or for historical periods. The temperature variation in the preheater level can be monitored for changes for a current day, compared to the previous day, compared to the same day in a prior week, and any trends can be identified. The temperature data for each preheater can be monitored in real time and displayed in a 3D model showing the temperatures (e.g., similar to FIGS. 2-2A). Also, the temperature data can be shown as a line graph that tracks the temperature in real time, such as shown in FIG. 12. As shown, each preheater level includes temperature variations. In some instances, the temperature variations cause the controller to increase temperature output from the heater to increase the temperature of the preheater levels. In some instances, the temperature variation peaks are a hot spot and the temperature decreasing protocol is performed, such as closing the kiln airduct damper or decreasing the heating in the heater at the base of the preheater. Also, a spraying protocol can be performed with each preheater level when the temperature reaches an upper threshold. The timeline can be as long as needed or desired.

In some embodiments, the system can be configured to receive input for a timeframe for comparison of the current temperature data to prior temperature data. The time comparisons can be entered by form fillable fields or by making selections of predetermined timeframes. Accordingly, a running comparison of a historical temperature to a real time temperature can be performed as shown by the dashed lines in FIG. 12.

This temperature data representation can also be used to compare the different preheater levels to each other. As shown, the temperature of each preheater level decreases in sequence, in part, due to the heater being by the first preheater level.

The IR cameras can monitor the preheater and kiln temperature to keep the surface within a temperature range as desired or needed, such as preventing hotspots. The cooling system can allow for an allowable temperature range to be set for one or more discrete areas, such as at any preheater level, along the casing shell or under the tyre assembly, where the IR cameras and sprayers can cooperatively operate to provide the temperature control. This allows for automatically cooling the preheater and/or kiln and specific locations to within a designated temperature range, which can prevent or inhibit hotspot formation of development. For example, the upper temperature of the kiln can be 330° C. and any temperature thereover can cause activation of the cooling system and water spray, which can be activated to reduce the temperature, such as to a lower threshold of about 260° C. before the cooling system is shut off. However, it should be recognized that the desired upper and lower temperature thresholds can be changed and set as desired. Accordingly, water vapor at 100° C. or higher (e.g., 150° C. superheated) is still cooler than the surface of the kiln, and thereby still provides cooling. This allows use of water vapor contacting and cooling the kiln 102.

Figure 8:
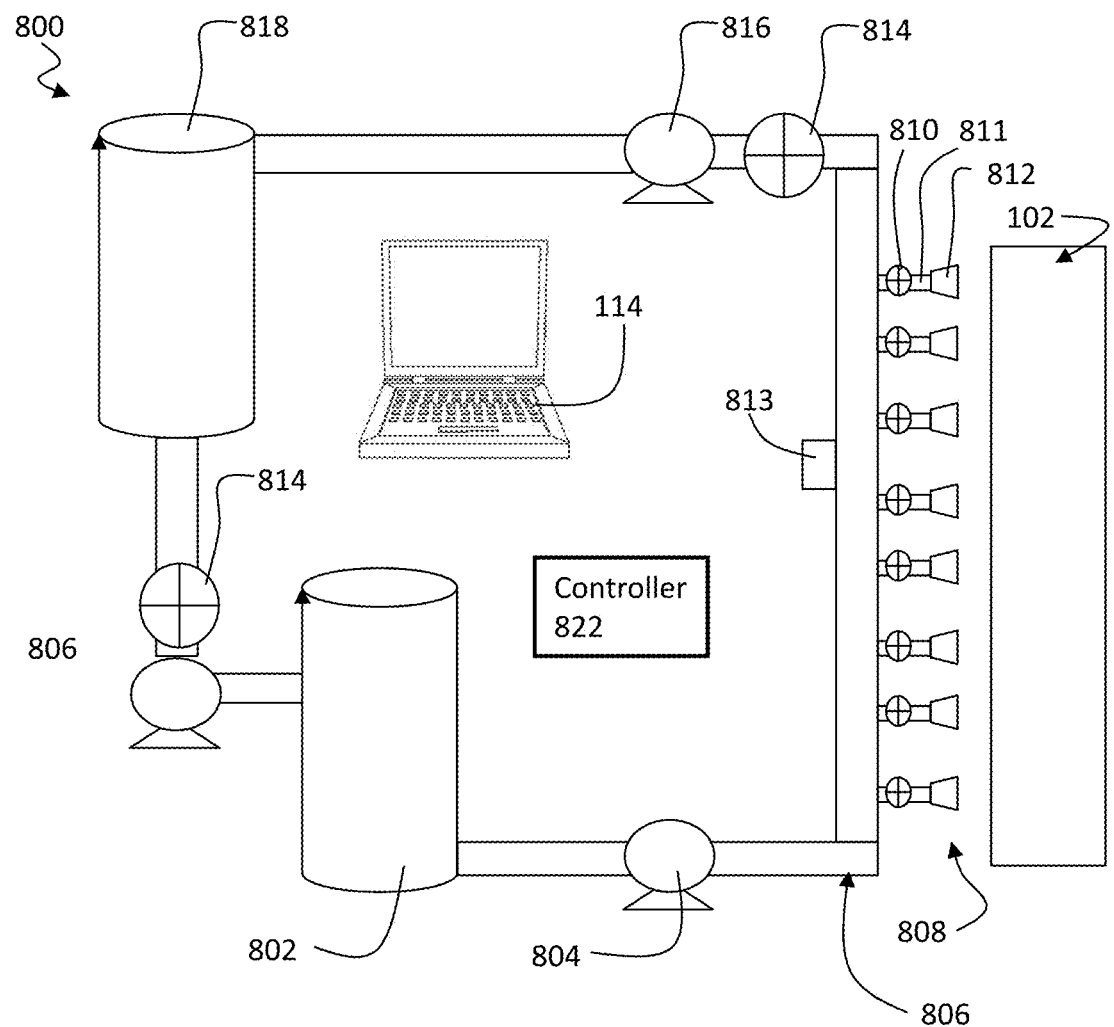
FIG. 8 includes a schematic representation of a cooling system that can be used and controlled by an IR monitoring system.

FIG. 8 provides an example of a cooling system 800 that can be used and controlled by the IR system as described herein. The cooling system 800 can include a water reservoir 802 that is fluidly coupled to a pump 804 or other pressurizing device that provides pressure to the water in the water reservoir 802 or being supplied therefrom. The pressurized water is supplied to a supply line 806 that is fluidly coupled to one or more sprayers 808. Each sprayer 808 can include a solenoid valve 810 or other fast action valve that can quickly open and close for selective water spray bursts of desired duration and spray pressure. Each sprayer 808 can include conduit 811 and a nozzle 812 at the end that can be pivotable or have a fixed trajectory. When pivotable, the nozzle 812 may be mounted to a motorized swivel or 3-axis motorized gimble or the like. The movable nozzle 812 allows for tracking a hotspot and spraying the cooling water onto the hotspot while it is moving past the nozzle, which allows for a longer duration of spray onto the hotspot compared to a fixed nozzle. The supply line 806 extends past all of the sprayers 808 so that the water can be continuously supplied to all of the sprayers 808. The number of sprayers 808 and dimensions of the supply line 806 can be modulated along with the pressure supplied by the pump 804 to control the amount of pressure received at an end sprayer 808 in order to satisfy the requirements. To help with maintaining pressure and allowing draining and removal of water, such as heated water (e.g., overheated or vaporizing water), from the supply line 806, a control valve 814 can be provided past the last sprayer 808. The control valve 814 can be selectively opened and closed to help build pressure and to allow water drainage. A thermocouple 813 may be associated with the line 806 and/or control valve 814 under control of the controller or computer, such that when the water in the line 806 reaches a certain threshold temperature, the control valve 814 opens and the line is purged and replaced with cooled water. Also, a recycle pump 816 can be included in the supply line 806 to pump water therefrom and pump the water to a water cooling system 818. The water cooling system can include a reservoir and active refrigeration components to chill the water to a desired temperature, such about 4° C., 10° C., 15° C., or 25° C. or any range therebetween or as economically feasible. A chilled water supply line 820 can provide the water to the water reservoir 802, which can also include a control valve 814 and recycle pump 816. However, the water reservoir 802 and the water cooling system 818 may be the same device reservoir. The nozzle 812 can be any type of nozzle, such as a flat fan nozzle, cone fan nozzle, jet sprayer, or other.

Figure 9:
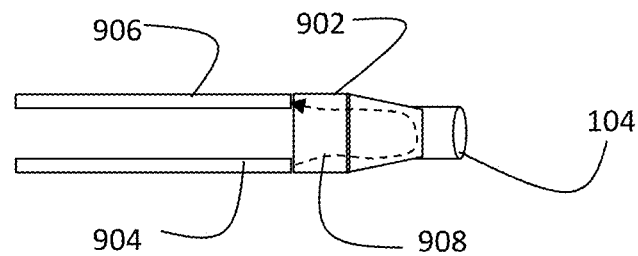
FIG. 9 includes a schematic representation of an imaging sensor that has a cooling housing.

FIG. 9 shows an imaging sensor 104 that has a cooling housing 902 that has a cooling fluid inlet 904 and a cooling fluid outlet 906, where a cooling fluid conduit 908 (e.g., shown by the dashed arrow) couples the fluid inlet 904 and fluid outlet 906. The cooling housing 902 can be fluidly coupled to a cooling system (e.g., FIG. 8) to provide cooling fluid for cooling the imaging sensor 104.

Figure 11B:
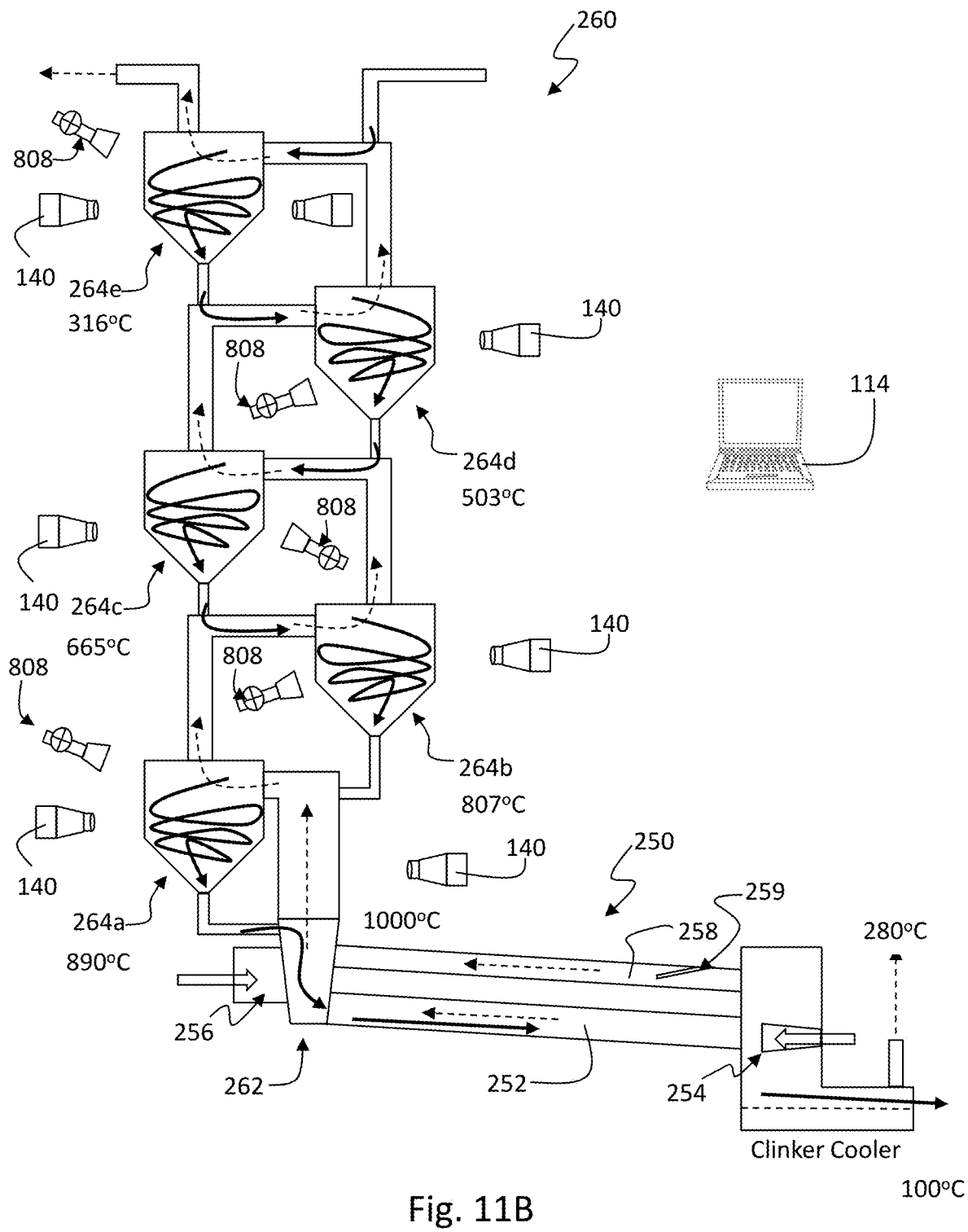
FIG. 11B shows a schematic representation of a preheater of a rotary kiln having a set of infrared imaging sensors and a cooling system for cooling hotspots or hot regions of the preheater.

FIG. 11B is the same as FIG. 11B with the addition of showing the optional sprayers 808 positioned relative to each preheater level 264*a-e*. However, the positioning may be modulated. It should be clear that a water supply is provided to each sprayer 808, such as shown in FIG. 8.

Figure 2:
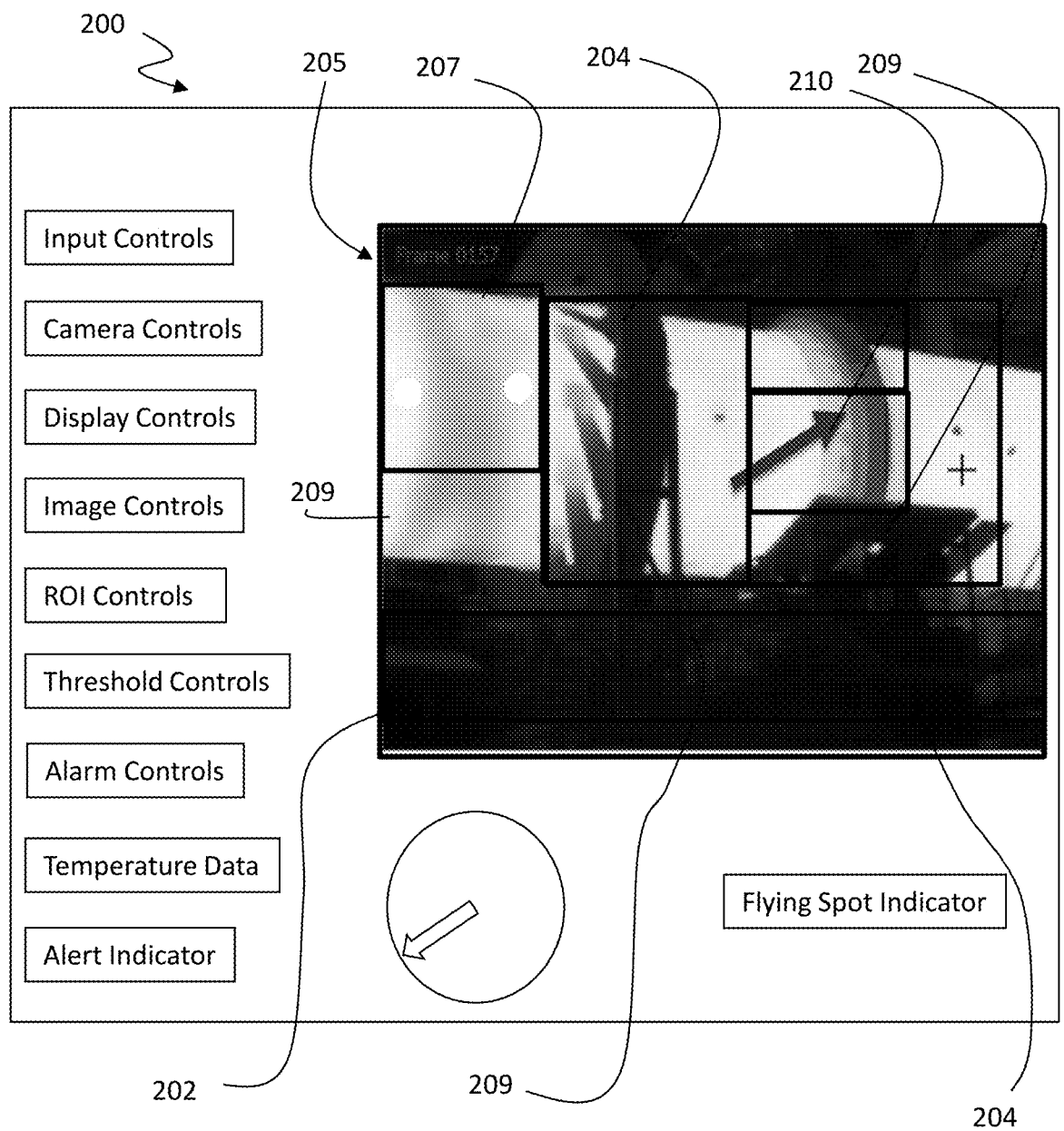
FIGS. 2-2A show a graphical user interface for monitoring images obtained from the imaging sensors.
Figure 2A:
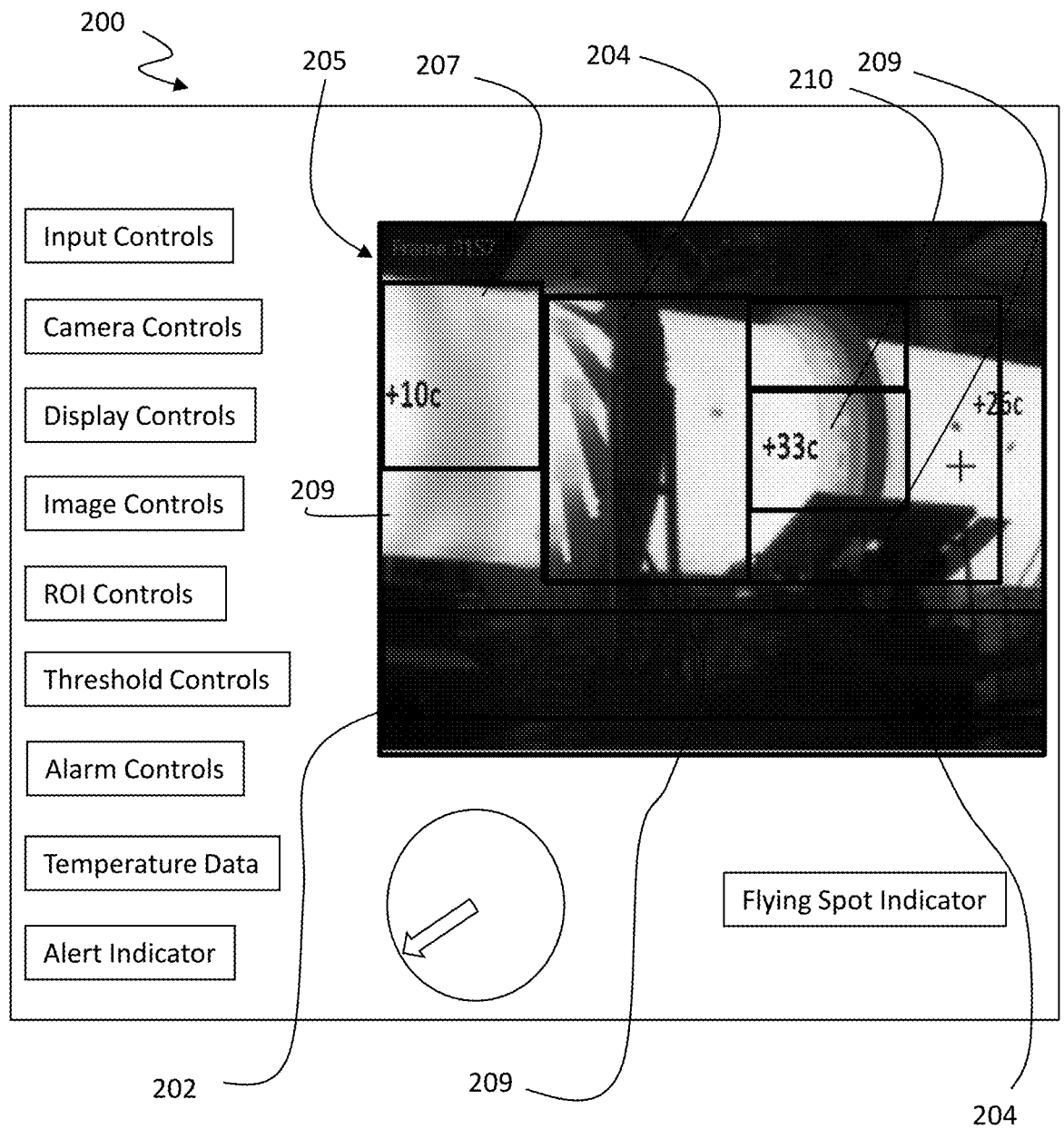

FIGS. 2-2A show a graphical user interface 200 for monitoring images 205 obtained from the imaging sensors 104 in order to determine whether or not a hotspot is present in the field of view. The data processing protocols can be performed by the imaging analysis computer 114 so that visual information in the graphical user interface 200 can be provided on the display 118 for an operator of the system 100. FIG. 2A shows temperature deviations compared to a historical reference for the defined area of the rotating kiln. However, the same interface can use images of the preheater, such as different preheater levels.

The images 205 can be parsed into non-kiln areas 202 and kiln areas 204 as well as preheater level areas when used. The image 205 can be parsed to show positive control areas 207 with a hotspot (white circle) and/or negative control areas 209 without any hotspots. Any of these may be labeled as a region of interest 210. The kiln is rotating so that each image (e.g., each frame) may have a unique region of interest 210, where each tyre gap can be identified and tracked. This allows or hotspots in the rotating kiln to be tracked as it rotates. This allows the hotspot to be followed as it moves across the FOV. This also allows for the region of interest 210 to be followed as the region rotates with the kiln rotation.

The images 205 can be parsed into one or more regions of interest 210 and identified by boundary indicators, such as a frame or window around each region of interest 210. The sequence of images can show the region of interest 210 moving along with rotation of the kiln. The regions of interest 210 can be determined by the operator and input into the imaging analysis computer 114, or by the imaging analysis computer 114 analyzing prior selected regions of interest 210 and determining pixels commonly present in the regions of interest 210 to be a region of interest (e.g., based on historical data from images 205). The larger arrow in the region of interest 210 may be set by an operator to point to features, such as a specific preheater level or a tyre gap, which may be selected for enhanced viewing. For example, a single tyre gap can be marked as the first tyre gap so that the rest of the tyre gaps can be labeled with alphanumeric identifiers for tracking.

In some aspects, the image 205 may be received from a single imaging sensor 104, such as at any one of the imaging sensor 104 locations shown in FIG. 1. In some aspects, the image 205 may be generated by stitching together two or more images from two or more imaging sensors 104, such as any two or more of infrared imaging sensors or infrared imaging sensors combined with visible spectrum cameras. The image or video stitching of images from multiple imaging sensors may be performed by any of the methods known in the art. For example, in some aspects, OpenCV may be used to perform video stitching. Some aspects may utilize Video Stitch Studio by Video Stitch of Paris, France. Other aspects may use other methods.

The graphical user interface 200 can include input controls, camera controls, display controls, image controls, region of interest (ROI) controls, threshold controls, and alarm controls in order to allow the operator to control substantially any aspect of the monitoring protocol. The operator can: select which camera or combinations of cameras are being displayed by the input controls, select the field of view with the camera controls, select how the image from the camera looks on the display with the display controls, select the scaling or other image adjustments with the image controls, select various ROIs with the ROI controls, select temperature thresholds for one or more pixels or groups of pixels in the images with the threshold controls, and select one or more alarm levels and alarm display types (e.g., audible and/or visible) with the alarm controls. Over time, the data input into the graphical user interface 200 can be monitored and registered with the imaging analysis computer 114, and the input data can be analyzed to determine an automated operating protocol that is performed automatically by the imaging analysis computer 114 based on historical operations. The operator can adjust any operational parameter on the fly to update the automated operating protocol. Each rotational position can be identified so that the rotation can be used so that the entire kiln circumference at a tyre can be fully monitored.

In some embodiments, the graphical user interface 200 also includes a scale indicator, a warning threshold control, and an alert threshold control. The scale indicator determines a graphical resolution of surface temperature ranges rendered within a region of interest of the image 205. For example, a smaller or narrower temperature range may provide an image that can communicate more fine detail between surface temperatures of the image (e.g., between a region with or without a hotspot).

The graphical user interface 200 can be operated by the warning and alert threshold controls being operated by an operator in order to set independent thresholds for warning indicators (e.g., possible hotspot) and alert indicators (e.g., critical hotspot detected). The example shown in FIG. 2 may provide a warning threshold at a temperature variation that indicates a small or lower temperature hotspot in one of the regions of interest, and an alert threshold at a large or higher temperature hotspot variation in one of the regions of interest. For the preheater, the warning and alert thresholds can be tailored to the preheater operating temperatures at the different preheater levels. That is, each level can have its own warning and alert threshold.

The graphical user interface 200 can also include a temperature variance status indicator, which can be shown as a probability of a hotspot (e.g., under a kiln surface) in a region of interest. The hotspot presence status indicator can include a minimum, maximum, and average temperature variance (e.g., shown as probability of a hotspot) currently detected within selected regions of interest 210, such as a known location susceptible to hotspots (e.g., tyre assembly) and a problem area with prior hotspots (e.g., positive control). The alert window shows alerts when the minimum, maximum, or average temperature variance (e.g., shown as probability of hotspot) shown in the status indicator for a pixel or area of associated pixels have exceeded either of the warning or alert thresholds. Different flashing lights (e.g., different color), alarm sounds (e.g., different volume or sound pattern or word notifications via speakers), or combinations may be provided to indicates newness or severity of a detected hotspot as well as a temperature variation in a preheater level. The cooling system can be activated, such as initiating a water spray sequence onto a hotspot, once a hotspot is detected with a temperature outside the allowable temperature variance. When a preheater level is too cool, the heating system can be increased to increase the temperature.

The graphical user interface 200 can also include a flying spot indicator (arrow in region of interest 210). The flying spot indicator provides an indication of a temperature or probability of a hotspot at a position (or pixel) in the image 205 that a pointing device may be hovering over. The preheater and rotating kiln can be monitored in real time by moving a mouse that moves the arrow, and the pixel(s) under pointed at by the arrow can be monitored for temperatures and possibility of hotspot.

Each region of interest 210, such as a preheater level, may include its own separate parameters, such as a scale indicator, warning and alert thresholds, temperature variance status, probability of hotspot indicator, cool region indicator, and others. By selecting each of the regions of interest 210 individually, the display of the graphical user interface 200 may switch so as to display parameters corresponding to the selected region of interest. This can allow for monitoring the different preheater levels separately, in groups, or all together. To edit one or more parameters for a region of interest, the region of interest is selected, for example, via a pointing device such as a mouse by clicking on the region of interest 210. The parameters corresponding to that selected region of interest are then displayed, and may be edited directly via the graphical user interface 200. It should be recognized that the region of interest 210 can move across the screen by the rotation of the kiln being matched with the movement of the region of interest 210 frame across the image 205.

As discussed above, in some aspects, the image 205 may be generated by stitching together images captured by multiple imaging sensors 104. Graphical user interface 200 can be modified providing for the management of images from multiple imaging cameras 104. A graphical user interface 200 can include a camera selection field, region name field and link to region field. The camera selection field allows a user/operator to select between a plurality of imaging sensors, such as imaging sensors 104, that may be under control of, for example, the image analysis computer 114. When a particular imaging sensor 104 is selected in the camera selection field, the image 205 shown in the graphical user interface 200 may be received from the selected camera. In a particular embodiment, each region of interest shown in the image 205, such as the regions of interest 210, may be imaging sensor specific. In other words, the system 100, or more specifically the image analysis computer 114, may maintain separate parameters for each imaging sensor 104 utilized by the system 100. The separate parameters may include the number, names (sec below) and configurations of regions of interest for each imaging sensor, warning and alert levels for each region of interest, and any linking between regions of interest (e.g., adjacent preheater levels), both within an image captured by one imaging sensor or across multiple images captured by multiple imaging sensors. A list of imaging sensors available for selection in the camera selection field may be generated based on configuration data providing the list of imaging sensors and indications of how imaging data may be obtained from the listed imaging sensors.

The region name field allows each region of interest 210, such as those with common hotspots or known hotspots or specific tyre block or specific tyre gap or a specific preheater level, to be named by an operator to allow for easy tracking and monitoring (e.g., first preheater level). A specific hotspot can be monitored as it moves across the FOV by monitoring the pixels indicative of the hotspot in each image or frame, so that the hotpot appears to move across the pixels along with the rotation of the kiln when viewing a sequence of the images. The value in the region name field may change as each region of interest 210 is selected so as to display a name associated with the selected region of interest. Thus, region name field may be a read/write field, in that a current value is displayed but can be overwritten by an operator, with the overwritten value becoming the new current value. Regions that may not have a hotspot can be named as controls so that the temperature variance is determined with known surfaces without hotspots. Each tyre gap may be labeled as a unique region of interest, such as in each image or frame, such that the tyre gaps can be monitored with the rotation of the kiln.

Figure 6:
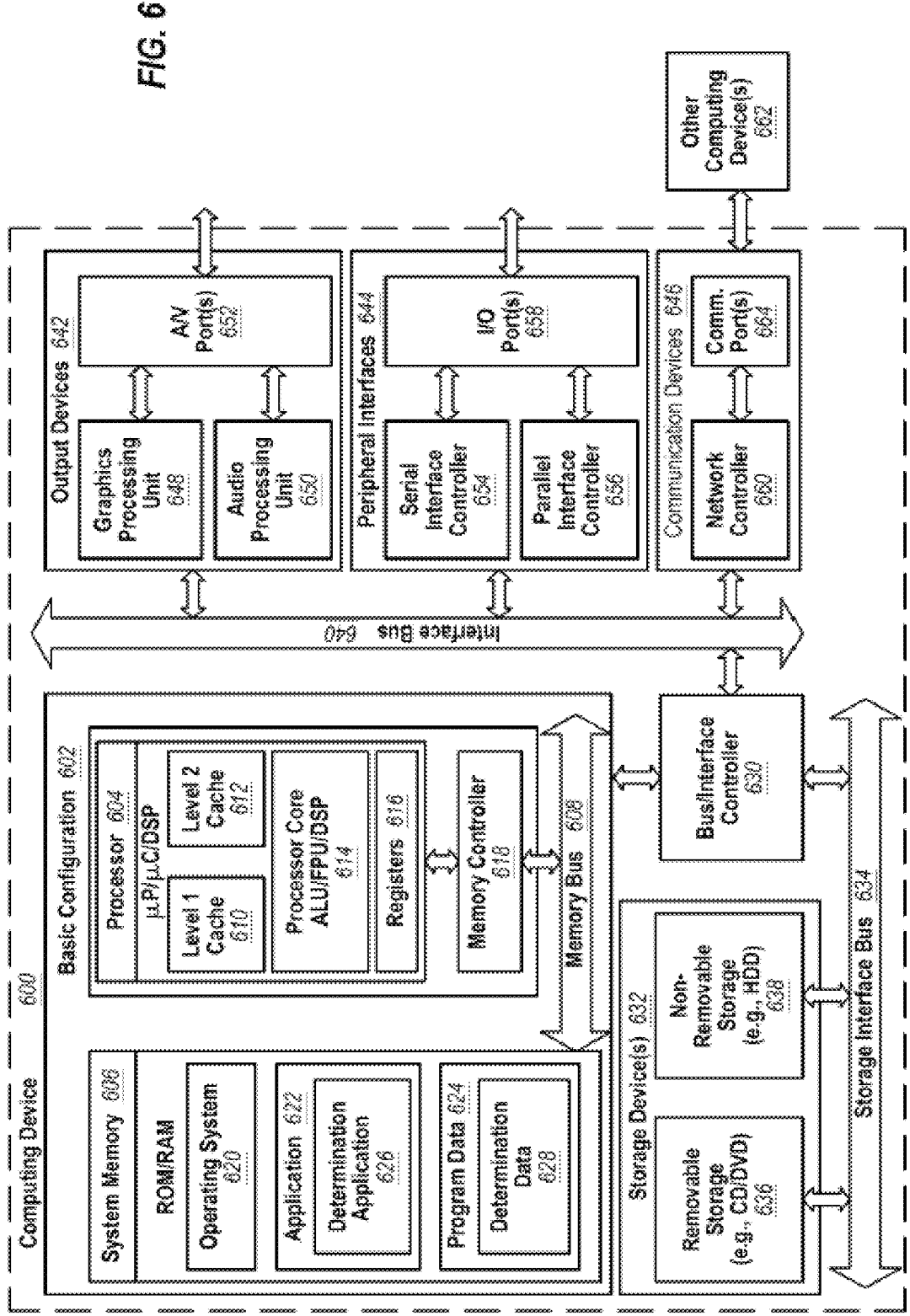
FIG. 6 shows an example computing device (e.g., a computer) that may be arranged in some embodiments to perform the methods (or portions thereof) described herein.

The image analysis computer 114 can be provided in various configurations from standard personal computers to cloud computing systems. FIG. 6, described in more detail below, provides an example of an image analysis computer 114, and includes the features of a standard computer. The image analysis computer 114 may communicate with the imaging sensors 104. For example, the image analysis computer 114 may be configured to transmit one or more configuration parameters to one or more of the imaging sensors 104, and command the imaging sensors 104 to capture one or more images. The image analysis computer 114 may further be configured to receive digital images from the imaging sensors 104, capturing different perspectives of a scene or environment.

The image analysis computer 114 may store instructions that configure the processor to perform one or more of the functions disclosed herein. For example, the memory may store instructions that configure the processor to retrieve an image from the imaging sensor(s) 104 and display the image on the electronic display 118. The memory may include further instructions that configure the processor to define one or more regions of interest in one or more images captured by one or more imaging sensors 104, and monitor temperatures, temperature variances, or possibility of a hotspot being present in the regions of interest through successive images captured from the imaging sensor(s) 104. In some aspects, the memory may include instructions that configure the processor to set warning and/or alert threshold values for temperatures within one or more regions of interest defined in the image(s) of the scene or environment or defined or fixed fields of view of each camera, and generate warnings and/or alerts that a hotspot may be present or is present when those threshold values are exceeded. The alert may be in the form of a water spray from the cooling system.

Figure 3:
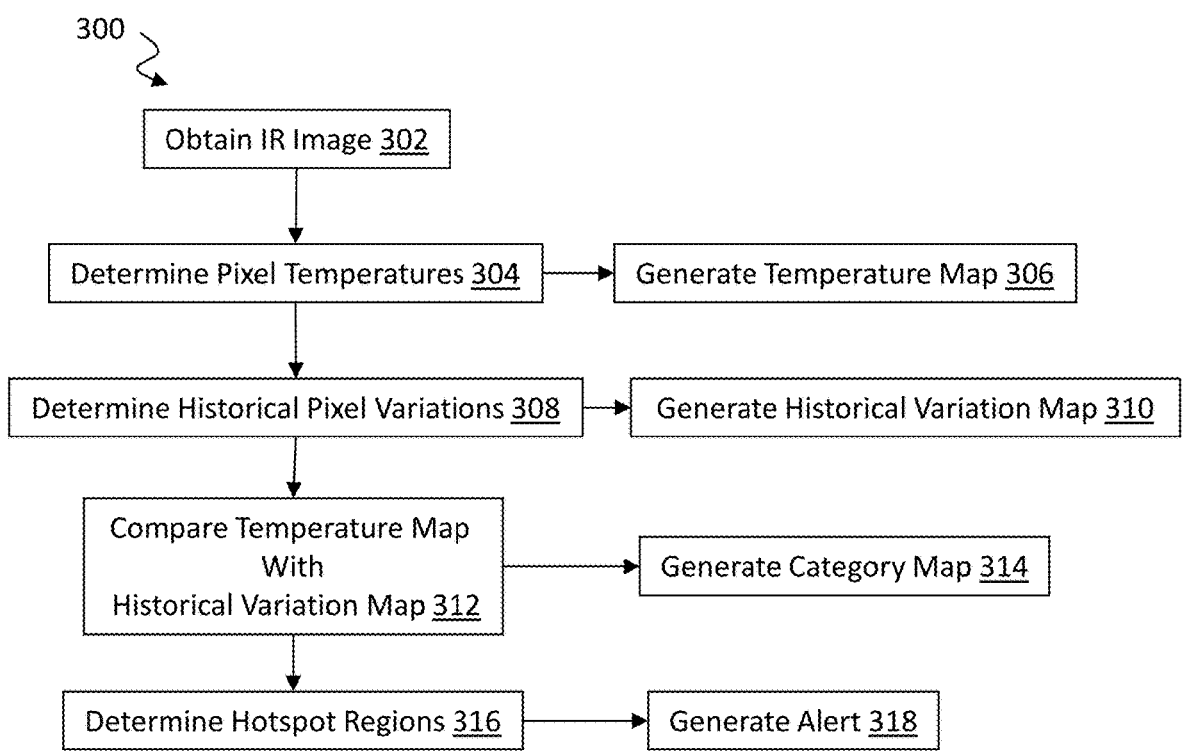
FIG. 3 is a flow chart of a process of one exemplary embodiment of the methods for detecting hotspots that can be performed by the embodiments of the systems disclosed herein.

FIG. 3 is a flow chart of a process 300 of one exemplary embodiment of the methods for detecting a hotspot on a preheater level and/or rotating kiln that can be performed by the embodiments of the systems disclosed herein. The process can include obtaining an IR image (step 302) from the image data from the imaging sensors 104, which can be stitched together to form an image 205. In some aspects, the image 205 may be generated based on image data from only a single imaging sensor, or more than two imaging sensors. The image 205 includes an array of pixels, each pixel having a pixel value. Each image can be of a specific rotational position so that a specific discrete (e.g., specific tyre gap) location is present in the image (e.g., at a specific time or specific rotational position). Each pixel value represents light captured at a position corresponding to the pixel's location within the pixel array. The field of view may be fixed, and thereby each pixel can have a defined pixel location in the array that corresponds to a surface of the field of view at a specific rotational position of the kiln or specific preheater level. Due to rotation of the kiln, each rotational position can have a unique region of the kiln being imaged, where the series of images can track a specific location of the kiln as it rotates with the rotation of the kiln. The preheater and the preheater levels are static, and the cameras can be imaged at any region of a preheater level. The image 205 is then processed to determine pixel temperature values (step 304), which determines temperatures for each pixel based on the pixel values in the image 205. The process can create a temperature map for each image (step 306), such as for each rotational position of kiln or each preheater level, where each pixel in the temperature map has a corresponding pixel temperature data. In some aspects, for each pixel value in the image 205 (e.g., at specific rotational position), there is a corresponding temperature value in the temperature map. A temperature map can be generated for each IR image, and thereby for each rotational position of the kiln or each preheater level.

The process can analyze the temperature values included in the temperature maps across at least two images (e.g., two images of the same rotational position, such that a specific discrete location of the kiln of specific preheater level is in the same pixel location in the two images), and preferably across a plurality of images over time, in order to identify a historical temperature variance for each pixel (step 308) for each rotational position or each preheater level. The images that are analyzed together can be of the same rotational position of the kiln or same preheater level, and thereby of the same tyre gap(s). This provides a range of historical temperatures, a historical temperature variance, over time for a specific tyre gap to show how the temperature of each pixel can vary over time when there is no hotspot for the pixel at the specific rotational position of the kiln.

For example, a first pixel may represent a first surface of the kiln at a specific rotational position or specific preheater level, and the temperature of that surface can vary due to changing ambient temperatures, such as throughout the day, or across weeks, months, or seasons. The surface temperature for a specific area (e.g., specific tyre gap or preheater level) is allowed to vary without there being an indication of a hotspot, such as by varying within an allowable variation in temperatures. The historical variation of pixel temperatures for each pixel at a specific rotational position or specific preheater level are aggregated to produce a historical temperature variation map (step 310) that includes an allowable range of temperatures for each pixel at that rotational position or each preheater level. The same rotational position is compared across different images, and thereby across rotations. Similarly, the same preheater level is compared across different images.

The temperature variation map may include a value or range of values for each temperature variation for each pixel in the temperature map. As such, the historical variation map (310) shows the historical temperature variation over a time period for a specific rotational position and thereby a specific tyre gap or specific preheater level. The temperature map, for a current IR image, is then compared to the historical variation map, such as by each pixel in the temperature map being compared to the corresponding pixel in the historical variation map (step 312) for the specific rotational position (e.g., specific tyre gap) or specific preheater level. The comparison results in the current temperature for a pixel being less than, the same, or greater than a value in the historical variation map to generate a category map (Step 314). When the current temperature for a pixel is greater than a value in the historical variation map, the pixel is categorized as abnormal (e.g., hotspot or cool region) in the category map. Otherwise, when the current temperature is less than or the same as the values in the historical variation map, the pixel is categorized as normal (e.g., no hotspot or cool region). Each value in the category map may indicate whether a corresponding temperature value in the temperature map is within a normal range or is categorized as abnormal with respect to the historical variation map, which includes data for each pixel for the allowable variation in temperature for the specific rotational position or specific preheater level. When categorized as abnormal, the process can determine whether there is a hotspot region by linking adjacent pixels that are categorized as abnormal (step 316). After the category map is generated one or more abnormal regions are determined to be hotspot regions by processing the data. Based on the abnormal regions being hotspot regions, the process 300 can generate one or more alerts (step 318). While process 300 is serialized in the preceding discussion, one of skill in the art would understand that at least portions of process 300 may be performed in parallel in some operative embodiments. The same principles can apply to cool regions that may occur in a preheater level.

Figure 4:
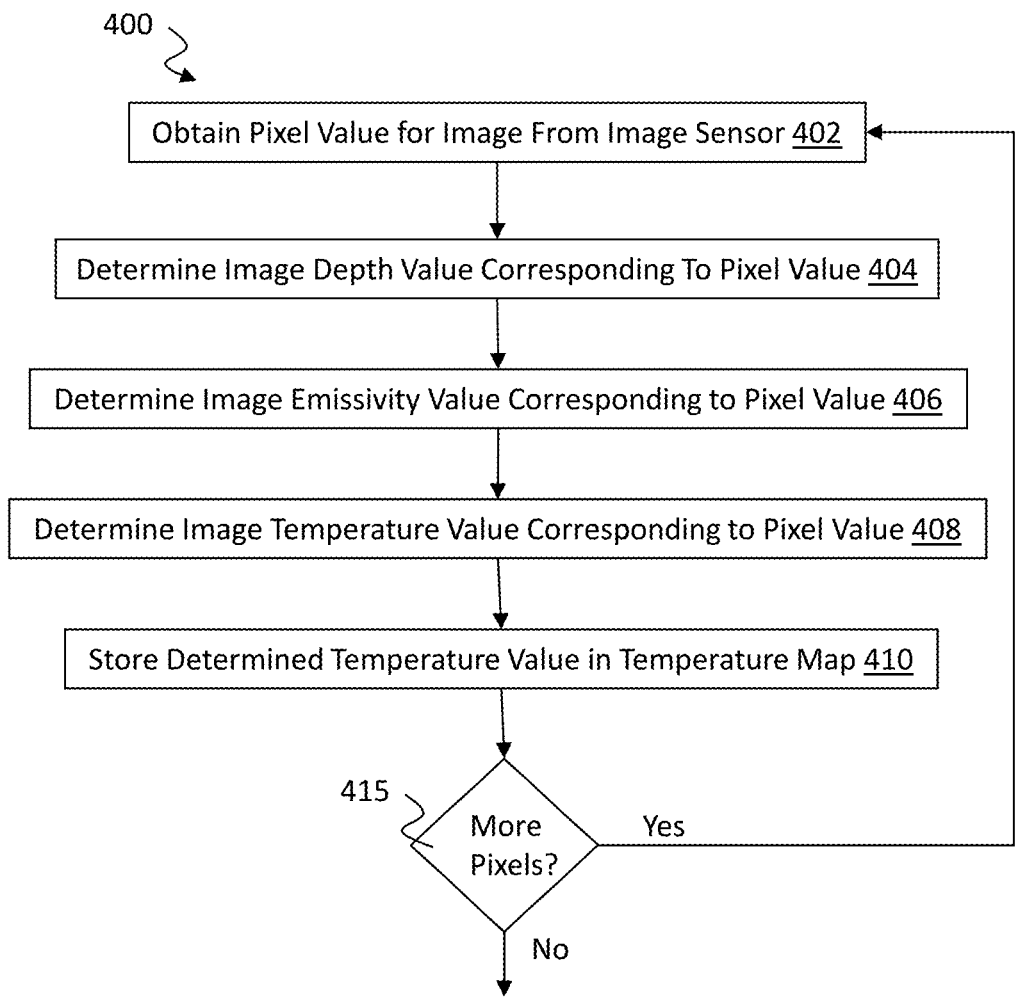
FIG. 4 is a flowchart of a process of one exemplary embodiment of a method for determining temperature values for pixels in an infrared image that can be performed by the embodiments of the systems disclosed herein.

FIG. 4 is a flowchart of a process 400 of one exemplary embodiment of a method for determining temperature values for pixels in an infrared image that can be performed by the embodiments of the systems disclosed herein. In block 402, a pixel value for an image from an infrared sensor is obtained. In some aspects, the image may be captured from one of the imaging sensors 104, discussed above with respect to FIG. 1. In some aspects, one or more of the imaging sensors 104 may record wavelengths of light between 700 nanometers and 1 mm (infrared wavelengths) along with intensity, brightness, or other light parameter, and represent the captured light as a digital image with each pixel having pixel data (e.g., pixel value). The pixel value received in block 402 may be one pixel value from an array of pixel values included in the captured image, where each pixel can include its own pixel value. This can be done for an image for each rotational position of the rotary kiln or specific preheater level.

In block 404, a depth value corresponding to the pixel value is obtained for the pixel (or each pixel) in the corresponding image. In some aspects, the depth value may be obtained from a depth map of the image. The depth map may be obtained, in some aspects, via a ranging device, such as a radio detection and ranging (RADAR) or light and radar or LIDAR device. In some aspects, the depth map may be obtained using structured light. The depth map may be obtained by known methods, and may be used due to the fixed field of view, where each pixel can be mapped with the distance to the surface in the fixed field of view that corresponds with the pixel. It should be recognized that the depth value for some pixels will be different from other pixels of the same image due to the imaging sensor being at an angle relative to the surface of the kiln or preheater component. In an example, the distance of each pixel to each region being imaged can be used for all of the pixels for normalizing the size of each pixel, which can then allow for the pixels to generate a rectangular 2D image.

In block 406, an emissivity value corresponding to the pixel value is obtained. As such, each rotational position can be considered for the emissivity of the image for that specific rotational position. In some aspects, the emissivity value may be based on a setting of the imaging sensor referenced in block 402. For example, in some aspects, the imaging sensor may be configured to capture objects of a given emissivity for each pixel. That is, a surface that corresponds to a pixel can have an emissivity value, and thereby tracking the rotational position of the kiln can be important. This emissivity value may be used in block 406. In some aspects, an object database may include the emissivity of known objects or regions of the kiln for specific rotational positions or for the specific preheater levels. In some aspects, an emissivity value of an object or region being searched for in the image may be used. For example, in some aspects that may be imaging a specific tyre gap, an emissivity of the kiln surface at the tyre gap may be used for the pixels that correspond therewith. The tyre blocks may have a different emissivity. This allows for the image to include a plurality of surfaces, and each pixel can correspond to a specific surface with the specific emissivity of that surface. As such, emissivity for various objects (e.g., from surface of the kiln and tyre assembly or different preheater levels) can be obtained, where the objects can be concrete, gravel, metals, plastics, rubber, or other industrial surfaces. This emissivity value may be configured by an operator in some aspects.

In block 408, a temperature value corresponding to the pixel value is determined based on the corresponding depth value and emissivity value. In some aspects, block 408 may include translation of a raw value from the imaging sensor into a power value. For example, in some aspects, the imaging sensor may provide imaging values in digital numbers (DNS). In some aspects, the power value may be determined using Equation 1:

Power=(Raw Signal Value−Camera Offset)/Camera Gain     (1)

A signal value may be determined by Equation 2 below:

Signal=$K_1$×power−$K_2$, wherein:

$$K_1 = \frac{1}{t_{atm} \times \text{Emissivity} \times ExtOptTransm}$$

$$K_2 = \frac{1-\text{Emissivity}}{\text{Emissivity} \times AtmObjSig} + \frac{1-t_{atm}}{\text{Emissivity} \times t_{atm} \times AtmObjSig} + \frac{1-t_{atm}}{\text{Emissivity} \times t_{atm} \times ExtOptTransm \times ExtOptTempObjSig}$$

$t_{atm}$ is the transmission coefficient of the atmosphere between the scene and the camera, and is a function of spectral response parameters, object distance, relative humidity, etc.

ExtOptTransm is the External Optics Transmission and is the transmission of any optics (e.g., a protective window) between the object being imaged and the optics of the imaging sensor. The external optics transmission is a scalar value between zero and one. External optics that do not dampen the measurement have a value of one, and optics that completely sampan the measurement have a value of zero.

ExtOptTempObjSig is the temperature of any optics (e.g., a protective window) between the object being imaged and the optics of the camera. AtmObjSig is the temperature of the atmosphere.

Emissivity is the emissivity of the object whose temperature is being determined.

To convert the signal calculated via Equation 2 into a temperature, some implementations may use Equation 3:

$$\text{Temperature} = \frac{B}{\log\left(\frac{R}{\text{Signal}} + F\right)} \quad (3)$$

where B, R, and F may be calibration parameters retrieved from the imaging sensor. The temperature may be in Celsius or Kelvin.

Also, a model for the total radiation $W_{tot}$ incident on the imaging sensor can be determined by the following Equation 4 by:

$$W_{tot} = \varepsilon_{obj}\tau_{atm}\tau_{extopt}W_{obj} + (1-\varepsilon_{obj})\tau_{atm}\tau_{extopt}W_{amb} + (1-\tau_{atm})\tau_{extopt}W_{atm} + (1-\tau_{extopt})W_{extopt} \quad (4)$$

In this equation, the $\varepsilon_{obj}$ is the emissivity of the object being imaged; $\tau_{atm}$ and $\tau_{extopt}$ are the transmittance of the atmosphere and external optics, respectively; and $W_{obj}$, $W_{amb}$, $W_{atm}$, and $W_{extopt}$ are the radiation from the object, ambient sources, atmosphere, and external optics, respectively. The emissivity $\varepsilon_{obj}$ of the object is known or assumed prior to imaging the object. The transmittance $\tau_{atm}$ of the atmosphere is a function of the measured relative humidity $\phi$ and temperature $\tau_{atm}$ of the atmosphere, and the measured distance $d_{obj}$ from the sensor to the object. The transmittance $\tau_{extopt}$ of the external optics is typically estimated during a calibration procedure that occurs prior to imaging the object.

Given the temperature $T_{obj}$ of the object, and the measured temperature $T_{amb}$ of the ambient sources, temperature $T_{atm}$ of the atmosphere, and temperature $T_{extopt}$ of the external optics; the radiation $W_{obj}$ from the object, radiation $W_{amb}$ from the ambient sources, radiation $W_{atm}$ from the atmosphere, and radiation $W_{extopt}$ from the external optics, respectively, are calculated using Planck's law, which describes the radiation W emitted at wavelength $\lambda$ by a black body at temperature T and is given by Equation 5.

$$W = \frac{2\pi hc^2}{\lambda^5} \frac{1}{\exp\left(\frac{hc}{\lambda k_B T}\right) - 1} \quad (5)$$

In Equation 5, h is the Planck constant, c is the speed of light in the medium (a constant), and $k_B$ is the Boltzmann constant.

Additionally, the IR camera maps the total radiation $W_{tot}$ to image intensities (i.e., pixel values) $I = f(W_{tot})$ under the radiometric response function $f$ of the camera, which is typically estimated during a calibration procedure that occurs prior to imaging the object.

The above model of the image formation process may be used to solve for the temperature $T_{obj}$ of the object, given all of the other variables, as follows. Given an image I of intensities acquired by the camera, the total radiation $W_{tot} = f^{-1}(I)$ (i.e., image intensity maps to incident radiation under the inverse of the camera response function). Then, solving equation 1 for the radiation $W_{obj}$ from the object yields Equation (6).

$$W_{obj} = \frac{W_{tot} - [(1-\varepsilon_{obj})\tau_{atm}\tau_{extopt}W_{amb} + (1-\tau_{atm})\tau_{extopt}W_{atm} + (1-\tau_{extopt})W_{extopt}]}{\varepsilon_{obj}\tau_{atm}\tau_{extopt}} \quad (6)$$

Then, Equation 6 is solved for the temperature $T_{obj}$ of the object as Equation 7.

$$T_{obj} = \frac{hc}{\lambda k_B} \frac{1}{\log\left(\frac{2\pi hc^2}{\lambda^5 W_{obj}} + 1\right)} \quad (7)$$

In block 410, the determined temperature value is stored in a temperature map, such as in step 306. The temperature map may be used as input for one or more of the processes discussed herein. A temperature map may be a data structure that stores temperature values for at least a portion of pixels in an image or region of interest. In some aspects, the temperature map may be stored in the memory of the image analysis computer 114. Each pixel can have a temperature range in the temperature map, wherein the temperature range is based on temperatures for the specific pixel over the historical time period.

Decision block 415 determines whether there are additional pixels to process in the image (or region of interest). If there are additional pixels, processing returns to block 402. Otherwise, processing continues in order to determine whether or not a hotspot is present in any of the images.

Figure 4A:
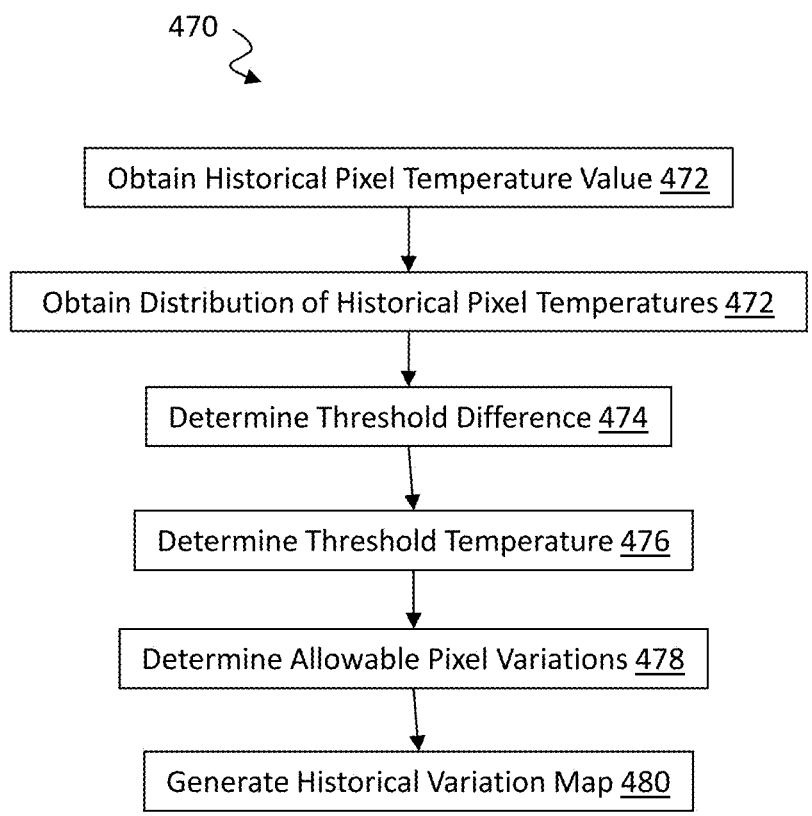
FIG. 4A is a flowchart of a process for generating a historical variation map.
Figure 4A:
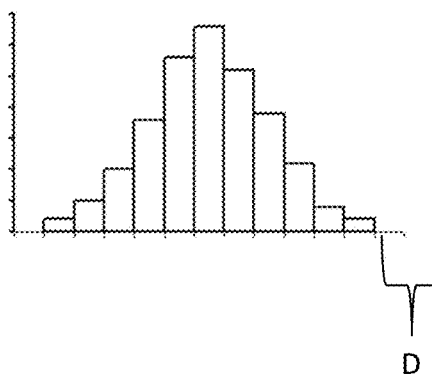

FIG. 4A includes a flow chart of a process 470 of generating a historical variation map for the variation in temperatures for each pixel. The process 470 can include obtaining a plurality of historical pixel temperatures for a first pixel (step 472), which can be done for an image for each rotational position or each preheater level. The plurality of historical pixel temperatures for a first pixel are grouped in a distribution of historical pixel temperatures for the first pixel (step 474). A threshold difference (D) is determined based on the distribution of historical pixel temperatures (step 474), wherein the threshold difference D is the maximum allowed difference from the distribution of historical pixel temperatures that the pixel can have based on the historical temperature data for that pixel. The threshold difference D is then combined with the distribution of historical pixel temperatures to determine the threshold temperature (TT) (step 476). The threshold temperature TT is then combined with the distribution of historical pixel temperatures to determine an allowable difference in temperature, which allowable difference in temperature is set as the historical variance in temperature (step 478). The historical variation map can then be prepared to include the allowable difference in temperature or the historical variance for each pixel (step 480). The process can analyze the temperature values included in the temperature maps across at least two images (e.g., of the same rotational position), and preferably across a plurality of images over time, in order to identify a historical temperature variance for each pixel (step 308). This provides a range of historical temperatures, a historical temperature variance, over time to show how the temperature of each pixel can vary over time when there is no hotspot or elevated temperature for the pixel. For example, a first pixel may represent a first surface, and the temperature of that surface can vary due to changing ambient temperatures, such as throughout the day, or across weeks, months, or seasons. The surface temperature is allowed to vary within a defined variance without there being an indication of a hotspot, such as by varying within an allowable variation in temperatures. The historical variation of pixel temperatures for each pixel are aggregated to produce a historical temperature variation map (step 310) that includes an allowable range of temperatures for each pixel. The temperature variation map may include a value or range of values for each temperature variation for each pixel in the temperature map. As such, the historical variation map shows the historical temperature variation over a time period. This can be done for each rotational position, such that the specific surfaces in the field of view for the rotational position are tracked and mapped together. Also, this can be done for each preheater level.

Figure 4B:
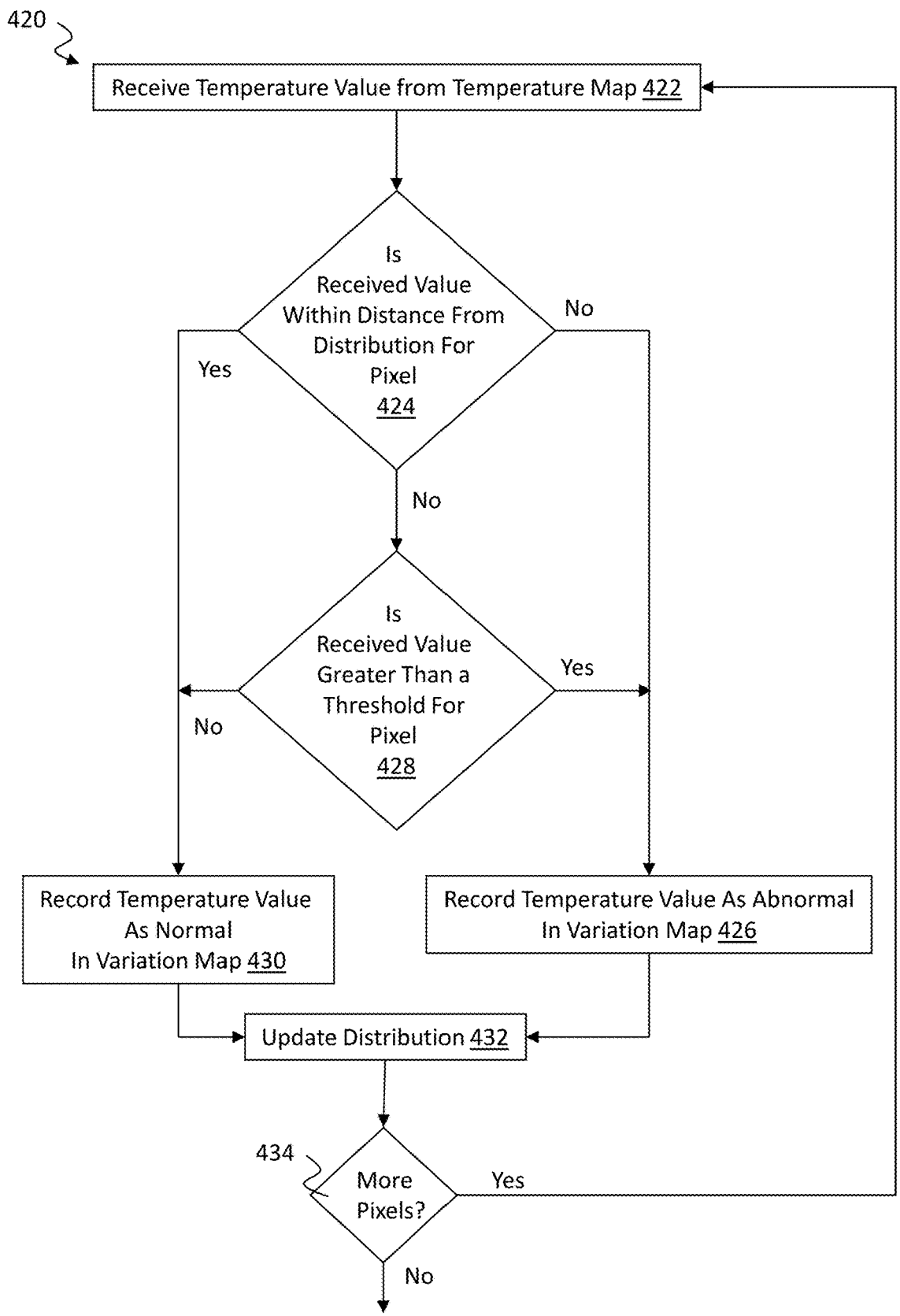
FIG. 4B includes a flowchart of a process of generating a category map for the variation in temperatures for each pixel.

FIG. 4B includes a flow chart of a process 420 of generating a category map for the current temperatures for each pixel based on the historical variation of each pixel.

The historical variation map may indicate acceptable ranges of pixels that are within a normal range (e.g., no hotspot) and unacceptable ranges of pixels that are outside the normal range (e.g., hotspot is present). The pixels outside the normal range can be analyzed to determine whether or not they include a hotspot in the kiln.

In the illustrated embodiment, process 420 utilizes two different approaches to determine whether a pixel is within a "normal" temperature range. A first approach compares a temperature value to a statistical distribution of pixel temperatures based on historical values for the same pixel to determine a temperature variance (e.g., historical variation map), such as the same pixel of the same surface in a specific rotational position of the kiln across a series of images of that same surface in the specific rotational position. This also applies to series of images of each preheater level. In most embodiments, a first pixel or first group of pixels is compared to the same first pixel or group of pixels to determine if the current temperature is within the historical temperature variation (e.g., no hotspot) or outside the historical temperature variation (e.g., hotspot is present). In some instances, this protocol can also include comparing a first pixel (or first group of pixels) to a second pixel (or second group of pixels) by comparing the pixel values (temperatures) as well as comparing the pixel variations (temperature variance) between two regions. Pixels with larger variances compared to the historical variation map over time can indicate the presence of a hotspot. To the extent the temperature value is within a specified distance (e.g., threshold difference "D") from a distribution of temperature variances, the pixel may be considered within a "normal" range. However, in a scenario that includes surface temperatures changing gradually over time, such as from throughout the day, process 420 may not detect a pixel that indicates a higher temperature rating using this first technique, as the higher temperatures may gradually become a new "normal", as the higher temperatures may change the nature of the distribution over time (e.g., over a day, week, month, season, year, etc.), possibly due to a slowly developing hotspot. To avoid this possibility, process 420 may compare the temperature value or temperature variation for a first pixel across multiple images of the same rotational position to a threshold value (e.g., hotspot threshold value) that defines a maximum value of normal, regardless of historical values. By combining a comparison to historical values and to a threshold value, process 420 provides a robust characterization of a current temperature variation value as either "normal" or "abnormal." The process also works for detecting cool regions on a preheater level.

The temperature (i.e., "counts") difference from the reference background has to be large enough that it triggers as a variation. This is where the sensitivity factor is considered in the algorithm, where the higher the sensitivity, the lower the difference (e.g., difference "D") between the current pixel temperature value and the reference background pixel temperature value is required in order to be considered as a potential hotspot pixel (e.g., abnormal). As such, the determination of a hotspot pixel based on the difference in temperature for a pixel compared to the allowable distribution of pixel temperature values is not a simple fixed-threshold relationship, but is based on whether the difference D falls outside the expected variance observed on that pixel over time. However, some embodiments use the fixed-threshold to determine normal pixels from abnormal pixels.

In block 422, a temperature value (e.g., temperature variance value) for at least one pixel is received from an imaging sensor or from the temperature map. In some aspects, the imaging sensor may capture infrared wavelengths of light and convert the captured light into digital data which forms an array of temperature values, with a pixel temperature value for each pixel. The pixel temperature value received in block 422 may be one temperature value (temperature variation) of one pixel in the array of temperature values (temperature variation) of a plurality of pixels.

Block 424 determines whether the pixel temperature value (e.g., temperature value variation) is within a specified distance (e.g., threshold difference "D") from a statistical distribution of pixel temperature values or temperature value variations for each pixel. The statistical distribution may be based on historical values of each pixel. In some aspects, the specified distance from the distribution is a Mahalanobis distance. For example, in some aspects, if the squared Mahalanobis distance is greater than the inverse chi squared cumulative distribution function at a specified probability (e.g. 0.99), then it is within the distribution. Otherwise, it is outside of the distribution in some aspects.

In some aspects, block 424 may make different determinations. For example, in some aspects, block 424 may determine whether the temperature value (e.g., temperature variation for pixel) is within a distance representing 90%, 95%, or 99% of the statistical distribution. If the received value is not within the specified distance from the distribution, process 420 moves to block 426, which marks the pixel as abnormal in a pixel map (e.g., category map).

If the temperature value is within the specified distance, process 420 moves from decision block 424 to decision block 428, which determines whether the pixel temperature value is above a threshold value (e.g., a set threshold temperature value), which may or may not be the same as the temperature of the threshold difference D. This determines whether the temperature variation is greater than a threshold temperature variation for each pixel. The threshold value referenced in block 428 may be based on operator configured information, as a set value, or determined over time based on historical information. The configured information may be specific to an image (generated by a single imaging sensor or generated by stitching together data from multiple imaging sensors), or a region of interest within an image. If the temperature value is above the threshold value, process 420 moves to block 426, which marks the pixel temperature value as abnormal (e.g., in category map) as discussed above.

Otherwise, if the temperature value is within the distance D from the distribution for the pixel in step 424 or is not greater than the threshold value in step 428, process 420 moves to block 430, which records the temperature value as normal in the category map.

Due to the historical nature of the data that defines the distribution and thresholds for temperature, the distribution can be updated with the new data, such as when the new data is marked as normal. The distribution is not updated when the pixel temperature value is identified as being abnormal. Also, the distribution can be any distribution (e.g., normal Gaussian) and the measurement to the difference D may be an average, mean, center, edge, or other defined part of the distribution.

After the distribution is updated in block 432, process 420 moves to decision block 434, which determines if there are more pixels in an image to process. If there are, process 420 returns to block 422 and processing continues. If there are no more pixels, processing may continue for determining whether there is a hotspot on/under a surface in the images.

Figure 4C:
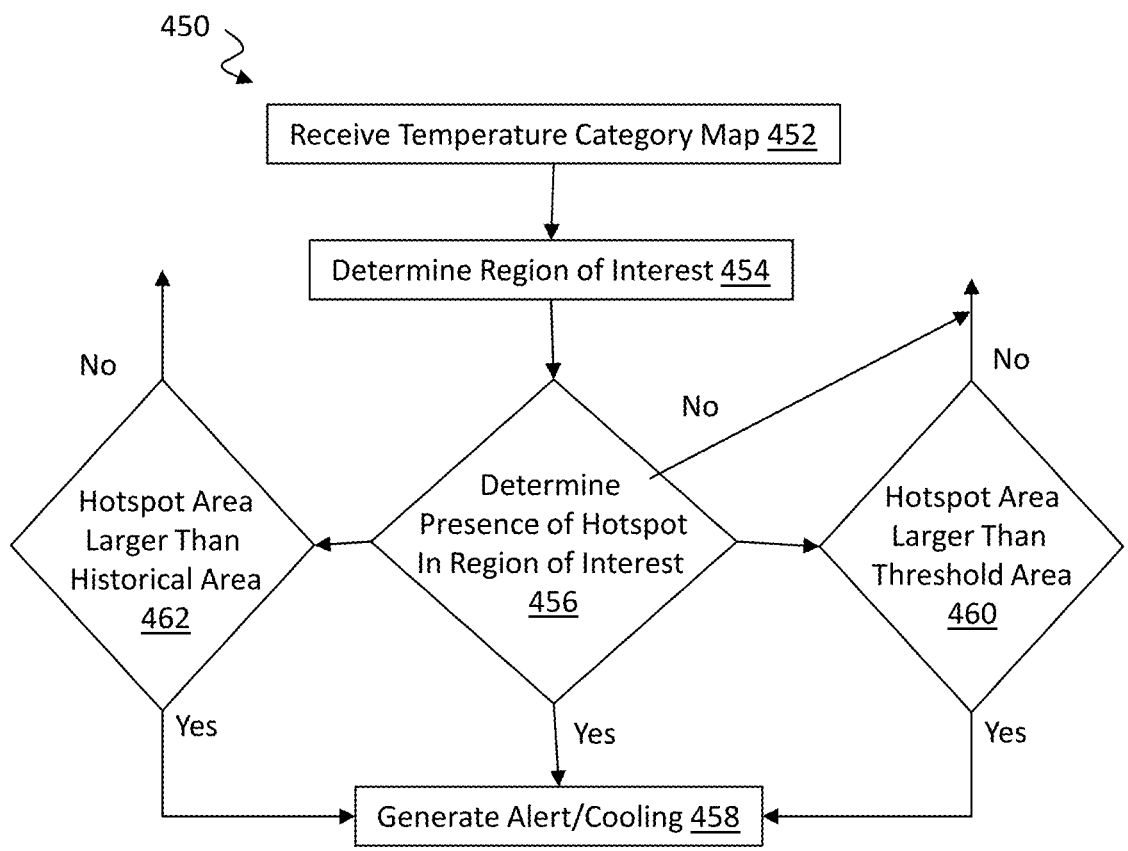
FIG. 4C includes a flowchart of a process of generating an alert or cooling command based on an abnormal region of pixels that are identified as being a hotspot region.

FIG. 4C includes a flow chart of a process 450 of generating an alert (e.g., or initiating a cooling procedure) based on an abnormal region of pixels that are identified as being a region of a hotspot or a cool region in a preheater (e.g., specific preheater level). In block 452, the temperature category map is received indicating normal and abnormal temperature values for each pixel within the image. For example, in some aspects, a category map may represent a matrix or two dimensional array of true/false or I/O values, with a true/1 value in a position of the category map indicating a pixel located at a corresponding position of the image is abnormal, while a false/0 value in a position of the category map indicates a temperature or temperature variance located at a corresponding pixel position of the image is normal. In some aspects, the meaning of these values may be reversed. In some aspects, the category map received in block 452 may be generated by process 420, discussed above with respect to FIG. 4B.

In block 454, a region of interest with one or more abnormal pixels within the image is determined. The region of interest may be determined in some aspects, by selecting one or more pixels of a previously identified regions of interest. A region of interest can be any region in the environment that is more susceptible to having a hotspot from degradation of internal brick of the kiln or any preheater level. The region of interest may also be selected in real time based on an area of abnormal pixels that are adjacent to each other. In some aspects, the region of interest may encompass a subset of all the pixels in an image. In some aspects, the region of interest may be defined by an operator, for example, by operating a pointing device such as a mouse or touch screen, as well as interacting with the graphical user interface 200 to identify a portion of the infrared image 205. A region of abnormal pixels may be identified by connecting a region of contiguous or near contiguous abnormal pixels. This can be done for images of a specific rotational position, such as when the images are of the same subject matter (e.g., same tyre gaps in same pixel locations) in the field of view for the specific rotational position. Decision block 456 determines whether a hotspot was determined to be present in the region of interest, where the hotspot can be a region of abnormal pixels or region of interest in block 454. If no hotspot in the region of interest was identified, then process 450 continues processing. If a hotspot region was identified in block 456, then process 450 can make different decisions. One decision is that if there is any hotspot detected in the images, then the process moves to block 458 and an alert is generated or a cooling protocol initiation is generated. However, the system can be configured to compare any detected hotspot (e.g., pixel having hotspot) to historical values for the pixel(s) or to threshold values before generating an alert or generating the cooling protocol initiation. This can be done for each rotational position of the kiln so that hotspots can be tracked, which allows the same hotspot to be tracked and monitored as the rotary kiln rotates. As such, a specific rotational position can be compared to itself so that the identified regions of interest (e.g., tyre gap) thereof are in the same pixel locations. Specific preheater levels can also be tracked to ensure operation within a certain range.

In one option, when a hotspot is determined to be present in the pixels of a region of interest (e.g., when the region of interest is partially or entirely a hotspot), the size of the area of the region of interest (e.g., size of the area of pixels identified to be a hotspot) is determined and compared to a threshold area size as shown block 460. When the size of the area of the hotspot is greater than a threshold area size, then the process 450 generates the alert/cooling 458. When the size of the area of the hotspot is less than a threshold area size, then the alert/cooling is not generated and monitoring for hotspots or monitoring the size of the region of a hotspot or suspected hotspot continues. Cool regions may also be similarly identified in a preheater level.

In another option, when a hotspot is determined to be present in the pixels of a region of interest (e.g., when the region of interest is partially or entirely a hotspot), the size of the area of the region of interest (e.g., size of the area of pixels identified to be a hotspot) is determined and compared to a historical area size as shown block 462. The historical area size can include an average of historical area sizes for a particular hotspot region or averaging across particular hotspot regions. For example, the hotspot region may be small with a low rate of increasing area size, the protocol determines whether the current hotspot region is above the historical area sizes or a size that is too different (e.g., difference, or change in size) from the historical area size. When the size of the area of the hotspot is greater than this historical area size or a value to much higher than the historical area, then the process 450 generates the alert/cooling 458. When the size of the area of the hotspot is within the historical area size range or close to the historical area size (e.g., within a distance/value from the average or range), then the alert is not generated and monitoring for hotspots or monitoring the size of the region of hotspot continues. However, it should be noted that certain limitations or definitions can be in place so that a hotspot or potential hotspot reaches a threshold to generate a cooling command, such that the cooling protocol is initiated to cool the surface of the kiln in order to cool the underlying hotspot. Accordingly, the temperature and/or hotspot size may reach a threshold where the system generates the cooling command and the cooling system initiates the water sprays into the hotspot.

Also, a size of the identified hotspot region can be compared to a predetermined percent of a region of interest. In some aspects, the percent of the region of interest may be 1%, 2%, 3%, 4%, 5%, 6%, 7%, 8%, 9%, 10%, 15%, 20%, 25%, 30%, 33%, 35%, 50%, 75%, or 100% of the region of interest. If the area of the hotspot region is larger than the predetermined percent, process 450 moves to block 458 where an alert/cooling is generated. Accordingly, tracking hotspots and regions of interest as the kiln rotates can be beneficial, where the specific rotational position is tracked and compared to the historical values.

Some aspects of block 458 may utilize different conditions for generating an alert or generating a cooling protocol instruction than those described. For example, in some aspects, an absolute size of the hotspot region (number of adjacent pixels) may be used to determine if an alert/cooling should be generated, either to the exclusion of or in conjunction with the size of the hotspot region relative to a size of the region of interest.

In some embodiments, the process may calculate an aggregated "normal" temperature (e.g., temperature variation across images) for pixels within the abnormal region (e.g., hotspot region) and an aggregated temperature variation within the region of interest. If a distance between the aggregated normal temperature variance and aggregated measured temperature variance is above a threshold, an alert may be generated in some aspects. For example, some aspects may include selecting a nominal or normal temperature variation from the distributions for each of the pixels in the abnormal region. These nominal values may then be aggregated. Similarly, the measured temperatures and temperature variations within the abnormal region may be separately aggregated. This aggregate of measured temperatures or temperature variations represents an aggregated variance for the abnormal region. If the measured variance is substantially (represented by the threshold) above a normal variance for the abnormal region, an alert may be generated. This technique considers a situation where none of the pixels within the abnormal region may be above a warning or alert threshold, and thus, no alert is generated based on these thresholds. Additionally, the abnormal hotspot region may be a relatively small portion of the region of interest, such that no alert is generated. However, given the number of pixels (within the abnormal hotspot region) that are above their nominal or normal points, (i.e. the variance of the abnormal hotspot region), there may be cause for concern such that an alert/cooling is proper.

In some aspects, generating an alert may include displaying a message on an electronic display, such as a system control console. In some other aspects, generating an alert may include sending an email, text message, or writing data to a log file, or any combination of these. Similarly, the generation of the cooling command may be made by notifying an operator of the system in the same ways, so that the operator can manually start the cooling protocol, or the cooling protocol can be automatically initiated with or without the notifications (alert) to the operator. In some instances, when a preheater level is too cool, then the alert can be provided and optionally a heating protocol can be initiated to increase the temperature of the preheater level.

In some embodiments, a system for detecting a hotspot can include: at least one infrared imaging sensor; and an imaging analysis computer operably coupled with the at least one infrared imaging sensor. The imaging analysis computer can be configured to control any infrared imaging sensor and acquire infrared images therefrom at any rate and in any duration. The imaging analysis computer can be configured to analyze the infrared images in order to detect a hotspot on the rotating kiln by tracking specific surfaces or objects of a specific rotational position of the kiln. The imaging analysis computer can be configured to detect hotspots surface where hotspots should not be (or is not present in a baseline) in order to determine that there is a problem in the kiln, such as faults in the brick layer, in the vicinity of hotspots.

In some embodiments, the system can be configured to obtain at least one baseline infrared image of a fixed field of view without a hotspot being present. The baseline image can be updated over time prior to a hotspot being detected on a surface in the fixed field of view. The baseline image can be an image from an imaging sensor, or a historical composite of pixel data from a plurality of baseline images over time, such as for the same FOV for the same rotational position of the kiln. This allows for comparisons between images with no hotspots and images that have hotspots. In some instances, the at least one baseline image is the historical variation map, or the one or more images used to prepare the historical variation map. The at least one baseline infrared image can be a single image when representing the baseline for each pixel without the hotspot. However, the at least one baseline image can be a plurality of images, or a composite prepared from a plurality of images so as to have the distribution thereof (e.g., historical variation map). The at least one baseline infrared image can provide the threshold difference and threshold temperature as well as the allowable pixel variations, which can be of a specific rotational position.

In some embodiments, the system can perform methods to analyze all pixels in the fixed field of view for changes from the at least one baseline infrared image to at least one subsequent infrared image. The changes can be in the pixel data for each pixel, such as changes in the wavelength of the infrared light that indicates changes in temperature of surfaces emitting the infrared light, and thereby changes in hotspots or development of hotspots.

In some embodiments, the system can perform methods to identify variable differences in temperatures for each pixel in the field of view between the at least one baseline infrared image and the at least one subsequent infrared image. The variable difference can be determined by assessing changes in a specific pixel (e.g., pixel location in the pixel array of the imaging device) from a baseline image to a subsequent image, such as for a specific rotational position.

In some embodiments, the system can perform methods to identify one or more first pixels in the at least one subsequent infrared image having a first variable difference in temperature that is greater than an allowable variable difference in temperature for the one or more first pixels in the at least one subsequent infrared image compared to an allowable variable difference in temperature for the one or more first pixels in the at least one baseline infrared image. This can be done for a specific rotational position, and all rotational positions can be similarly monitored. Also, this can be done for each preheater level. This protocol can be performed as described in connection to FIG. 4B. Here, the one or more first pixels are identified because they have pixel temperature values that are identified as being abnormal because they are outside the allowable variable difference by being greater than the threshold difference by being above the threshold temperature. The identified pixels that are abnormal can be appropriately marked in the category map, such as for the specific rotational position (e.g., having the same region of the kiln in the FOV) or specific preheater level.

In some embodiments, the system can perform methods to determine the one or more first pixels as being a hotspot based on the first variable difference in temperature of the one or more first pixels being greater than the allowable variable difference in temperature of the one or more first pixels in the fixed field of view of a specific rotational position or specific preheater level. The pixels that are determined to be a hotspot can be analyzed in accordance with the protocol of FIG. 4C. In some embodiments, the system can perform methods to generate an alert/cooling that identifies a hotspot being present in the fixed field of view. The generation of the alert/cooling and protocol thereof can also be performed in accordance with the protocol of FIG. 4C. Additionally, an alert/heating protocol can be performed for a preheater level in accordance with the protocol of FIG. 4C.

In some embodiments, the system can perform methods to identify one or more first pixels in the at least one subsequent infrared image having a first variable difference in temperature that is different than (e.g., greater or lesser) than a second variable difference in temperature for one or more second pixels in the at least one subsequent infrared image compared to the at least one baseline infrared image. The region of the first pixels can be analyzed to determine the temperature in the baseline image and the subsequent image, and then determine the change in temperature. Then, the region of the second pixels can be analyzed to determine the temperature in the baseline image and the subsequent image, and then determine the change in temperature. The change in temperature for the first pixels is compared to the change in temperature for the second pixels. When one group of pixels changes more than the other, then it can be determined that the surfaces of those pixels changed.

In some embodiments, the system can perform methods to determine the one or more first pixels as being a hotspot and the one or more second pixels as being devoid of a hotspot. This determination can be made based on the first variable difference in temperature of the one or more first pixels and the second variable difference in temperature of the one or more second pixels in the fixed field of view. When the change in the first pixels is larger than the change in the second pixels, there is an indication that there is a hotspot on/under the surface in the first pixels. Regions where the temperature variance is similar from the baseline infrared images to the subsequent images indicate that there hasn't been a change to the surfaces, and they do not have a hotspot.

In some embodiments, the system can perform methods to generate an alert that identifies the presence of a temperature variance in the fixed field of view. In some aspects, the imaging analysis computer is configured to provide the alert. In some aspects, the imaging analysis computer is configured to provide the alert by actuating an audible and/or visible indicator. In some aspects, the imaging analysis computer is configured to provide the alert by transmitting the alert to a remote device. In some aspects, the alert is an audible or visible communication. In some aspects, the alert can trigger activation of the cooling system or heating system. In some aspects, generation of instruction to initiate the cooling protocol or heating protocol can function as an alert, such as when there is active spraying by the cooling system alerting an operator that there is a hotspot or potential hotspot. Nevertheless, the operator can be alerted when actively cooling the kiln surface. Accordingly, descriptions of the alert herein may be also descriptions of initiating a cooling protocol with the cooling system. When the temperature variance is a preheater being too cool, the operator can be alerted when a heating protocol is initiated to increase the temperature of a preheater level.

In some embodiments, the imaging analysis computer is configured to monitor the fixed field of view to detect a hotspot on a kiln, such as at or around the tyre assembly. The surface can be selected from concrete, metal, composite, ceramic, plastic, rubber, or combination thereof of materials of a rotary kiln, such as at the tyre assembly. For example, the system can acquire emissivity, reflectivity, or other surface characteristics that impact absorption, reflection, emission or other optical light property for surfaces in the fixed field of view. The system can acquire emissivity, reflectivity, or other surface characteristics that impact absorption, reflection, emission or other optical light property for surfaces having a hotspot. Then, computations can be performed to determine whether there is a hotspot on/under a surface of the kiln in the fixed field of view of the baseline and/or subsequent images. Similarly, particular preheater levels may also be monitored for current temperature and temperature variations.

Figure 5A:
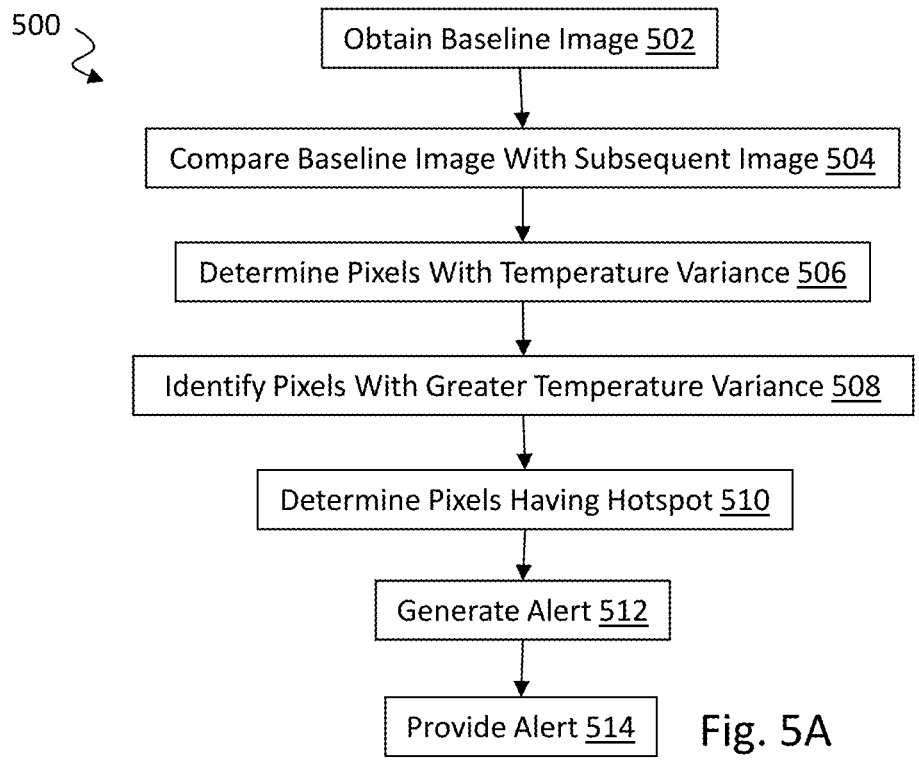
FIG. 5A illustrates a method of detecting a hotspot.

FIG. 5A illustrates a method 500 of detecting formation of a hotspot. The method may be performed with a system described herein having at least one infrared imaging sensor and an imaging analysis computer. Step 502 includes obtaining at least one baseline infrared image of a fixed field of view without a hotspot being present at field of view at a specific rotational position. For example, a specific tyre gap or combination of specific tyre gaps in the field of view. Step 504 includes analyzing some or all pixels in the fixed field of view for changes from the at least one baseline infrared image (e.g., map) to at least one subsequent infrared image. Step 506 can include identifying variable differences in temperatures for each pixel in the field of view between the at least one baseline infrared image and the at least one subsequent infrared image. Step 508 can include identifying a one or more first pixels in the at least one subsequent infrared image having a first variable difference in temperature that is greater than allowable based on the distribution of temperature variances in the at least one subsequent infrared image compared to the at least one baseline infrared image (e.g., greater than the threshold difference from the distribution or greater than the threshold temperature). Step 510 can include determining the one or more first pixels as being a hotspot, and optionally determining one or more second pixels as being devoid of a hotspot based on the variable difference in temperature of each pixel in the fixed field of view. Step 512 can include generating an alert (or cooling protocol) that identifies the presence of a hotspot in the fixed field of view. This can be done for each specific rotational position and the fixed field of view of each rotational position. This can also be done for each preheater level.

In some embodiments, the method can be performed to include providing the alert from the imaging analysis computer (step 514). This can include any of the following: providing the alert by actuating an audible and/or visible indicator; providing the alert by transmitting the alert to a remote device; and/or providing the alert as an audible or visible communication. The alert may be supplemented or replaced with the instructions by the computer for initiating a cooling procedure for a hotspot.

In some embodiments, the methods can include recording historical information of a plurality of infrared images of the fixed field of view received from the at least one infrared imaging sensor. Such historical information can include the images or image data for a number of images over a time period. The historical information can be used for establishing baselines and controls without a hotspot or other temperature variance so that the changes in the images when a hotspot or temperature variance is present can be detected.

In some embodiments, the methods can include providing the alert on a display device. Such a display device can show images selected from: an infrared image from the at least one infrared sensor; a schematic of locations of the at least one infrared sensor; or a location of an alert.

In some embodiments, the methods can include recalibrating the system, which can be scheduled or as needed or desired. Once the system is recalibrated, the methods can obtain an updated at least one baseline infrared image after the recalibration.

In some embodiments, the methods are performed such that the fixed field of view includes a hard surface. However, weather or the cooling system that sprays water can impact whether or not the hard surfaces have water or any wetness. As such, the method can include: determining that there is water on the surface of the preheater or kiln in the fixed field of view; and monitoring the fixed field of view to detect a hotspot or temperature variation under the water, such as when water is on a surface of the kiln or preheater level. Accordingly, the database may include data for emissivity or other water parameters when on a surface, such as a known surface type of the kiln or preheater.

Figure 5B:
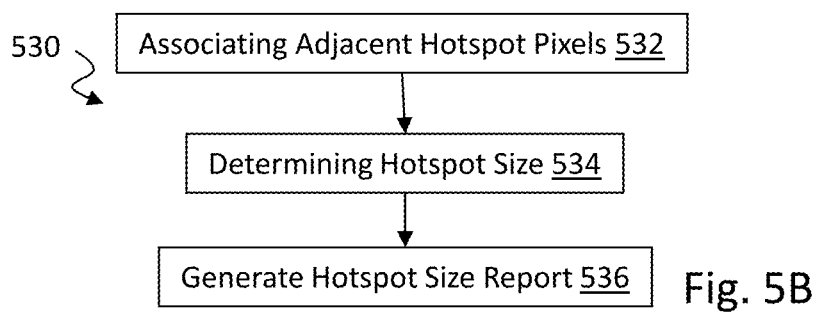
FIG. 5B shows another method for detecting hotspots.

FIG. 5B shows another method 530 for detecting a hotspot on the kiln. The method 530 can include: associating adjacent first pixels to identify a hotspot region (step 532); determining a size of the hotspot region (step 534); and generating a hotspot region size and/or temperature report that identifies the size and optionally the temperature of the hotspot region based on the associated adjacent first pixels (step 536). The method 530 may also include associating adjacent first pixels to identify a hotspot region; determining an area of the hotspot region; comparing the area of the hotspot region with a threshold area size; and generating the alert and/or cooling instruction once the hotspot region has an area that is at least the size of the threshold size, wherein the threshold area size is a defined value or a percentage of a region of interest. This can also be done for a preheater level.

Figure 5C:
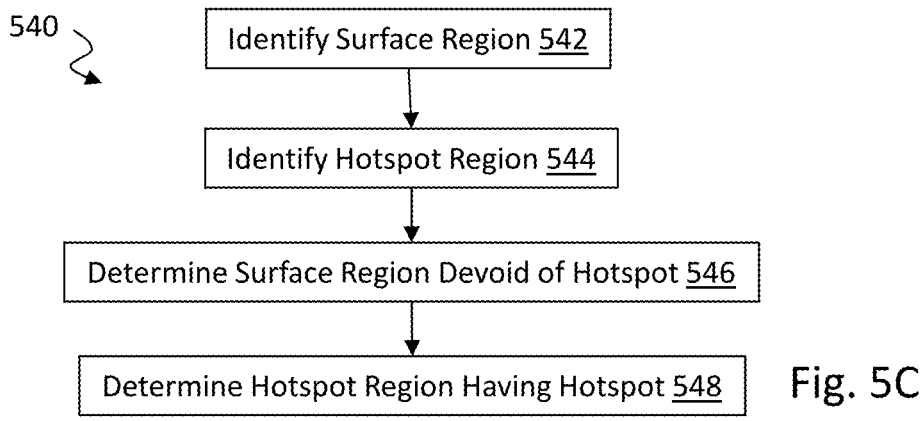
FIG. 5C show another method for determining regions devoid of hotspots and regions having hotspots.

FIG. 5C shows a protocol 540 for detecting a hotspot. The protocol can include identifying a surface region in the fixed field of view that is a surface, wherein the surface region has a surface temperature (Step 542). Step 544 can include identifying a hotspot region in the fixed field of view that is a hotspot by having a variable difference in temperature for each pixel that is greater than the allowable variable difference in temperature for the surface region from the at least one baseline infrared image to the at least one subsequent infrared image. The protocol 540 can also determine the surface region in the fixed field of view in the at least one baseline infrared image as being devoid of a hotspot, wherein the surface region has a pixel temperature value that is within the allowable variable difference in temperature for each pixel (step 546). The protocol 540 can also determine the hotspot region in the fixed field of view in the at least one subsequent infrared image as having a hotspot, wherein the hotspot region having the first variable difference in temperature that is greater than the allowable variable difference in temperature for each pixel (step 548). This can also be done for a preheater level.

The methods recited herein describe the use of images and maps, such as in FIGS. 3, 4-4C, and 5A-5C. These images that are acquired by the one or more imaging sensors can be used in creating a 2D model of the preheater and the rotary kiln. The 2D model can be used for the images or maps in the methods described herein. For example, a 2D model can be generated from the images to provide a 2D rectangle that approximates the cylinder of the kiln opened flat or a body of a preheater level.

Figure 10A:
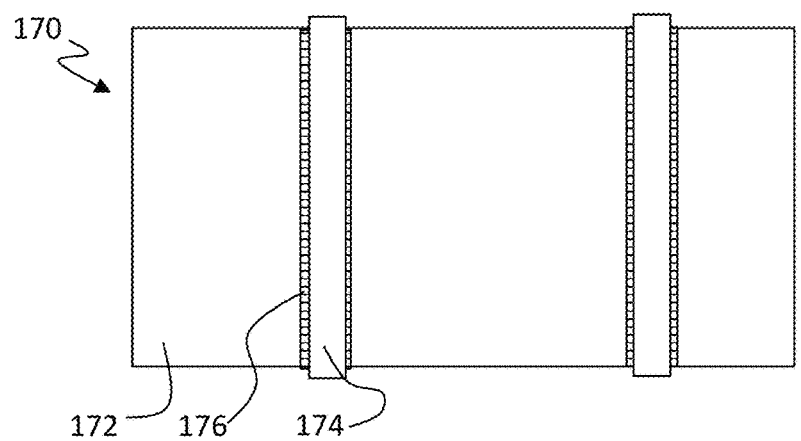
FIG. 10A shows a schematic representation of a 2D model of a rotary kiln.

FIG. 10A shows a representative 2D model 170 of a rotary kiln based on the parameters of the rotary kiln, such as those input into the system including diameter, length, brick thickness, incline angle, or other parameter. The 2D model 170 is shown to include the rotary kiln 172, tyres 174, and pads 176. The dimensions of the rotary kiln, tyres 174, and pads 176 can be input into the system. The infrared images can then be overlaid or otherwise combined with the 2D model 170, which can correlate specific landmarks or features of the images to specific locations on the 2D model 170. The 2D model 170 can then be used in the methods of the invention with the image data overlaid. The 2D model 170 can be wrapped around a cylinder having the parameters of the rotary kiln to generate a 3D model of the rotary kiln.

Figure 10B:
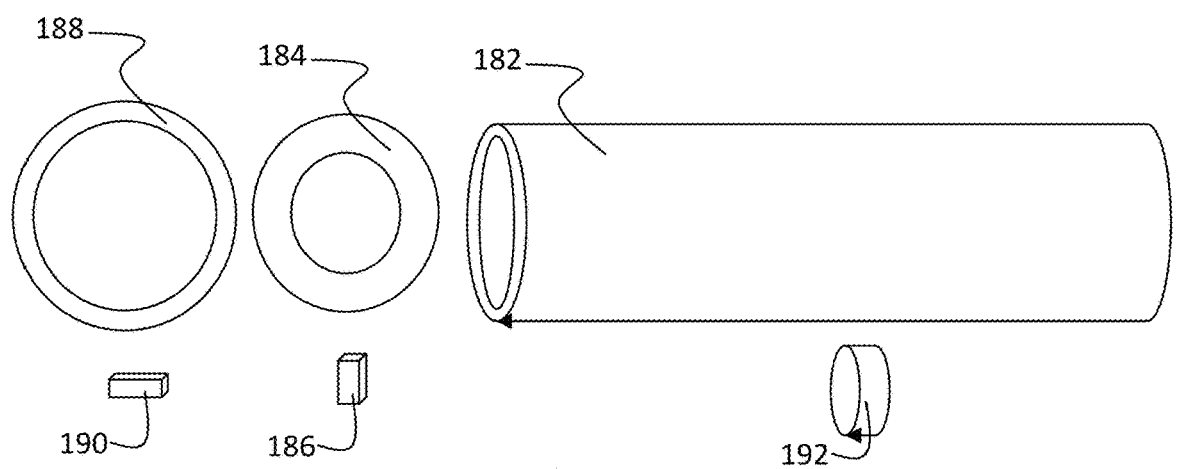
FIG. 10B shows a schematic representation of 3D models of components of the rotary kiln.
Figure 10C:
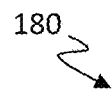
FIG. 10C shows a schematic representation of a 3D model of the assembled rotary kiln.

A 3D model of the rotary kiln can be build from 3D bodies of the constituent parts. FIG. 10B shows the components of the 3D model 180 and FIG. 10C shows the 3D model 180. The 3D model 180 is shown to include the cylindrical body 182, tubular brick layer 184, bricks 186, tyre 188, pads 190, and support rollers 192. The separate components allow for the 3D model 180 to be selective in the components shown, which can be used in the analysis. For example, the cylindrical body 182 can be the only component of the 3D model 180 used in an analysis of the temperature profile. In another example, the full 3D model 180 can be used for analysis of the temperature profile, and selective components can be removed. For example, the tyres 188 can be removed to analyze temperatures thereunder. Similarly, the pads 190 can be removed from the 3D model 180 to analyze temperatures of the surface of the kiln under the pads 190.

Additionally, the bricks 186 can be modeled so that the individual bricks can be estimated and modeled in the 3D model 180. This allows for the methods to monitor individual bricks 186 and monitor for brick fallout from the brick layer 184.

The 2D model 170 can be wrapped around the cylinder 182 to form the 3D model. Alternatively, the 3D model can be matched to infrared images to provide the details thereof. The mapping of the 3D model to image data allows for the 3D model to be rotated in virtual space for monitoring the rotating kiln. The real time data can then be matched to the 3D model for the analyses descried herein. This allows for a monitoring of the rotary kiln in real time by using the 3D model 180 and mapping the infrared image data to the rotating 3D model 180.

The 3D model 180 can be populated with identification points, such as those described herein. The 3D model 180 can be used to track the rotation of the rotary kiln, and thereby the images from imaging sensors can be used to generate the 2D model (e.g., image stitching), and then to generate the 3D model. The subsequent images can be compared to either the source images or to the 3D model. In an example, the subsequent images are compared to the source images for the monitoring purposes The 3D model 180 may also be associated with models of the imaging sensors 104 and the sprayers 140. This can allow for tailoring a system by virtually moving the imaging sensors 140 and sprayers 140 to obtain desired or optimal performance. The imaging sensors 104 can be moved in virtual space around the 3D model 180 to determine an optimal placement for performing the methods described herein. Additionally, the sprayers 140 can be moved in virtual space around the 3D model 180 and optionally relative to the imaging sensors 104 so that an optimal placement for performing the cooling methods as described herein. For example, FIGS. 1-1D can represent a virtual system with the 3D model showing the rotary kiln with overlaid temperature data from the images, where the imaging sensors and sprayers may be positioned and arranged as needed or desired.

In an example, the infrared cameras are positioned at different angles and different locations relative to a preheater and kiln in a real environment. A 2D model can be generated, which can include the temperature data from real images of the real preheater and kiln in a virtual environment. The 2D model can be updated in real time with temperature data from the images. The angle of each camera and distance of each sensor pixel to the surface of the preheater or rotary kiln can be known and used to normalize the temperature data for each pixel. For example, FIG. 1B shows an orientation of infrared cameras where some pixels will be for surface areas that are closer and some pixels will be for surface areas that are farther, when there is any angle of the camera to the surface. The relative distances can be used to normalize the temperature data to fit on a flat surface, such as the 2D model. This normalizes the data of a pixel for a region further and for a region closer, so that the data is normalized on a 2D model. For example, a camera at an angle can have some pixels on one side imaging a region that is closer and pixels on the other side imaging a region that is further. The relative distance between a pixel and its imaged region can be known and used to normalize the pixel data for distance. This allows generation of a flat normal image, such as a rectangular 2D image. For example, the pixels that are closer to the imaged surface appear to be smaller than pixels that are farther from the imaged surface, where the closer pixels have less region than the further pixels that have more region in the images. The relative distances can be used to normalize the pixel data so that all pixels are provided for a normalized size.

The 2D model can be used to provide the x axis and y axis data for coordinates of features on the images and maps. The 2D model can be wrapped around a cylinder, cone, taper, or other shape or combinations of shapes to form the 3D model in virtual space. This allows for the x axis, y axis, and z axis data for coordinates of the 3D map.

In an example, the dimensions of a preheater and kiln are used to get a virtual 3D model thereof. The pixel data can then be applied to the virtual 3D model to provide a real time 3D model of the temperatures of the preheater and kiln. The 3D model of the kiln can be used to track hotspots as the virtual 3D model of the kiln rotates, which can be provided on a display device. The 3D model of the preheater can be used to monitor temperatures on the different preheater levels in real time to provide a graphical illustration of the operating conditions. During the processes described herein, the 2D data (e.g., data cubes of the infrared pixel data) can be used for the analysis and all comparisons and calculations, such as shown in the methods of the figures, and identification of hotspots. The 3D model can be used for showing the human operator the locations of the features of the preheater and kiln, temperatures at each location, and possible hotspots or other temperature variances. As such, the 3D model allows for visualization of the data processing and temperature information that is performed with the 2D data.

Figure 7:
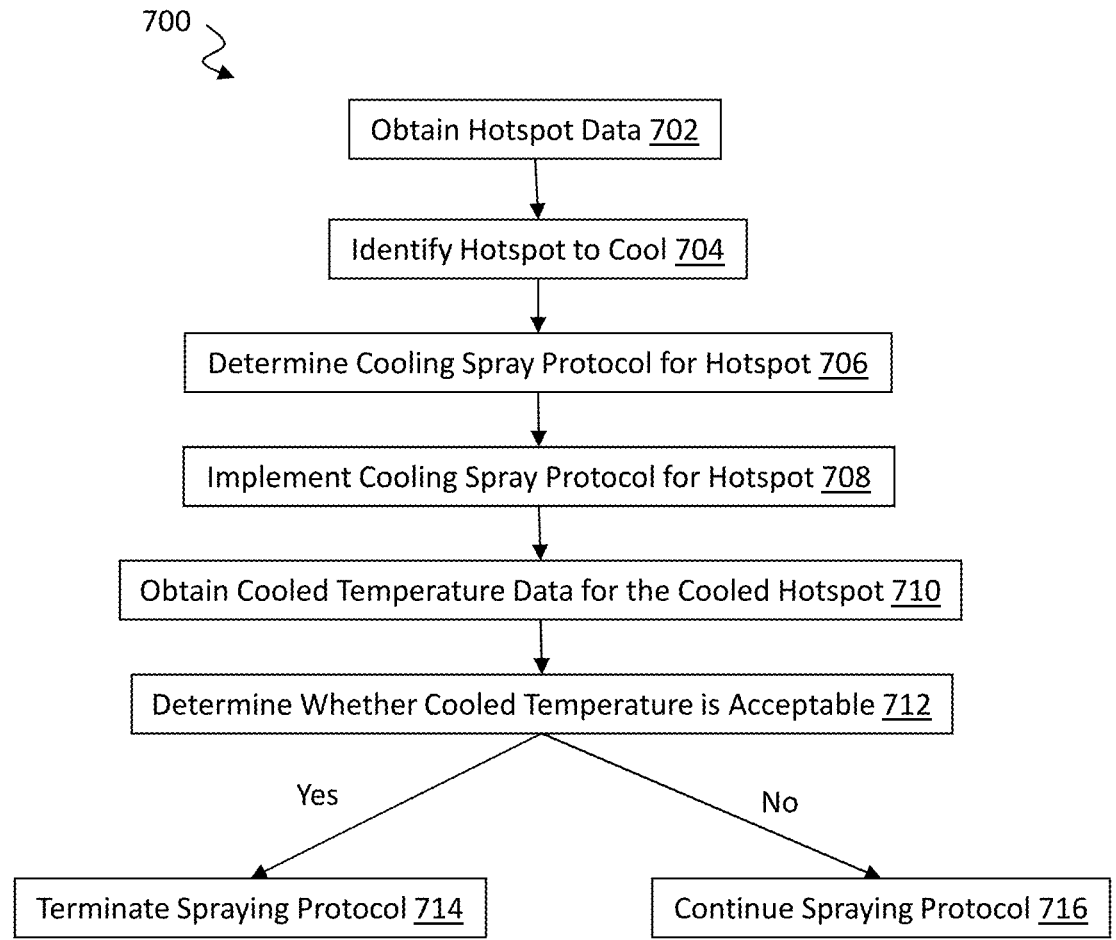
FIG. 7 illustrates a method of cooling a hotspot.

FIG. 7 shows a protocol 700 for treating a hotspot with a cooling water spray. The protocol 700 can include obtaining data (e.g., hotspot data) for at least one hotspot (step 702). The hotspot data for each hotspot can include: a location of the hotspot in the preheater or kiln; a temperature of the hotspot; a temperature of the preheater or kiln surface over the hotspot; an area size of the hotspot; an area size of the preheater or kiln surface over the hotspot; a temperature gradient of the hotspot; a surface temperature gradient of the preheater or kiln surface over the hotspot; a change in temperature from a baseline temperature for the hotspot; or a change in temperature from a baseline temperature for the preheater or kiln surface over the hotspot. In some instances, the hotspot data includes current data compared to historical data. In some instances, the historical data includes at least one of: data prior to formation of a hotspot; data from at least one prior rotation of the kiln; data from the current hour; data from the current day; data from the current week; or data from the current month. The system can be configured such that there is a preset analysis function to show changes of the temperature of discrete locations or points of interest, such as the preheater levels, and the temperature over time can be tracked for changes over time, such as through the current day, compared to the previous day, trend for the week, compared to same day a previous week and any time period.

Based on the hotspot data, the sprayer control can identify at least one hotspot to cool with a cooling water spray (step 704). Once a hotspot is identified to cool, the sprayer controller determines a spraying protocol (step 706) to cool the identified hotspot, and then the sprayer controller controls operation of the cooling system in implement the spraying protocol (step 708). After implementing the cooling protocol for at least one cycle, cooled temperature data (e.g., data after being cooled at least one time, which can be IR image data that is processed as described herein for temperatures) is obtained for the cooled hotspot (step 710). The cooled temperature data is then processed to obtain the cooled temperature of the hotspot, and the cooled temperature of the hotspot is analyzed to determine whether or not the cooled temperature is greater than the acceptable temperature range (step 712). When the cooled temperature is within the acceptable range, the sprayer controller can terminate the spraying protocol (step 714). When the cooled temperature is greater than the acceptable range, the sprayer controller can continue the spraying protocol (step 716).

In some embodiments, the sprayer controller is configured to: identify a location and hotspot data of a specific hotspot on the preheater or kiln; and determine a spraying protocol for the specific hotspot based at least one of: a water spray pressure; a distance of a specific water sprayer to the location of the specific hotspot on the preheater or kiln surface; time between actuating solenoid valve of the specific water sprayer and the water being sprayed from the nozzle; time between actuating solenoid valve of the specific water sprayer and contacting resultant water spray on the location of the specific hotspot; duration of the location of the specific hotspot being within a spray region on the preheater or kiln surface; duration of opening the solenoid valve; rotational velocity of the rotating kiln; temperature of sprayed water; temperature or state (e.g., vapor) of sprayed water as it contacts the location of the specific hotspot; hottest temperature of the specific hotspot; temperature profile of the specific hotspot; temperature gradient and area of the hotspot; when to initiate spray by actuating the solenoid valve; when to terminate spray by de-actuating the solenoid valve; position of nozzle of sprayer relative to the location of the specific hotspot; area of hotspot; or area of water spray on the preheater or kiln surface.

Figure 7A:
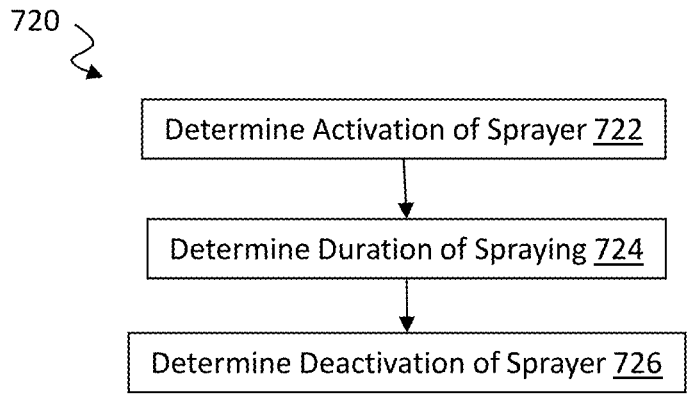
FIG. 7A illustrates a method of activating a sprayer to cool a hotspot.

FIG. 7A shows a cooling protocol 720 for a specific hotspot. The sprayer controller can: determine timing of initiation of actuation of solenoid valve relative to the location of the hotspot during rotation of the kiln (step 722); determining time period the solenoid valve is opened to spray the cooling water (step 724); and determining timing of de-actuation of solenoid valve relative to the location of the hotspot during rotation of the kiln, such that the water spray ceases as the hotspot moves out of range of the sprayer (step 726). These steps can be determined based on the data of the hotspot and on data for operation of the sprayer system. This allows the system to modulate how the spraying is implemented based on data of the hotspot and on data for how the sprayer system operates. For example, the temperature and pressure of the cooling water can determine the timing of the spray relative to where the hotspot is in the rotation so that the hotspot is within a spray region on the surface of the kiln as the hotspot rotates past the sprayer.

In some embodiments, the methods can include: accessing a memory device that includes thermal data for one or more surfaces in the fixed field of view; obtaining the thermal data for the one or more surfaces in the fixed field of view; and computing with the thermal data for the one or more surfaces in the fixed field of view during the analysis of the pixels in the fixed field of view.

In some embodiments, the methods can include: accessing a memory device that includes distance data for one or more surfaces in the fixed field of view from the at least one infrared imaging sensor: obtaining the distance data for the one or more surfaces in the fixed field of view; and computing with the distance data for the one or more surfaces in the fixed field of view during the analysis of the pixels in the fixed field of view.

In some embodiments, the methods can include determining a relative humidity; and computing with the relative humidity as data during the analysis of the pixels in the fixed field of view.

In some embodiments, the imaging analysis computer is configured to: associate adjacent first pixels to identify a temperature variation (e.g., hotspot) region; determine a size of the temperature variation region; and generate a temperature variation region size report that identifies the size of the temperature variation region based on the associated adjacent first pixels. In some aspects, the imaging analysis computer is configured to: associate adjacent first pixels to identify a temperature variation region; determine an area of the temperature variation region; compare the area of the temperature variation region with a threshold area size; and generate the alert once the temperature variation region has an area that is at least the size of the threshold size, wherein the threshold area size is a defined value or a percentage of a region of interest. This protocol can be performed as described herein.

In some embodiments, the memory device includes thermal data for one or more surfaces in the fixed field of view, wherein the imaging analysis computer is configured to: obtain the thermal data for the one or more surfaces in the fixed field of view; and compute with the thermal data for the one or more surfaces in the fixed field of view during the analysis of the pixels in the fixed field of view. In some aspects, the memory device includes distance data for one or more surfaces in the fixed field of view from the at least one infrared imaging sensor, wherein the imaging analysis computer is configured to: obtain the distance data for the one or more surfaces in the fixed field of view; and compute with the distance data for the one or more surfaces in the fixed field of view during the analysis of the pixels in the fixed field of view. In some aspects, the imaging analysis computer is configured to: determine a relative humidity; and compute with the relative humidity during the analysis of the pixels in the fixed field of view. This protocol can be performed as described herein. This, as well as all of the methods, can be done for a specific rotational position, such as each rotational position or for a specific preheater level. This allows for the entire circumference of the rotary kiln, such as the entire tyre assembly, to be monitored. Also, this allows for each level of the preheater to be individually monitored.

In some embodiments, the imaging analysis computer is configured to obtain the at least one baseline infrared image by: acquiring a series of infrared images of the fixed field of view for a specific area of the preheater at a specific preheater level or kiln at a specific rotational position; analyzing pixel data of each infrared image of the series to determine a pixel temperature for each pixel for each infrared image of the specific rotational position or preheater level; determining a range of pixel temperatures for each pixel without a temperature variation being present in the fixed field of view across the series of infrared images of the fixed field of view of the specific rotational position or specific preheater level; and setting the allowable variable difference in temperature to include the determined range of pixel temperatures for each pixel without a temperature variation at the specific rotational position or specific preheater level. In some aspects, the imaging analysis computer is configured to obtain the at least one baseline infrared image of at least one specific rotational position or specific preheater level by: performing a statistical analysis of the range of pixel temperatures for each pixel without a temperature variation being present across the series of infrared images of the fixed field of view of the specific rotational position or specific preheater level to determine an allowable distribution of pixel temperatures for each pixel at that specific rotational position or specific preheater level; and setting the at least one baseline infrared image so that each pixel includes the allowable distribution of pixel temperatures for the specific rotational position or specific preheater level. This protocol can be performed as described herein.

In some embodiments, the at least one baseline infrared image is a model of each pixel with the allowable distribution of pixel temperatures for each pixel for a specific rotational position or preheater level, wherein the model of pixels is obtained by: determining a distribution of the pixel temperatures for each pixel without a temperature variation being present across the series of infrared images of the specific rotational position or preheater level; identifying a maximum pixel temperature that is greater than the distribution of pixel temperatures by a first difference at the specific rotational position or preheater level; and setting the first difference from the distribution to indicate absence of a temperature variation for each pixel in the field of view of the specific rotational position or preheater level. This protocol can be performed as described herein. Each pixel of each specific rotational position or specific preheater level, and thereby of a specific location on the kiln or preheater, can have its own model based on the historical temperature values.

In some embodiments, the imaging analysis computer is configured to: compare each pixel temperature in the one or more subsequent infrared images with the model of each pixel with the allowable distribution of pixel temperatures for each rotational position or preheater level; determine a difference between each pixel temperature in the one or more subsequent infrared images and the model of each pixel for the specific rotational position or preheater level; determine whether the difference is greater than a threshold difference, when the difference is greater than the threshold difference, determine that the pixel is a temperature variation (e.g., hotspot) pixel, or when the difference is less than the threshold difference, determine that the pixel is not a temperature variation pixel. In some aspects, the imaging analysis computer is configured to: continuously update the model in real time; and continuously compare new infrared images with the model in real time.

In some embodiments, the imaging analysis computer is configured to: determine a standard deviation of the distribution of the pixel temperatures for each pixel of the rotational position or preheater level without a temperature variation (e.g., hotspot) being present across the series of infrared images of the specific rotational position or preheater level; and set the threshold difference as being a defined difference from the standard deviation.

In some embodiments, the methods can be operated by software. The software manages the network connections on a 1 to 1 basis with each IR camera to monitor camera performance, assigns correct algorithms to each camera depending on the solution assigned to the camera, monitors alerts from cameras, displays an alert and related IR images for all cameras, assigns CPUs to cameras depending on performance requirements and records historical information as determined by the preheater and rotary kiln subsystems. The hardware to run the preheater and kiln infrared management system can include a multi-CPU racked based system that is scalable to allow for additional cameras added to each solution. The hardware, memory and disk management system can be scoped and selected based on the final numbers of IR cameras.

The system can contain a series of LCD display screens to show overall management of the infrared system, highlight alert locations as they are triggered, allow for the display of the IR image from any IR camera, and display operational views of each system such as the cooling system management, thermal component operations, and hotspot detection. The display system can utilize the graphical displays from the relative preheater or kiln region to show locations of IR cameras, IR images and IR alerts locations relative to the preheater or kiln.

In some embodiments, the system can be programmed with instructions to perform the methods described herein. The system can also be programmed to track all hotspot or possible temperature variation (e.g., hotspot) locations as the kiln rotates or monitor each preheater level temperature during operation. Accordingly, once an area or location is tagged as a temperature variation area, the system can update the database so that this area is monitored as part of a specifically monitored group as the kiln rotates or the preheater operates. The known temperature variation locations can be routinely monitored and analyzed for temperature variation data, such as source of hotspot, hotspot area growth rate, hotspot temperature growth rate, or other information. The sensitivity of known temperature variation pixels may be programmed so that system responds to changes in the temperature appropriately, such as when there are small temperature variation settings the system maintains monitoring. There can be a higher threshold until the hotspot is cooled so that an increase in the temperature rate or other increasing of the temperature can be identified. Another example is setting a lower threshold in an area without any hotspot history. Accordingly, the system can be programmed to accommodate desired operability. Additionally, the known hotspot locations can be tagged for cooling, and also for maintenance and maintenance planning. The system can provide real time updates on the status of a known temperature variation location, whether or not actively increasing in size or temperature. When the temperature variation region is increasing in size or temperature, the system can provide reports for any increases in temperature change rate or any other temperature or size change over a period of time. These reports can include analytical data for the analyzed temperature variation to provide any of the temperature variation parameters described herein in real time or over defined time periods.

In some embodiments, the cooling system can be programmed to automatically change flow rate of cooling water within water conduits, at the sprayer or at other water containing. For example, cooling water is often carried in pipes, through pumps, and across junctions, and to the sprayer nozzles. Once a hotspot is identified, the system can automatically regulate the water spray volume per spray burst or water spray rate in a continuous spray. For example, the system may generate an alert of for a hotspot, analyze for the location of the hotspot, and then modulate the water sprayer component to regulate the water spray, such as by shutting off flow of the water with a solenoid. For another example, the system can automatically acute pumps, valves, or other equipment to modulate, reduce or increase the flow of water in the cooling system or modulate the amount of water sprayed as well as the spray duration, such as per rotation of the kiln. In another example, the computer can enable a water sprayer valve to allow for more water spray for hotspots that exceed a certain size, temperature increase rate or duration of the hotspot, which may be set by the operator to automatically control the valves.

The monitoring system can detect markings, unique components, anomalies, or other identifiable or fingerprinting of the rotary kiln. This allows tracking of the rotation of the rotary kiln so that specific regions, such as specific gaps, can be tracked. The tracking can track a specific feature as it passes through a field of view of the IR camera. The image to image analysis can then track objects as they move across a series of images, by detecting the pixels that provide the temperature value of the object changing from one image to the next so that when viewed in series (e.g., video) the object can be tracked. The different features across and around the kiln can be monitored for references, such as to provide a temperature fingerprint in a temperature map or historical variation map. The temperature fingerprint can be used for monitoring specific regions or desired areas as the kiln rotate, and allows for sequential images of a specific rotational position to be obtained so that specific pixels are associated with specific objects. As such, cach rotational position can have a unique temperature fingerprint that can be tracked and monitored so that temperature variation changes can be observed.

In some embodiments, the temperature profiles of an image can be compared to a standard temperature profile so that pixels, such as adjacent pixels or regions of pixels, that have temperatures above defined limits can be flagged as regions of interest.

In some embodiments, the system can include a number of IR cameras so that the entirety of the outside of the rotary kiln is monitored by imaging the length of the kiln and recording images of the rotation so that the entire outer surface area is imaged. In some aspects, the system can include at least one IR camera viewing underneath a tyre ring by viewing into a tyre gap, and preferably one IR camera per tyre gap opening (e.g., two IR cameras for each tyre gap).

In some embodiments, the system can include one or more IR cameras for each preheater level. However, each preheater level can be outfitted with two or more cameras to monitor the entire surface are of each preheater level.

In some embodiments, the system can trigger solenoid valves of the sprayer to control the spray rate in order to avoid excess water and drippage from the preheater or kiln. Preferably, the sprayed water can be entirely vaporized before contacting the preheater or kiln surface; however, less than 100% vaporization is allowable. The spray is also metered to inhibit to quick temperature changes, which is performed by metering the spray by using data of the temperature as it rotated past the IR camera without water vaporization contaminating the IR image and temperature analysis. The spray can be controlled so that the surface of the preheater or kiln does not warp, where the surface curvature, and thereby warping can be monitored with the IR fingerprint and modeling of the preheater or kiln surface. The spray can be controlled so that regions that are within an allowable temperature range are not sprayed. For example, the sprays can be limited to hotspots across the preheater or kiln surface, as well as under the tyre assembly.

In some embodiments, the system can also be configured to perform a cooling system calibration in order to determine water spray parameters to achieve a liquid drop spray onto the surface so that the surface vaporizes the water. In some embodiments, the system can also be configured to perform a cooling system calibration in order to determine water spray parameters to achieve a vapor spray so that vapor is received onto the surface. In some aspects, the system inhibits the water from vaporizing within the system until sprayed from the nozzle. Alternatively, the water may convert to vapor in the conduit or at the nozzle so that the water vapor is sprayed. Optionally, an IR camera can be used in the calibration so that the water vaporization can be imaged, which allows the system to vary the pressure and solenoid valve control to optimize vaporization of the water so that liquid water does not contact the surface of the preheater or kiln. The spray pulse can be calculated to provide a defined amount of water to a specific hotspot temperature profile, or to a specific temperature range. The calculations can be used to determine operation of the solenoid valve to achieve liquid or vaporized water contacting the surface of the kiln. Also, the calibration can be performed for the timing of operation of the solenoid valve so that the water spray hits a specific area of the kiln surface, such as on a specific hotspot. The fingerprint of hotspots or other temperature variation regions can be used to generate a pattern for the sequence of solenoid valve opening and closing, which cycles as the kiln rotates or preheater operates.

In some embodiments, the system models the kiln and sprayers in relation to the IR cameras. This can allow for the IR cameras to monitor hotspots and rotation thereof so that they are tracked, which allows for the system to trigger the water spray in order to spray the specific hotspot(s). In some aspects, the IR camera is about 180 degrees from the sprayer, or at least 90 degrees based on a center axis of the kiln. In some aspects, the IR cameras and sprayers are positioned relative to each other such that no water vaporization passes through the IR camera field of view.

In some embodiments, thickness of the refinery brick layer is monitored and modeled with the system based on the IR temperature data. Studies can be done to map brick thickness to operational temperatures, which allows recorded temperatures to be correlated with brick thickness. The IR temperature versus brick thickness data can be obtained and saved in a database. For example, a lookup table can include defined brick thickness per pixel temperature. The system can track changes in thickness based on the pixel temperature values. Changes in thickness that are faster than a defined rate, or specific thickness thresholds can trigger the system to activate the water sprayer to cool the surface over that region of refractory brick. The water spraying can slow the rate of thinning and inhibit degradation of the brick layer and inhibit brick dropout (e.g., dropping from the brick layer into the kiln). The spraying may also inhibit the brick from further thinning. As a result, hotspots can be predicted and treated with cooling water to prevent their formation.

Different thickness thresholds can trigger alerts and spraying protocols. For example, the alert and spraying protocol can be generated at 75%, 50%, 25%, 20%, 10%, and/or 5%, of original thickness. Different levels of alert and different levels of spraying can be provided as the thickness is reduced past the thresholds.

Also, the result can be a spraying protocol that maintains the surface of the preheater or between a temperature range, such as less than 325° C., and the spraying protocol can be terminated when the surface region reaches 280° C. However, it should be recognized that the threshold temperatures can change. In some aspects, the protocol can be gradual temperature reduction where different temperature range bands are cooled to a lower level, and then cooled to a lower level. For example, the protocol can preferentially target hotspots with higher temperatures (e.g., 450° C. or above), and reduce them to about 420° C., and then target hotspots with temperatures between 420° C. and 400° C. This protocol can be repeated until the kiln, or specific regions thereof (e.g., region under tyre assembly) is at the desired temperature profile. In some embodiments, the operator of the kiln can set the upper temperature threshold that turns on the cooling sprayers and the lower temperature threshold that turns off the sprayers.

In some embodiments, a thermal application on the controller sends plc instructions to PLC server, which manages solenoid valves to control timing and duration of the spray of each nozzle in order to cover hot spot as the kiln rotates (3.5 RPM). The application can be programmed to reduce PLC spray signals as hotspot temperature decreases. The slow reduction of temperature can inhibit problems that may arise if the kiln cools too rapidly, such as inhibiting cooling related weakening of the refractory lining. In some instances, the cooling can be controlled to provide a moderate cooing rate, such as about 0.25-1° C. per minutes.

In some embodiments, the IR camera can provide high resolution so that a single refractory brick can be tracked. The bricks are about 24 cm thick, 24 cm tall, and 6 cm wide. As such, the change in temperature can be sufficient to be noticeable when a single brick drops out. The individual bricks or groups of bricks can be monitored each rotation to track changes in thickness or track bricks that have fallen out so that there are holes in the refractory wall. Areas losing bricks can be identified, and alerts can be provided as appropriate.

The kiln can be monitored every rotation (e.g., monitoring the virtual 3D model) so that a single brick dropout can be identified in a single rotation. In part, a brick dropout causes a significant increase in temperature, and such as change in a single rotation can be identified. Accordingly, the system can keep a real time log of the temperatures in the virtual 3D model, and an increase in a certain percent or amount or to a certain temperature can trigger an analysis for brick dropout. The system can compare the one or more pixels for a specific rotational position with a size of a brick, and when the size matches provides a correlation, there can be an indication that there has been a brick dropout of the brick lining.

In some embodiments, the temperature of specific discrete regions can be controlled so that the thickness of the refractory wall stays the same or increases. This temperature control can reduce the temperature so that the dust or clink inside of the kiln can adhere to the refractory brick, which can serve as a patch for holes in the brick were the hotspots may be located. In some instances, the temperature can be controlled to control the amount of clink that adheres to the refractory wall. In some instances, this can be done to slow down wall erosion.

In some embodiments, the distance data can be used to model and monitor the outside surfaces of the preheater (e.g., each level) or kiln in 3D. In some embodiments, the brick thickness to temperature correlation can be used to model and monitor the internal regions of the kiln in 3D.

In some instance, the temperature data and estimated temperature gradient across the preheater level or kiln from the outer surface to the inner surface can be plotted and provided on a display for visual monitoring. For example, a graph that plots the circumferential dimension against the revolutions and against the temperature can be prepared. The temperature can be provided as a color and/or axis in a three dimensional plot. For example, the outside temperature of a preheater level surface can be determined and compared to the inside temperature of that preheater level. The system can then correlate preheater level surface temperatures with the preheater level internal temperatures, which can be done over a range of temperatures. This provides a data correlation matrix so that when a surface temperature of the preheater is measured, the internal temperature is computed. The surface temperature and determined internal temperature can be provided on the display to the user, such as in the 3D model. This allows for tracking the external temperature as well as the internal operating temperature of each preheater level. The 3D model can be selectively sliced to provide an illustration of the temperature profile from the outer surface to the middle or across to the other side.

For this and other processes and methods disclosed herein, the operations performed in the processes and methods may be implemented in differing order. Furthermore, the outlined operations are only provided as examples, and some operations may be optional, combined into fewer operations, eliminated, supplemented with further operations, or expanded into additional operations, without detracting from the essence of the disclosed embodiments.

Preheater

In some embodiments, a system for measuring temperatures of a preheater of a rotary kiln can include: at least one infrared imaging sensor for each level of the preheater, wherein the preheater includes at least two preheater levels; and an imaging analysis computer operably coupled with the at least one infrared imaging sensor of each level of the preheater. In some aspects, the imaging analysis computer is configured to perform the following for each preheater level: obtain a 3D model of a preheater level of the preheater; obtain at least one infrared image of a fixed field of view of the preheater level of the preheater; analyze all pixels in the fixed field of view of the at least one infrared image for each pixel temperature; generate a 2D temperature model of the preheater level; overlaying the 2D temperature model over the 3D model to generate a virtual 3D preheater level temperature model; and providing a visual representation of the virtual 3D preheater level temperature model. In some aspects, the imaging analysis computer is configured to: obtain dimensions of the preheater level of the preheater; and size the 3D model of the preheater level of the preheater with the dimensions. In some aspects, the imaging analysis computer is configured to generate the visual representation of the virtual 3D preheater level temperature model to include the at least one infrared imaging sensor at a location of the preheater level. In some aspects, the fixed field of view includes at least a portion of a preheater level vessel.

In some embodiments, the imaging analysis computer is configured to: provide the a visual representation of the virtual 3D preheater level temperature model in a first color palette; and modify the first color palette to a second color palette. In some aspects, the imaging analysis computer is configured to generate one of the first or second color palette to be a same color palette of a virtual 3D rotary kiln temperature model.

In some embodiments, the imaging analysis computer is configured to provide a virtual 3D preheater temperature model having each virtual 3D preheater level temperature model.

In some embodiments, the imaging analysis computer is configured to provide a visual representation of each temperature of each preheater level.

In some embodiments, the imaging analysis computer is configured to: image the preheater level with a high definition infrared imaging sensor; and correct the 2D temperature model with temperature data with images from the high definition infrared imaging sensor. In some aspects, the imaging analysis computer is configured to: obtain at least one calibration infrared image; determine a difference in temperature data between the at least one infrared image and the at least one calibration infrared image; calibrate the system based on the difference; and obtain at least one subsequent infrared image based on the difference in the temperature data between the at least one infrared image and the at least one calibration infrared image.

In some embodiments, the imaging analysis computer is configured to record a temperature profile for the preheater level for a defined time period. In some aspects, the imaging analysis computer is configured to compare a subsequent temperature of the preheater level with the temperature profile for the preheater level. In some aspects, the imaging analysis computer is configured to: graphically display a graph of the temperature profile for at least a portion of the defined time period; and graphically display a subsequent temperature of the preheater level in comparison with the graphically displayed graph of the temperature profile.

In some embodiments, a system for measuring temperatures of a preheater of a rotary kiln can include: at least one infrared imaging sensor for each level of the preheater, wherein the preheater includes at least two preheater levels; and an imaging analysis computer operably coupled with the at least one infrared imaging sensor of each level of the preheater. In some aspects, the imaging analysis computer is configured to perform the following for each preheater level: generate at least one baseline infrared image of a fixed field of view of the preheater level; obtain at least one subsequent infrared image of the fixed field of view of the preheater level; identify at least one variable temperature region in the at least one infrared image based on a plurality of pixels in the at least one subsequent infrared image having a variable difference in temperature from a corresponding plurality of pixels in the at least one baseline infrared image, wherein the at least one variable temperature region includes the plurality of pixels having a baseline temperature from the at least one baseline infrared image and having a subsequent temperature that is the variable distance in temperature; generate a visual representation of the at least one variable temperature region; and displaying the visual representation that identifies the presence of the at least one variable temperature region in the fixed field of view. In some aspects, the imaging analysis computer is configured to generate the visual representation to include at least one of a 2D image, a 2D model, a 3D model, or graph showing temperature data. In some aspects, the imaging analysis computer is configured to: implement a time difference between the at least one baseline infrared image and the at least one subsequent infrared image that is sufficient for a change in temperature of the preheater level to have the variable difference in temperature.

In some embodiments, the imaging analysis computer is configured to: monitor any change in temperature of each pixel of the subsequent infrared image; compare any change in temperate of each pixel of the at least one subsequent infrared image with the respective pixel of the at least one baseline image; generate a visual representation of any change in temperature of each pixel having the change in temperature; and display the visual representation of the change in temperature of each pixel having the change in temperature. In some embodiments, the imaging analysis computer is configured to generate an alert that identifies the presence of the at least one variable temperature region in the fixed field of view.

In some embodiments, the imaging analysis computer is configured to: generate a data feed of real time temperatures based on the at least one subsequent infrared image; generate a data feed of real time average temperatures of at least one variable temperature region over a defined time period; generate a visual representation of the data feed of real time temperatures and data feed of real time average temperatures; and provide the visual representation of the data feed of real time temperatures and data feed of real time average temperatures.

In some embodiments, the imaging analysis computer is configured to: determine an input temperature of a gas input component of a first preheater level, wherein the gas input component fluidly couples the first preheater level with a rotary kiln; generate a visual representation of the input temperature; and provide the visual representation of the input temperature.

Rotary Kiln

In some embodiments, a system for detecting a hotspot on a rotary kiln can include: at least one infrared imaging sensor; and an imaging analysis computer operably coupled with the at least one infrared imaging sensor. The imaging analysis computer is configured to: obtain at least one baseline infrared image of a fixed field of view of the rotary kiln; analyze all pixels in the fixed field of view of the at least one baseline infrared image for each pixel temperature; determine an acceptable temperature range for each pixel in the fixed field of view; obtain at least one subsequent infrared image of the fixed field of view of the rotary kiln; determine the temperature for all pixels in the fixed field of view of the at least one subsequent infrared image; determine whether the temperature for each pixel in the at least one subsequent infrared image is within the acceptable temperature range; when the temperature is within the acceptable range, mark the pixel as normal; when the temperature is greater than the acceptable range, mark the pixel as abnormal; and generate an alert or cooling protocol when two or more adjacent pixels are marked as abnormal and having a temperature outside of the acceptable temperature range in the fixed field of view.

In some aspects, at least one infrared imaging sensor is directed at a tyre assembly of the kiln. In some aspects, the at least one infrared imaging sensor is directed to a tyre gap surface selected from at least one of: a kiln outer surface under the tyre assembly; a surface of a tyre block of the tyre assembly; or an under-surface of a tyre ring of the tyre assembly. In some instances, the at least one infrared imaging sensor images at least 75% of the tyre gap surface. In some instances, the system can include a first imaging sensor aimed into a first open end of a first tyre gap and a second imaging sensor aimed into a second open end of the first tyre gap.

In some embodiments, the imaging analysis computer is configured to: identify a discrete area on a surface of the kiln in the fixed field of view; and monitor the discrete area when it passes through the fixed field of view as the kiln rotates.

In some instances, the imaging analysis computer is configured to: identify a plurality of discrete areas on a surface of the kiln in the fixed field of view that each have a temperature profile; define a temperature fingerprint with a collection of the plurality of discrete areas; and monitor the plurality of discrete areas of the temperature fingerprint as each passes through the fixed field of view as the kiln rotates. In some instances, the imaging analysis computer is configured to: identify a first discrete area on the surface of the kiln in the at least one baseline infrared image of a fixed field of view of the rotary kiln; and identify the first discrete area on the surface of the kiln in the at least one subsequent infrared image of the fixed field of view of the rotary kiln. In some instances, the imaging analysis computer is configured to: compare the first discrete area from the at least one baseline infrared image to the first discrete area from the at least one subsequent infrared image; and determine differences in temperature for each pixel of the first discrete area from the at least one baseline infrared image to the at least one subsequent infrared image. In some instances, the imaging analysis computer is configured to: determine whether the first discrete area has a temperature difference greater than an allowable temperature difference; and identify the first discrete area as a hotspot when the temperature difference is greater than an allowable temperature difference. In some instances, the imaging analysis computer is configured to: monitor at least one first discrete region of the tyre assembly and/or region of kiln surface underneath the tyre assembly; and determine a temperature profile for the kiln surface underneath the tyre assembly.

In some embodiments, the imaging analysis computer is configured to: compare the temperature profile with a model that that correlates pixel temperatures with kiln brick wall thickness; determine an estimated kiln brick wall thickness based on the temperature of each pixel in the temperature profile; and generate and provide a report on the kiln brick wall thickness. In some aspects, the report includes: a two or three dimensional simulation of the model of the kiln brick wall showing brick wall thickness; or an alert when at least one region of the kiln brick wall has a thickness below a defined threshold.

In some embodiments, the system includes a cooling system operably coupled with the imaging analysis computer, wherein the imaging analysis computer includes computer executable instructions for controlling the cooling system based on temperature data of obtained from the at least one infrared imaging sensor. In some aspects, the cooling system includes: a sprayer controller; a water source; a pressurizing pump fluidly coupled with the water source and operably coupled with the sprayer controller; a water supply system fluidly coupled with the water supply and pressurized by the pressurizing pump; at least one solenoid valve in the water supply system, wherein the solenoid valve is operably coupled with the sprayer controller; and at least one nozzle at an end of a spray line of the water supply system, wherein the at least one solenoid valve controls water sprayed from the at least one nozzle.

In some embodiments, the sprayer controller is configured to: obtain hotspot data for the kiln; identify at least one hotspot to cool with a cooling water spray; determine a spraying protocol to cool the identified at least one hotspot; implement the spraying protocol to cool the identified at least one hotspot; obtain cooled temperature data for the at least one hotspot; determine whether a cooled temperature of the hotspot is greater than the acceptable range; when the cooled temperature is within the acceptable range, terminate the spraying protocol; and when the cooled temperature is greater than the acceptable range, continue the spraying protocol. In some aspects, the hotspot data includes at least one of: a location of the hotspot in the kiln; a surface of the kiln having a hotspot thereunder; a temperature of the hotspot; a temperature of the kiln surface over the hotspot; an area size of the hotspot; an area size of the kiln surface over the hotspot; a temperature gradient of the hotspot; a surface temperature gradient of the kiln surface over the hotspot; a change in temperature from a baseline temperature for the hotspot; or a change in temperature from a baseline temperature for the kiln surface over the hotspot. In some aspects, the hotspot data includes current data compared to historical data. In some aspects, the historical data includes at least one of: data prior to formation of a hotspot; data from at least one prior rotation of the kiln; data from the current hour; data from the current day; data from the current week; or data from the current month.

In some embodiments, the sprayer controller is configured to: identify a location and hotspot data of a specific hotspot on the kiln; and determine a spraying protocol for the specific hotspot based at least one of: a water spray pressure; a distance of a specific water sprayer to the location of the specific hotspot on the kiln surface; time between actuating solenoid valve of the specific water sprayer and contacting resultant water spray on the location of the specific hotspot; duration of the location of the specific hotspot being within a spray region on the kiln surface; duration of opening the solenoid valve; rotational velocity of the rotating kiln; temperature of sprayed water; hottest temperature of the specific hotspot; temperature profile of the specific hotspot; temperature gradient and area of the hotspot; temperature of sprayed water as it contacts the location of the specific hotspot; when to initiate spray by actuating the solenoid valve; when to terminate spray by de-actuating the solenoid valve; position of nozzle of sprayer relative to the location of the specific hotspot; area of hotspot; or area of water spray on the kiln surface. In some aspects, the spraying protocol for the specific hotspot includes: determining timing of initiation of actuation of solenoid valve relative to the location of the hotspot during rotation of the kiln; determining time period the solenoid valve is opened to spray the cooling water; and determining timing of de-actuation of solenoid valve relative to the location of the hotspot during rotation of the kiln, such that the water spray ceases as the hotspot moves out of range of the sprayer.

In some embodiment, the system can include a first imaging sensor is positioned to have a field of view of a defined area of a surface of the kiln; and the at least one nozzle is positioned to have a spray region that is outside of the defined area such that vaporization from the spray region does not pass between the first imaging sensor and the kiln. In some aspects, the first imaging sensor is on a first side of the kiln and a corresponding first nozzle is on an opposite side of the kiln or vertically above the first imaging sensor. In some aspects, a first imaging sensor is positioned to have a field of view of a defined area of a surface of the kiln and at least one nozzle sprays onto a top portion of the defined area such that vaporization from the spray region only passes between the first imaging sensor and top portion of the defined area. In some aspects, each nozzle is positioned to spray water onto a defined spray area on the kiln so as to generate water vapor, wherein each infrared imaging sensor is positioned to image the kiln without imaging the water vapor. In some aspects, at least one nozzle is positioned to aim a water spray at the tyre assembly of the kiln. In some aspects, the at least nozzle is positioned to aim a water spray at a tyre gap surface selected from at least one of: a kiln outer surface under the tyre assembly; a surface of a tyre block of the tyre assembly; or an under-surface of a tyre ring of the tyre assembly.

In some aspects, the at least one nozzle sprays a water spray to cover at least 75% of the tyre gap surface. In some aspects, a first nozzle is aimed into a first open end of a first tyre gap and a nozzle is aimed into a second open end of the first tyre gap.

In some embodiments, the imaging analysis computer and/or sprayer controller is configured to: identify a first hotspot on a surface of the kiln in the fixed field of view; and spray water from at least one nozzle when the first hotspot passes through a spray region of the at least one nozzle when the first hotspot is outside of the fixed field of view. In some aspects, the imaging analysis computer and/or sprayer controller is configured to: monitor a temperature profile of the first hotspot before, during, and after the spraying of water thereon; determine whether the temperature profile of the first hotspot includes a temperature within an acceptable range; when the temperature is within the acceptable range, the first hotspot is not sprayed during each revolution of the kiln; and when the temperature is greater than the acceptable range, the hotspot is sprayed during each revolution of the kiln. In some aspects, the imaging analysis computer and/or sprayer controller is configured to continuing the cooling the first hotspot with water sprays until the hotspot includes a temperature within the acceptable range.

In some embodiments, the cooling system can include at least one drive motor that can change direction of water spray from the at least one nozzle. In some aspects, the imaging analysis computer and/or sprayer controller is configured to drive the at least one drive motor to change a trajectory of water spray from the at least one nozzle toward at least one hotspot. In some aspects, the imaging analysis computer and/or sprayer controller is configured to drive the at least one drive motor so that the water spray follows at least one hotspot as the at least one hotspot passes by the at least one nozzle.

In some embodiments, the imaging analysis computer is configured to: determine a temperature of a discrete location of the rotary kiln in real time; determine whether the temperature is greater than a threshold temperature in real time; and generate an alert or cooling protocol in real time when the temperature is greater than the threshold temperature.

In some embodiments, the imaging analysis computer is configured to: analyze all pixels in the fixed field of view for changes from the at least one baseline infrared image of a defined region of the kiln to at least one subsequent infrared image having the defined region of the kiln; identify a temperature for each pixel in the field of view between the at least one baseline infrared image and the at least one subsequent infrared image; identify one or more first pixels in the at least one subsequent infrared image having a first variable difference in temperature that is greater than an allowable variable difference in temperature for the one or more first pixels in the at least one subsequent infrared image compared to an allowable variable difference in temperature for the one or more first pixels in the at least one baseline infrared image; determine the one or more first pixels as being on or more hotspots based on the first variable difference in temperature of the one or more first pixels being greater than the allowable variable difference in temperature of the one or more first pixels in the fixed field of view; and generate an alert or cooling protocol that identifies a hotspot being present in the fixed field of view.

In some embodiments, the imaging analysis computer is configured to provide the alert by: actuating an audible indicator; actuating a visible indicator; showing the alert on a display device; or transmitting the alert to a remote device.

In some embodiments, the imaging analysis computer is configured to monitor the fixed field of view to detect a hotspot under a tyre assembly of the rotary kiln. In some aspects, the imaging analysis computer is configured to: identify a surface region in the fixed field of view that is a surface of a tyre assembly, the surface region having a surface temperature for each pixel; and identify a hotspot region of the kiln under the tyre assembly in the fixed field of view that is a hotspot by having a variable difference in temperature for each pixel that is greater than the allowable variable difference in temperature for the surface region from the at least one baseline infrared image to the at least one subsequent infrared image. In some aspects, the imaging analysis computer is configured to: determine the surface region in the fixed field of view in the at least one baseline infrared image as being devoid of a hotspot, the surface region having the allowable variable difference in temperature for each pixel; and determine the hotspot region in the fixed field of view in the at least one subsequent infrared image as having a hotspot, the hotspot region having the first variable difference in temperature that is greater than the allowable variable difference in temperature for each pixel.

In some embodiments, the imaging analysis computer is configured to: associate adjacent first pixels to identify an hotspot region; determine a size of the hotspot region; and generate a hotspot region size report that identifies the size of the hotspot region based on the associated adjacent first pixels; and compare the area of the hotspot region with a threshold area size and generate the alert or cooling protocol once the hotspot region has an area that is at least the size of the threshold size, wherein the threshold area size is a defined value or a percentage of a region of interest.

In some embodiments, the imaging analysis computer is configured to perform at least one of the following: determine whether or not there is water on the kiln surface and compensate for the water during the analysis of the pixels in the fixed field of view; determine whether or not there is water vapor rising from the kiln surface and compensate for the water vapor during the analysis of the pixels in the fixed field of view; determining that it is raining in the fixed field of view and monitoring the fixed field of view to detect hotspots through the water; determine whether or not the water on the kiln has areas of reflected light and compensate for the areas of reflected light during the analysis of the pixels in the fixed field of view; obtain the thermal data for the one or more surfaces in the fixed field of view and compute with the thermal data for the one or more surfaces in the fixed field of view during the analysis of the pixels in the fixed field of view; obtain distance data for the one or more surfaces in the fixed field of view and compute with the distance data for the one or more surfaces in the fixed field of view during the analysis of the pixels in the fixed field of view; or determine a relative humidity and compute with the relative humidity during the analysis of the pixels in the fixed field of view.

In some embodiments, the imaging analysis computer is configured to obtain the at least one baseline infrared image by: acquiring a series of infrared images of the fixed field of view; analyzing pixel data of each infrared image of the series to determine a pixel temperature for each pixel for each infrared image; determining a range of pixel temperatures for each pixel without a hotspot being present in the fixed field of view across the series of infrared images of the fixed field of view; and setting the allowable variable difference in temperature to include the determined range of pixel temperatures for each pixel without a hotspot.

In some embodiments, the imaging analysis computer is configured to obtain the at least one baseline infrared image by: performing a statistical analysis of the range of pixel temperatures for each pixel without a hotspot being present in at least one region across the series of infrared images of the fixed field of view for the at least one region to determine an allowable distribution of pixel temperatures for each pixel; and setting the at least one baseline infrared image so that each pixel includes the allowable distribution of pixel temperatures. In some aspects, the at least one baseline infrared image is a model of each pixel with the allowable distribution of pixel temperatures for each pixel, wherein the model of pixel is obtained by: determining a distribution of the pixel temperatures for each pixel without a hotspot being present across the series of infrared images for the at least one region; identifying a maximum pixel temperature that is greater than the distribution of pixel temperatures by a first difference; and setting the first difference from the distribution to indicate absence of a hotspot for each pixel in the at least one region.

In some embodiments, the imaging analysis computer is configured to: compare each pixel temperature in the one or more subsequent infrared images for the at least one region with the model of each pixel with the allowable distribution of pixel temperatures; determine a difference between each pixel temperature in the one or more subsequent infrared images and the model of each pixel in the at least one region; determine whether the difference is greater than a threshold difference, when the difference is greater than the threshold difference, determine that the pixel is a hotspot pixel, or when the difference is less than the threshold difference, determine that the pixel is not a hotspot pixel. In some aspects, the imaging analysis computer is configured to: determine a standard deviation of the distribution of the pixel temperatures for each pixel without a hotspot being present across the series of infrared images; and set the threshold difference as being a defined difference from the standard deviation.

In some embodiments, the imaging analysis computer is configured to: obtain the at least baseline one infrared image of the fixed field of view of a specific rotational position of the rotary kiln such that a specific region of the rotary kiln is imaged by a plurality of specific pixels; obtain the at least one subsequent infrared image of the fixed field of view of the specific rotational position of the rotary kiln such that the specific region of the rotary kiln is imaged by the plurality of specific pixels; and compare the at least baseline one infrared image and the at least one subsequent infrared image so as to compare the specific region of the rotary kiln by the plurality of specific pixels. In some aspects, each rotational position of the rotary kiln is imaged as it rotates, and the comparison is made with each rotational position in the at least one baseline image and the at least one subsequent image. In some aspects, a first baseline image of a specific region of the rotary kiln is obtained at least one revolution prior to a first subsequent image of the specific region. In some aspects, the specific region includes a specific set of pixels in the first baseline image and the first subsequent image. In some aspects, the at least one baseline image is not compared to a subsequent image of a different region of the rotary kiln. In some aspects, a physical feature of the rotary kiln is identified, wherein the imaging analysis computer is configured to track the physical feature as it rotates. In some aspects, at least one tyre gap of a tyre assembly is identified and mapped in relation to the physical feature. In some aspects, the imaging analysis computer is configured to track each tyre gap of the tyre assembly. In some aspects, the imaging analysis computer is configured to label each tyre gap for tracking purposes. In some aspects, imaging analysis computer is configured to identify a plurality of reference points on the surface of the rotary kiln and track the plurality of reference points as the rotary kiln rotates. In some aspects, the imaging analysis computer is configured to a reference a tyre gap to at least one of the reference points. In some aspects, the system can perform tracking of the rotation of the rotary kiln by tracking at least one of the reference points and/or at least one tyre gap.

In some embodiments, the imaging analysis computer is configured receive input of parameters of the rotary kiln, wherein the parameters include at least a measurement of dimension of the rotary kiln and at least a rotational velocity of the rotary kiln. In some aspects, the dimensions include a diameter of the rotary kiln. In some aspects, the imaging analysis computer is configured to use the parameters in calculations for temperature profile measurements. In some aspects, the imaging analysis computer is configured to use the parameters in calculating a rotational velocity of the rotary kiln. In some aspects, the rotational velocity is in rotations per minutes.

In some embodiments, the at least one infrared imaging sensor includes a cooled housing. In some aspects, the cooled housing includes a fluid inlet, a fluid outlet, and a fluid conduit between the fluid inlet and fluid outlet. In some aspects, the fluid inlet is coupled to a cooling fluid source. In some aspects, the cooling fluid is cooled water. In some aspects, the cooling fluid is provided by a cooling system configured to cool the cooling fluid.

In some embodiments, a system for detecting a hotspot of a rotary kiln can include: at least one infrared imaging sensor, wherein the at least one infrared imaging sensor is a infrared camera configured for detecting absorption in the IR bandwidth, each infrared imaging sensor being configured to capture infrared images of a scene of a rotary kiln, each infrared image comprising a plurality of pixels, each pixel of each infrared image having a corresponding pixel value; an imaging analysis computer operably coupled with the at least one infrared imaging sensor, wherein the imaging analysis computer is configured to: generate at least one baseline infrared image of a fixed field of view of the scene without the hotspot being present; obtain at least one subsequent infrared image of a fixed field of view of the scene; identify at least one hotspot region in the at least one infrared image based on a plurality of pixels in the at least one subsequent infrared image having a variable difference from a corresponding plurality of pixels in the at least one baseline infrared image, wherein the at least one hotspot region includes the plurality of pixels having temperature data from the infrared bandwidth; determine the at least one elevated temperature region as being a hotspot; and generate an alert that identifies the presence of the hotspot in the fixed field of view.

In some embodiments, a system for temperature monitoring and detecting abnormally high temperatures of an industrial process can be used for a rotary kiln. The system can include: a plurality of infrared imaging sensors, each infrared imaging sensor configured to capture sequences of infrared images of a scene, each infrared image comprising a plurality of pixels, each pixel having a corresponding pixel value; an imaging analysis computer comprising: an electronic hardware processor, an electronic hardware memory operably connected to the electronic hardware processor and storing instructions that configure the electronic hardware processor to: receive a sequence of a plurality of infrared images of the scene from each infrared imaging sensor of the plurality of infrared imaging sensors for a period of time, wherein each pixel corresponds with a same point of the scene across the sequence of the plurality of infrared images, determine a temperature value for each pixel corresponding to the pixel value of each pixel for each of the plurality of infrared images in the sequences of infrared images for the period of time, determine a statistical distribution of temperature values for each pixel over the plurality of infrared images based on the determined temperature value of each pixel of each infrared image of the plurality of infrared images for the period of time, which is defined as a historical time period, such that each pixel includes a separate statistical distribution of temperature values for the historical time period, define a threshold distance from the statistical distribution of temperature values for each pixel, the threshold distance being greater than the statistical distribution of temperature values, obtain a subsequent infrared image from at least one infrared imaging sensor of the plurality of infrared imaging sensors, determine a subsequent temperature value of each pixel in the subsequent infrared image, compare the determined subsequent temperature value of each pixel with the threshold distance from the statistical distribution of temperature values for each pixel, when the determined subsequent temperature value for a first pixel is less than the threshold distance from the statistical distribution of temperature values for the first pixel, update the statistical distribution of temperature values for the first pixel with the determined subsequent temperature value to form an updated statistical distribution of temperature values for an updated historical time period, when the determined subsequent temperature value for the first pixel is greater than the threshold distance from the statistical distribution of temperature values for the first pixel, perform the following steps: identify a plurality of first pixels in the subsequent image that each have a determined subsequent temperature value that is greater than the threshold distance from the statistical distribution of temperature values for the plurality of first pixels, determine each pixel of the plurality of first pixels to be abnormal pixels, each abnormal pixel of the plurality of first pixels having the determined temperature value being greater than the threshold distance from its respective statistical distribution of temperature values for the historical time period, associate adjacent abnormal pixels of the plurality of first pixels to identify an abnormal region, evaluate a size of the abnormal region, and generate an alert based on a comparison of the size of the abnormal region to at least one of: a size of a region of interest and a predetermined size, wherein the alert is generated when the size of the abnormal region is larger than: the size of the region of interest or the predetermined size. Thus, the hotspots of a rotary kiln can be monitored and alerts can be generated once a hotspot is either identified or matures to a size or temperature that is above a threshold.

Preheater and Rotary Kiln

In some embodiments, a system for measuring temperatures of a preheater and rotary kiln can include: at least one infrared imaging sensor for each level of the preheater, wherein the preheater includes at least two preheater levels; at least one infrared imaging sensor for the rotary kiln; and an imaging analysis computer operably coupled with the at least one infrared imaging sensor of each level of the preheater and rotary kiln. In some aspects, the imaging analysis computer is configured to perform the following for each preheater level and rotary kiln: obtain a 3D model of a preheater level of the preheater; obtain a 3D model of the rotary kiln; obtain at least one infrared image of a fixed field of view of the preheater level of the preheater; obtain at least one infrared image of a fixed field of view of the preheater level of the preheater; analyze all pixels in the fixed field of view of the at least one infrared image of the preheater level for each pixel temperature; analyze all pixels in the fixed field of view of the at least one infrared image of the preheater level for each pixel temperature; generate a 2D temperature model for the preheater level; generate a 2D temperature model for the rotary kiln; overlaying the 2D temperature model of the preheater level over the 3D model of the preheater level to generate a virtual 3D preheater level temperature model; overlaying the 2D temperature model of the rotary kiln over the 3D model of the rotary kiln to generate a virtual 3D rotary kiln temperature model; and providing a visual representation of the virtual 3D preheater level temperature model and a visual representation of the virtual 3D rotary kiln temperature model. In some aspects, the imaging analysis computer is configured to: generate a graphical user interface that shows the virtual 3D rotary kiln temperature model; generating a menu option of the graphical user interface for selecting viewing of the virtual 3D preheater level model with or without being coupled with the virtual 3D rotary kiln model; and display the graphical user interface on a display.

In some embodiments, a system for measuring temperatures of a preheater of a rotary kiln can include: at least one infrared imaging sensor for each level of the preheater, wherein the preheater includes at least two preheater levels; at least one infrared imaging sensor for the rotary kiln; and an imaging analysis computer operably coupled with the at least one infrared imaging sensor of each level of the preheater and rotary kiln. In some aspects, the imaging analysis computer is configured to perform the following for each preheater level and rotary kiln: generate at least one baseline infrared image of a fixed field of view of the preheater level; generate at least one baseline infrared image of a fixed field of view of the rotary kiln; obtain at least one subsequent infrared image of the fixed field of view of the preheater level; obtain at least one subsequent infrared image of the fixed field of view of the rotary kiln; identify at least one variable temperature region in the at least one infrared image of the preheater level or rotary kiln based on a plurality of pixels in the at least one subsequent infrared image of the preheater level or rotary kiln having a variable difference in temperature from a corresponding plurality of pixels in the at least one baseline infrared image of the preheater level or rotary kiln, wherein the at least one variable temperature region includes the plurality of pixels having a baseline temperature and having a subsequent temperature that is the variable distance in temperature; generate a visual representation of the at least one variable temperature region of the preheater level or rotary kiln; and display the visual representation that identifies the presence of the at least one variable temperature region in the fixed field of view of the preheater level or rotary kiln. In some aspects, the imaging analysis computer is configured to: determine an input temperature of a gas input component of a first preheater level, wherein the gas input component fluidly couples the first preheater level with the rotary kiln; generate a visual representation of the input temperature; and provide the visual representation of the input temperature. In some aspects, the imaging analysis computer is configured to generate the visual representation to include at least one of a 2D image, a 2D model, a 3D model, or graph showing temperature data. In some aspects, the imaging analysis computer is configured to implement a time difference between the at least one baseline infrared image and the at least one subsequent infrared image that is sufficient for a change in temperature of the preheater level or rotary kiln to have the variable difference in temperature.

In some embodiments, the imaging analysis computer is configured to: monitor any change in temperature of each pixel of the subsequent infrared image of the preheater level and/or rotary kiln; compare any change in temperate of each pixel of the at least one subsequent infrared image of the preheater level and/or rotary kiln with the respective pixel of the at least one baseline image of the preheater level and/or rotary kiln; generate a visual representation of any change in temperature of each pixel having the change in temperature; and display the visual representation of the change in temperature of each pixel having the change in temperature.

In some aspects, the imaging analysis computer is configured to generate an alert that identifies the presence of the at least one variable temperature region in the fixed field of view of the preheater level and/or rotary kiln.

In some embodiments, the imaging analysis computer is configured to: generate a data feed of real time temperatures based on the at least one subsequent infrared image of the preheater level and/or rotary kiln; generate a data feed of real time average temperatures based on the at least one baseline infrared image and the at least one subsequent infrared image of the preheater level and/or rotary kiln; generate a visual representation of the data feed of real time temperatures and data feed of real time average temperatures; and provide the visual representation of the data feed of real time temperatures and data feed of real time average temperatures.

In some embodiments, the imaging analysis computer is configured to: generate a graphical user interface that shows temperature data of the rotary kiln; generating a menu option of the graphical user interface for selecting viewing of the temperature data of the preheater level with or without being associated with the temperature data of the rotary kiln; and display the graphical user interface on a display.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. One or more non-transitory computer readable media storing instructions that in response to being executed by one or more processors, cause a computer system to perform operations, the operations comprising:
  obtain a 3D model of a preheater level of the preheater;
  obtain at least one infrared image of a fixed field of view of the preheater level of the preheater;
  analyze all pixels in the fixed field of view of the at least one infrared image for each pixel temperature;
  generate a 2D temperature model of the preheater level;
  overlay the 2D temperature model over the 3D model to generate a virtual 3D preheater level temperature model; and
  provide a visual representation of the virtual 3D preheater level temperature model.

2. The non-transitory computer readable media of claim 1, wherein the operations include:
  obtain dimensions of the preheater level of the preheater; and
  size the 3D model of the preheater level of the preheater with the dimensions.

3. The non-transitory computer readable media of claim 1, wherein the operations include:
  generate the visual representation of the virtual 3D preheater level temperature model to include the at least one infrared imaging sensor at a location of the preheater level.

4. The non-transitory computer readable media of claim 1, wherein the fixed field of view includes at least a portion of a preheater level vessel.

5. The non-transitory computer readable media of claim 1, wherein the operations include:
  provide the visual representation of the virtual 3D preheater level temperature model in a first color palette; and
  modify the first color palette to a second color palette.

6. The non-transitory computer readable media of claim 5, wherein the operations include:
  generate one of the first or second color palette to be a same color palette of a virtual 3D rotary kiln temperature model.

7. The non-transitory computer readable media of claim 1, wherein the operations include:
  provide a virtual 3D preheater temperature model having each virtual 3D preheater level temperature model.

8. The non-transitory computer readable media of claim 1, wherein the operations include:
  provide a visual representation of each temperature of each preheater level.

9. The non-transitory computer readable media of claim 1, wherein the operations include:
  image the preheater level with a high definition infrared imaging sensor; and
  correct the 2D temperature model with temperature data with images from the high definition infrared imaging sensor.

10. The non-transitory computer readable media of claim 1, wherein the operations include:
  obtain at least one calibration infrared image;
  determine a difference in temperature data between the at least one infrared image and the at least one calibration infrared image;
  calibrate the system based on the difference; and
  obtain at least one subsequent infrared image based on the difference in the temperature data between the at least one infrared image and the at least one calibration infrared image.

11. The non-transitory computer readable media of claim 1, wherein the operations include:
  record a temperature profile for the preheater level for a defined time period.

12. The non-transitory computer readable media of claim 11, wherein the operations include:
  compare a subsequent temperature of the preheater level with the temperature profile for the preheater level.

13. The non-transitory computer readable media of claim 11, wherein the operations include:
  graphically display a graph of the temperature profile for at least a portion of the defined time period; and graphically display a subsequent temperature of the preheater level in comparison with the graphically displayed graph of the temperature profile.

14. One or more non-transitory computer readable media storing instructions that in response to being executed by one or more processors, cause a computer system to perform operations, the operations comprising:
  generate at least one baseline infrared image of a fixed field of view of the preheater level;
  obtain at least one subsequent infrared image of the fixed field of view of the preheater level;
  identify at least one variable temperature region in the at least one infrared image based on a plurality of pixels in the at least one subsequent infrared image having a variable difference in temperature from a corresponding plurality of pixels in the at least one baseline infrared image, wherein the at least one variable temperature region includes the plurality of pixels having a baseline temperature from the at least one baseline infrared image and having a subsequent temperature that is the variable distance in temperature;
  generate a visual representation of the at least one variable temperature region; and
  display the visual representation that identifies the presence of the at least one variable temperature region in the fixed field of view.

15. The non-transitory computer readable media of claim 14, wherein the operations include:
  generate the visual representation to include at least one of a 2D image, a 2D model, a 3D model, or graph showing temperature data.

16. The non-transitory computer readable media of claim 14, wherein operations include:
  implement a time difference between the at least one baseline infrared image and the at least one subsequent infrared image that is sufficient for a change in temperature of the preheater level to have the variable difference in temperature.

17. The non-transitory computer readable media of claim 14, wherein the operations include:
  monitor any change in temperature of each pixel of the subsequent infrared image;
  compare any change in temperate of each pixel of the at least one subsequent infrared image with the respective pixel of the at least one baseline image;
  generate a visual representation of any change in temperature of each pixel having the change in temperature; and
  display the visual representation of the change in temperature of each pixel having the change in temperature.

18. The non-transitory computer readable media of claim 14, wherein the operations include:
  generate an alert that identifies the presence of the at least one variable temperature region in the fixed field of view.

19. The non-transitory computer readable media of claim 14, wherein operations include:
  generate a data feed of real time temperatures based on the at least one subsequent infrared image;
  generate a data feed of real time average temperatures of at least one variable temperature region over a defined time period;
  generate a visual representation of the data feed of real time temperatures and data feed of real time average temperatures; and
  provide the visual representation of the data feed of real time temperatures and data feed of real time average temperatures.

20. The non-transitory computer readable media of claim 14, wherein the operations include:
  determine an input temperature of a gas input component of a first preheater level, wherein the gas input component fluidly couples the first preheater level with a rotary kiln;
  generate a visual representation of the input temperature; and
  provide the visual representation of the input temperature.

21. One or more non-transitory computer readable media storing instructions that in response to being executed by one or more processors, cause a computer system to perform operations, the operations comprising:
  obtain a 3D model of a preheater level of the preheater;
  obtain a 3D model of the rotary kiln;
  obtain at least one infrared image of a fixed field of view of the preheater level of the preheater;
  obtain at least one infrared image of a fixed field of view of the preheater level of the preheater;
  analyze all pixels in the fixed field of view of the at least one infrared image of the preheater level for each pixel temperature;
  analyze all pixels in the fixed field of view of the at least one infrared image of the preheater level for each pixel temperature;
  generate a 2D temperature model for the preheater level;
  generate a 2D temperature model for the rotary kiln;
  overlay the 2D temperature model of the preheater level over the 3D model of the preheater level to generate a virtual 3D preheater level temperature model;
  overlay the 2D temperature model of the rotary kiln over the 3D model of the rotary kiln to generate a virtual 3D rotary kiln temperature model; and
  provide a visual representation of the virtual 3D preheater level temperature model and a visual representation of the virtual 3D rotary kiln temperature model.

22. The non-transitory computer readable media of claim 21, wherein the operations include:
  generate a graphical user interface that shows the virtual 3D rotary kiln temperature model;
  generate a menu option of the graphical user interface for selecting viewing of the virtual 3D preheater level model with or without being coupled with the virtual 3D rotary kiln model; and
  display the graphical user interface on a display.

23. The non-transitory computer readable media of claim 14, wherein the operations include:
  generate at least one baseline infrared image of a fixed field of view of the rotary kiln;
  obtain at least one subsequent infrared image of the fixed field of view of the rotary kiln;
  identify at least one variable temperature region in the at least one infrared image of the preheater level or rotary kiln based on a plurality of pixels in the at least one subsequent infrared image of the preheater level or rotary kiln having a variable difference in temperature from a corresponding plurality of pixels in the at least one baseline infrared image of the preheater level or rotary kiln, wherein the at least one variable temperature region includes the plurality of pixels having a baseline temperature and having a subsequent temperature that is the variable distance in temperature;

generate a visual representation of the at least one variable temperature region of the preheater level or rotary kiln; and display the visual representation that identifies the presence of the at least one variable temperature region in the fixed field of view of the preheater level or rotary kiln.

24. The non-transitory computer readable media of claim 23, wherein the operations include:

determine an input temperature of a gas input component of a first preheater level, wherein the gas input component fluidly couples the first preheater level with the rotary kiln;

generate a visual representation of the input temperature; and provide the visual representation of the input temperature.

25. The non-transitory computer readable media of claim 23, wherein the operations include:

generate the visual representation to include at least one of a 2D image, a 2D model, a 3D model, or graph showing temperature data.

26. The non-transitory computer readable media of claim 23, wherein the operations include:

implement a time difference between the at least one baseline infrared image and the at least one subsequent infrared image that is sufficient for a change in temperature of the preheater level or rotary kiln to have the variable difference in temperature.

27. The non-transitory computer readable media of claim 23, wherein the operations include:

monitor any change in temperature of each pixel of the subsequent infrared image of the preheater level and/or rotary kiln;

compare any change in temperate of each pixel of the at least one subsequent infrared image of the preheater level and/or rotary kiln with the respective pixel of the at least one baseline image of the preheater level and/or rotary kiln;

generate a visual representation of any change in temperature of each pixel having the change in temperature; and display the visual representation of the change in temperature of each pixel having the change in temperature.

28. The non-transitory computer readable media of claim 23, wherein the operations include:

generate an alert that identifies the presence of the at least one variable temperature region in the fixed field of view of the preheater level and/or rotary kiln.

29. The non-transitory computer readable media of claim 23, wherein the operations include:

generate a data feed of real time temperatures based on the at least one subsequent infrared image of the preheater level and/or rotary kiln;

generate a data feed of real time average temperatures based on the at least one baseline infrared image and the at least one subsequent infrared image of the preheater level and/or rotary kiln;

generate a visual representation of the data feed of real time temperatures and data feed of real time average temperatures; and provide the visual representation of the data feed of real time temperatures and data feed of real time average temperatures.

30. The non-transitory computer readable media of claim 23, wherein the operations include:

generate a graphical user interface that shows temperature data of the rotary kiln;

generate a menu option of the graphical user interface for selecting viewing of the temperature data of the preheater level with or without being associated with the temperature data of the rotary kiln; and display the graphical user interface on a display.

* * * * *